(12) United States Patent
Bai et al.

(10) Patent No.: US 12,328,288 B2
(45) Date of Patent: Jun. 10, 2025

(54) TECHNIQUES FOR GRANT FREE TRANSMISSIONS IN FULL DUPLEX WIRELESS COMMUNICATION SYSTEMS

(71) Applicant: QUALCOMM Incorporated, San Diego, CA (US)

(72) Inventors: Tianyang Bai, Somerville, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/492,235

(22) Filed: Oct. 1, 2021

(65) Prior Publication Data

US 2022/0109551 A1 Apr. 7, 2022

Related U.S. Application Data

(60) Provisional application No. 63/087,776, filed on Oct. 5, 2020.

(51) Int. Cl.
*H04L 5/14* (2006.01)
*H04W 72/23* (2023.01)

(52) U.S. Cl.
CPC ............ *H04L 5/14* (2013.01); *H04W 72/23* (2023.01)

(58) Field of Classification Search
CPC .......... H04L 5/14; H04L 5/0096; H04L 5/16; H04W 72/23; H04W 72/20; H04W 72/04; H04W 72/0446
See application file for complete search history.

(56) References Cited

U.S. PATENT DOCUMENTS

| 5,218,680 A | 6/1993 | Farrell et al. |
| 8,160,101 B2 | 4/2012 | Kwak et al. |
| (Continued) | | |

FOREIGN PATENT DOCUMENTS

| EP | 3637836 A1 | 4/2020 |
| WO | WO-2015096027 A1 | 7/2015 |
| (Continued) | | |

OTHER PUBLICATIONS

Catt: "TDD Inter-Band Carrier Aggregation", 3GPP Draft, R1-121081, 3GPP TSG RAN WG1 Meeting #68bis, 3rd Generation Partnership Project (3GPP), Mobile Competence Centre, 650, Route Des Lucioles, F-06921 Sophia-Antipolis Cedex, France, vol. RAN WG1, no. Jeju, Korea, Mar. 26, 2012-Mar. 30, 2012, Mar. 20, 2012 (Mar. 20, 2012), XP050599384, 5 Pages, [retrieved on Mar. 20, 2012] Section 2.2.

(Continued)

*Primary Examiner* — Will W Lin
(74) *Attorney, Agent, or Firm* — Holland & Hart/QUALCOMM Incorporated

(57) ABSTRACT

Methods, systems, and devices for wireless communications are described. A first device may release an uplink resource associated with a semi-persistent uplink transmission during a portion of a transmission time interval based at least in part on a condition. For example, the first device may determine that a buffer associated with the first device satisfies a buffer threshold (e.g., a threshold amount of temporarily stored uplink data) during a first temporal period. The buffer may temporarily store uplink data associated with the semi-persistent uplink transmission. The first device may, as a result, transmit, to a second device, a feedback message including an indication that the first device skips the semi-persistent uplink transmission based on releasing the uplink resource.

40 Claims, 22 Drawing Sheets

(56) References Cited

U.S. PATENT DOCUMENTS

| | | | |
|---|---|---|---|
| 9,572,063 | B2 | 2/2017 | Etemad et al. |
| 9,641,309 | B2 | 5/2017 | Ko et al. |
| 11,271,625 | B2 | 3/2022 | Park et al. |
| 11,588,585 | B2 | 2/2023 | Shao et al. |
| 11,736,986 | B2* | 8/2023 | Kung .................... H04W 76/30 370/331 |
| 2009/0249153 | A1* | 10/2009 | Zhang .................. H04W 72/04 714/E11.131 |
| 2011/0292843 | A1 | 12/2011 | Gan et al. |
| 2013/0223294 | A1 | 8/2013 | Karjalainen et al. |
| 2015/0304883 | A1* | 10/2015 | Tabet ................ H04W 28/0289 370/238 |
| 2016/0105878 | A1 | 4/2016 | Zhao et al. |
| 2016/0242176 | A1* | 8/2016 | Sun ........................ H04W 72/23 |
| 2017/0026942 | A1 | 1/2017 | Vajapeyam et al. |
| 2017/0054544 | A1 | 2/2017 | Kazmi et al. |
| 2017/0289733 | A1 | 10/2017 | Rajagopal et al. |
| 2017/0295594 | A1* | 10/2017 | Ozturk .................. H04W 72/23 |
| 2018/0007667 | A1 | 1/2018 | You et al. |
| 2018/0098349 | A1 | 4/2018 | Sun et al. |
| 2018/0123710 | A1 | 5/2018 | Kim et al. |
| 2018/0160445 | A1* | 6/2018 | Babaei ................ H04W 72/044 |
| 2018/0352582 | A1 | 12/2018 | Yi et al. |
| 2019/0075585 | A1 | 3/2019 | Deogun et al. |
| 2019/0104539 | A1 | 4/2019 | Park et al. |
| 2019/0132838 | A1 | 5/2019 | Yi et al. |
| 2019/0335471 | A1 | 10/2019 | Kim et al. |
| 2019/0373588 | A1 | 12/2019 | Bae et al. |
| 2020/0145998 | A1 | 5/2020 | Sun et al. |
| 2020/0154440 | A1 | 5/2020 | Gholmieh et al. |
| 2020/0235980 | A1 | 7/2020 | John Wilson et al. |
| 2020/0245335 | A1* | 7/2020 | Joseph .................. H04W 76/11 |
| 2020/0296701 | A1 | 9/2020 | Park et al. |
| 2020/0313837 | A1 | 10/2020 | Vejlgaard et al. |
| 2020/0404684 | A1* | 12/2020 | Lee ........................ H04L 1/1896 |
| 2021/0058967 | A1 | 2/2021 | Oteri et al. |
| 2021/0259000 | A1 | 8/2021 | Khoshnevisan et al. |
| 2021/0321413 | A1 | 10/2021 | Shin et al. |
| 2021/0344455 | A1 | 11/2021 | Choi et al. |
| 2021/0351881 | A1 | 11/2021 | Park et al. |
| 2021/0377926 | A1* | 12/2021 | Li ........................ H04W 72/044 |
| 2022/0022195 | A1 | 1/2022 | Bruun et al. |
| 2022/0039115 | A1 | 2/2022 | Sun et al. |
| 2022/0069884 | A1 | 3/2022 | Zhang et al. |
| 2022/0078728 | A1 | 3/2022 | Yi et al. |
| 2022/0094484 | A1* | 3/2022 | Babaei ............. H04W 72/1263 |
| 2022/0095083 | A1 | 3/2022 | Yeo et al. |
| 2022/0109550 | A1 | 4/2022 | Bai et al. |
| 2022/0109553 | A1 | 4/2022 | Bai et al. |
| 2022/0110117 | A1 | 4/2022 | Bai et al. |
| 2022/0110137 | A1 | 4/2022 | Bai et al. |
| 2022/0124741 | A1* | 4/2022 | Elshafie ................ H04L 5/0094 |
| 2022/0182160 | A1 | 6/2022 | Su et al. |
| 2023/0032475 | A1 | 2/2023 | Bae et al. |
| 2023/0098368 | A1 | 3/2023 | Yu et al. |
| 2023/0148282 | A1 | 5/2023 | Marinier et al. |

FOREIGN PATENT DOCUMENTS

| | | | |
|---|---|---|---|
| WO | WO-2017029292 A1 | 2/2017 | |
| WO | WO-2017172165 A1 | 10/2017 | |
| WO | WO-2018058455 A1 | 4/2018 | |
| WO | WO-2019032882 A1 * | 2/2019 | .......... H04B 7/0695 |
| WO | WO-2020197645 A1 | 10/2020 | |

OTHER PUBLICATIONS

International Search Report and Written Opinion—PCT/US2021/053377—ISA/EPO—Jan. 28, 2022 (208716WO).

Qualcomm Incorporated: "Multi-TRP Enhancements", 3GPP Draft, 3GPP TSG-RAN WG1 Meeting #98, R1-1909272 Multi-TRP Enhancements, 3rd Generation Partnership Project (3GPP), Mobile Competence Centre, 650, Route Des Lucioles, F-06921 Sophia-Antipolis Cedex, France, vol. Ran WG1, No. Prague, Czech Republic, Aug. 26, 2019-Aug. 30, 2019, Aug. 17, 2019 (Aug. 17, 2019), XP051765877, 32 pages, Retrieved from the Internet: URL: http://www.3gpp.org/ftp/tsg_ran/WG1_RL1/TSGR1_98/Docs/R1-1909272.zip [retrieved on Aug. 17, 2019] PDCCH Related Enhancements, p. 1, Paragraph 3.2, Section 4.1.2, p. 21-p. 23, Figure 12.

* cited by examiner

TECHNIQUES FOR GRANT FREE TRANSMISSIONS IN FULL DUPLEX WIRELESS COMMUNICATION SYSTEMS

CROSS REFERENCE

The present application for patent claims the benefit of U.S. Provisional Patent Application No. 63/087,776 by BAI et al., entitled "TECHNIQUES FOR GRANT FREE TRANSMISSIONS IN FULL DUPLEX WIRELESS COMMUNICATION SYSTEMS," filed Oct. 5, 2020 assigned to the assignee hereof, and expressly incorporated by reference herein.

INTRODUCTION

The following relates to wireless communications in wireless communication systems, including managing wireless communications in half duplex and full duplex wireless communication systems.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first device is described. The method may include releasing an uplink resource associated with a semi-persistent uplink transmission during a portion of a transmission time interval (TTI) based on a condition, transmitting, to a second device, a feedback message including an indication that the first device skips the semi-persistent uplink transmission based on releasing the uplink resource, and configuring one or more parameters associated with the portion of the TTI based on the transmitted feedback message, the portion corresponding to an overlap between the semi-persistent uplink transmission and a downlink transmission, the configuration of the one or more parameters associated with the downlink transmission during the portion of the TTI.

An apparatus for wireless communication at a first device is described. The apparatus may include a processor, and memory coupled to the processor. The processor and memory may be configured to release an uplink resource associated with a semi-persistent uplink transmission during a portion of a TTI based on a condition, transmit, to a second device, a feedback message including an indication that the first device skips the semi-persistent uplink transmission based on releasing the uplink resource, and configure one or more parameters associated with the portion of the TTI based on the transmitted feedback message, the portion corresponding to an overlap between the semi-persistent uplink transmission and a downlink transmission, the configuration of the one or more parameters associated with the downlink transmission during the portion of the TTI.

Another apparatus for wireless communication at a first device is described. The apparatus may include means for releasing an uplink resource associated with a semi-persistent uplink transmission during a portion of a TTI based on a condition, means for transmitting, to a second device, a feedback message including an indication that the first device skips the semi-persistent uplink transmission based on releasing the uplink resource, and means for configuring one or more parameters associated with the portion of the TTI based on the transmitted feedback message, the portion corresponding to an overlap between the semi-persistent uplink transmission and a downlink transmission, the configuration of the one or more parameters associated with the downlink transmission during the portion of the TTI.

A non-transitory computer-readable medium storing code for wireless communication at a first device is described. The code may include instructions executable by a processor to release an uplink resource associated with a semi-persistent uplink transmission during a portion of a TTI based on a condition, transmit, to a second device, a feedback message including an indication that the first device skips the semi-persistent uplink transmission based on releasing the uplink resource, and configure one or more parameters associated with the portion of the TTI based on the transmitted feedback message, the portion corresponding to an overlap between the semi-persistent uplink transmission and a downlink transmission, the configuration of the one or more parameters associated with the downlink transmission during the portion of the TTI.

Some examples of the method, apparatuses, and non-transitory computer-readable medium described herein may further include operations, features, means, or instructions for receiving, based on the transmitted feedback message, the downlink transmission during the portion of the TTI using a half duplex configuration, where the configuration corresponds to the half duplex configuration.

Some examples of the method, apparatuses, and non-transitory computer-readable medium described herein may further include operations, features, means, or instructions for receiving, based on refraining to transmit the feedback message, the downlink transmission during the portion of the TTI using a full duplex configuration, where the configuration corresponds to the full duplex configuration.

Some examples of the method, apparatuses, and non-transitory computer-readable medium described herein may further include operations, features, means, or instructions for determining a buffer associated with the first device satisfying a threshold during a first temporal period, the buffer temporarily storing uplink data associated with the semi-persistent uplink transmission, determining the first temporal period satisfying a threshold period before the semi-persistent uplink transmission, and where transmitting, to the second device, the feedback message may be based on the buffer associated with the first device satisfying the threshold, or the first temporal period satisfying the threshold period before the semi-persistent uplink transmission, or both.

Some examples of the method, apparatuses, and non-transitory computer-readable medium described herein may further include operations, features, means, or instructions for configuring the one or more parameters associated with the portion of the TTI may be based on a pre-configuration, a rule, or signaling from the second device, or a combination thereof.

In some examples of the method, apparatuses, and non-transitory computer-readable medium described herein, the signaling includes a radio resource control (RRC) message, a medium access control (MAC) control element (CE) message, or a downlink control information (DCI) message, or a combination thereof.

In some examples of the method, apparatuses, and non-transitory computer-readable medium described herein, the one or more parameters include a modulation and coding scheme, a precoding matrix indicator, a rank indicator, or a transmission configuration indicator state, or a combination thereof.

Some examples of the method, apparatuses, and non-transitory computer-readable medium described herein may further include operations, features, means, or instructions for determining, based on a second indication, a threshold period to transmit, to the second device, the feedback message including the indication that the first device releases the uplink resource associated with the semi-persistent uplink transmission and where transmitting, to the second device, the feedback message may be based on the threshold period.

Some examples of the method, apparatuses, and non-transitory computer-readable medium described herein may further include operations, features, means, or instructions for receiving a radio resource control message including the second indication of the threshold period to transmit, to the second device, the feedback message including the indication that the first device skips the semi-persistent uplink transmission and where transmitting, to the second device, the feedback message may be based on the received radio resource control message including the second indication of the threshold period.

Some examples of the method, apparatuses, and non-transitory computer-readable medium described herein may further include operations, features, means, or instructions for receiving a medium access control-control element message including the second indication of the threshold period to transmit, to the second device, the feedback message including the indication that the first device skips the semi-persistent uplink transmission and where transmitting, to the second device, the feedback message may be based on the received medium access control-control element message including the second indication of the threshold period.

Some examples of the method, apparatuses, and non-transitory computer-readable medium described herein may further include operations, features, means, or instructions for receiving a downlink control information message including the second indication of the threshold period to transmit, to the second device, the feedback message including the indication that the first device skips the semi-persistent uplink transmission and where transmitting, to the second device, the feedback message may be based on the received downlink control information message including the second indication of the threshold period.

Some examples of the method, apparatuses, and non-transitory computer-readable medium described herein may further include operations, features, means, or instructions for determining an earlier TTI to transmit, to the second device, the feedback message including the indication that the first device skips the semi-persistent uplink transmission and transmitting, to the second device, the feedback message in the earlier TTI, where the earlier TTI precedes the TTI, where the TTI and the earlier TTI may be contiguous or noncontiguous.

In some examples of the method, apparatuses, and non-transitory computer-readable medium described herein, the first device may be barred from transmitting the semi-persistent uplink transmission after transmitting, to the second device, the feedback message.

Some examples of the method, apparatuses, and non-transitory computer-readable medium described herein may further include operations, features, means, or instructions for receiving a radio resource control message including a configured grant allocating the semi-persistent uplink transmission and where determining the uplink resource associated with the semi-persistent uplink transmission may be based on the received radio resource control message including the configured grant.

Some examples of the method, apparatuses, and non-transitory computer-readable medium described herein may further include operations, features, means, or instructions for receiving a downlink control information message activating or deactivating a configured grant allocating the uplink resource associated with the semi-persistent uplink transmission and where determining the uplink resource associated with the semi-persistent uplink transmission may be based on the received downlink control information message activating or deactivating the configured grant.

In some examples of the method, apparatuses, and non-transitory computer-readable medium described herein, the TTI includes a mini-slot or a slot.

In some examples of the method, apparatuses, and non-transitory computer-readable medium described herein the first device comprises a user equipment or a distributed unit, and wherein the second device comprises a base station or a centralized unit.

A method for wireless communication at a second device is described. The method may include receiving, from a first device, a feedback message including an indication that the first device skips a semi-persistent uplink transmission during a portion of a TTI and transmitting a downlink transmission during the portion of the TTI based on a set of downlink parameters associated with the received feedback message.

An apparatus for wireless communication at a second device is described. The apparatus may a processor, and memory coupled to the processor. The processor and memory may be configured to receive, from a first device, a feedback message including an indication that the first device skips a semi-persistent uplink transmission during a portion of a TTI and transmit a downlink transmission during the portion of the TTI based on a set of downlink parameters associated with the received feedback message.

Another apparatus for wireless communication at a second device is described. The apparatus may include means for receiving, from a first device, a feedback message including an indication that the first device skips a semi-persistent uplink transmission during a portion of a TTI and means for transmitting a downlink transmission during the portion of the TTI based on a set of downlink parameters associated with the received feedback message.

A non-transitory computer-readable medium storing code for wireless communication at a second device is described. The code may include instructions executable by a processor to receive, from a first device, a feedback message including an indication that the first device skips a semi-persistent uplink transmission during a portion of a TTI and transmit a downlink transmission during the portion of the TTI based on a set of downlink parameters associated with the received feedback message.

Some examples of the method, apparatuses, and non-transitory computer-readable medium described herein may further include operations, features, means, or instructions for determining a modulation and coding scheme based on the received feedback message and where transmitting the downlink transmission during the portion of the TTI may be based on the determined modulation and coding scheme.

Some examples of the method, apparatuses, and non-transitory computer-readable medium described herein may further include operations, features, means, or instructions for determining a precoding matrix indicator or a rank indicator, or both, based on the received feedback message and where transmitting the downlink transmission during the portion of the TTI may be based on the determined precoding matrix indicator or the rank indicator, or both.

Some examples of the method, apparatuses, and non-transitory computer-readable medium described herein may further include operations, features, means, or instructions for determining a transmission configuration indicator state based on the received feedback message and where transmitting the downlink transmission during the portion of the TTI may be based on the determined transmission configuration indicator state.

Some examples of the method, apparatuses, and non-transitory computer-readable medium described herein may further include operations, features, means, or instructions for transmitting, to the first device, a configured grant allocating an uplink resource associated with the semi-persistent uplink transmission during the portion of the TTI.

Some examples of the method, apparatuses, and non-transitory computer-readable medium described herein may further include operations, features, means, or instructions for transmitting a radio resource control message including the configured grant allocating an uplink resource associated with the semi-persistent uplink transmission during the portion of the TTI.

Some examples of the method, apparatuses, and non-transitory computer-readable medium described herein may further include operations, features, means, or instructions for transmitting a downlink control information message activating or deactivating the configured grant allocating an uplink resource associated with the semi-persistent uplink transmission during the portion of the TTI.

Some examples of the method, apparatuses, and non-transitory computer-readable medium described herein may further include operations, features, means, or instructions for transmitting a radio resource control message including a second indication of a threshold period for the first device to transmit, to the second device, the feedback message including the indication that the first device skips the semi-persistent uplink transmission and where receiving, from the first device, the feedback message may be based on the transmitted radio resource control message including the second indication of the threshold period.

Some examples of the method, apparatuses, and non-transitory computer-readable medium described herein may further include operations, features, means, or instructions for transmitting a medium access control-control element message including a second indication of a threshold period for the first device to transmit, to the second device, the feedback message including the indication that the first device skips the semi-persistent uplink transmission and where receiving, from the first device, the feedback message may be based on the transmitted medium access control-control element message including the second indication of the threshold period.

Some examples of the method, apparatuses, and non-transitory computer-readable medium described herein may further include operations, features, means, or instructions for transmitting a downlink control information message including a second indication of a threshold period for the first device to transmit, to the second device, the feedback message including the indication that the first device skips the semi-persistent uplink transmission and where receiving, from the first device, the feedback message may be based on the transmitted downlink control information message including the second indication of the threshold period.

In some examples of the method, apparatuses, and non-transitory computer-readable medium described herein, the first device may be barred from transmitting the semi-persistent uplink transmission after the second device received the feedback message.

In some examples of the method, apparatuses, and non-transitory computer-readable medium described herein, the TTI includes a mini-slot or a slot.

In some examples of the method, apparatuses, and non-transitory computer-readable medium described herein the first device comprises a user equipment or a distributed unit, and wherein the second device comprises a base station or a centralized unit.

A method of wireless communication at a UE is described. The method may include determining an uplink resource associated with a semi-persistent uplink transmission during a portion of a TTI, determining to release the uplink resource associated with the semi-persistent uplink transmission during the portion of the TTI based on a condition, and transmitting, to a base station, a feedback message including an indication that the UE skips the semi-persistent uplink transmission based on determining to release the uplink resource.

An apparatus for wireless communication is described. The apparatus may include a processor, memory coupled to the processor, the processor and memory configured to determine an uplink resource associated with a semi-persistent uplink transmission during a portion of a TTI, determine to release the uplink resource associated with the semi-persistent uplink transmission during the portion of the TTI based on a condition, and transmit, to a base station, a feedback message including an indication that the UE skips the semi-persistent uplink transmission based on determining to release the uplink resource.

Another apparatus for wireless communication is described. The apparatus may include means for determining an uplink resource associated with a semi-persistent uplink transmission during a portion of a TTI, means for determining to release the uplink resource associated with the semi-persistent uplink transmission during the portion of the TTI based on a condition, and means for transmitting, to a base station, a feedback message including an indication that the UE skips the semi-persistent uplink transmission based on determining to release the uplink resource.

A non-transitory computer-readable medium storing code for wireless communication at a UE is described. The code may include instructions executable by a processor to determine an uplink resource associated with a semi-persistent uplink transmission during a portion of a TTI, determine to release the uplink resource associated with the semi-persistent uplink transmission during the portion of the TTI based on a condition, and transmit, to a base station, a feedback message including an indication that the UE skips the semi-persistent uplink transmission based on determining to release the uplink resource.

Some examples of the method, apparatuses, and non-transitory computer-readable medium described herein may further include operations, features, means, or instructions for determining a configuration associated with the portion of the TTI, the portion corresponding to an overlap between the semi-persistent uplink transmission and a downlink transmission, based at least in part on the transmitted feedback message, the configuration comprising one or more parameters associated with the downlink transmission during the portion of the TTI.

Some examples of the method, apparatuses, and non-transitory computer-readable medium described herein may further include operations, features, means, or instructions for receiving, based at least in part on the transmitted feedback message, the downlink transmission during the portion of the TTI using a half duplex configuration, wherein the configuration corresponds to the half duplex configuration.

Some examples of the method, apparatuses, and non-transitory computer-readable medium described herein may further include operations, features, means, or instructions for receiving, based at least in part on refraining to transmit the feedback message, the downlink transmission during the portion of the TTI using a full duplex configuration, wherein the configuration corresponds to the full duplex configuration.

In some examples of the method, apparatuses, and non-transitory computer-readable medium described herein, determining the configuration associated with the portion of the TTI is based at least in part on a pre-configuration, a rule, or a signaling from the base station, or a combination thereof.

In some examples of the method, apparatuses, and non-transitory computer-readable medium described herein, the signaling comprises a RRC message, a MAC-CE message, or a DCI message, or a combination thereof.

In some examples of the method, apparatuses, and non-transitory computer-readable medium described herein, the one or more downlink parameters includes a modulation and coding scheme (MCS), a precoding matrix indicator (PMI), a rank indicator (RI), or a transmission configuration indicator (TCI) state, or a combination thereof.

Some examples of the method, apparatuses, and non-transitory computer-readable medium described herein may further include operations, features, means, or instructions for determining a buffer associated with the UE satisfying a threshold during a first temporal period, the buffer temporarily storing uplink data associated with the semi-persistent uplink transmission, determining the first temporal period satisfying a threshold period before the semi-persistent uplink transmission. In some examples of the method, apparatuses, and non-transitory computer-readable medium described herein, transmitting, to the base station, the feedback message may be based on the buffer associated with the UE satisfying the threshold, or the first temporal period satisfying the threshold period before the semi-persistent uplink transmission, or both.

Some examples of the method, apparatuses, and non-transitory computer-readable medium described herein may further include operations, features, means, or instructions for determining, based on a second indication, a threshold period to transmit, to the base station, the feedback message including the indication that the UE releases the uplink resource associated with the semi-persistent uplink transmission. In some examples of the method, apparatuses, and non-transitory computer-readable medium described herein, transmitting, to the base station, the feedback message may be based on the threshold period.

Some examples of the method, apparatuses, and non-transitory computer-readable medium described herein may further include operations, features, means, or instructions for receiving a radio resource control message including the second indication of the threshold period to transmit, to the base station, the feedback message including the indication that the UE skips the semi-persistent uplink transmission. In some examples of the method, apparatuses, and non-transitory computer-readable medium described herein, transmitting, to the base station, the feedback message may be based on the received radio resource control message including the second indication of the threshold period.

Some examples of the method, apparatuses, and non-transitory computer-readable medium described herein may further include operations, features, means, or instructions for receiving a medium access control-control element message including the second indication of the threshold period to transmit, to the base station, the feedback message including the indication that the UE skips the semi-persistent uplink transmission. In some examples of the method, apparatuses, and non-transitory computer-readable medium described herein, transmitting, to the base station, the feedback message may be based on the received medium access control-control element message including the second indication of the threshold period.

Some examples of the method, apparatuses, and non-transitory computer-readable medium described herein may further include operations, features, means, or instructions for receiving a downlink control information message including the second indication of the threshold period to transmit, to the base station, the feedback message including the indication that the UE skips the semi-persistent uplink transmission. In some examples of the method, apparatuses, and non-transitory computer-readable medium described herein, transmitting, to the base station, the feedback message may be based on the received downlink control information message including the second indication of the threshold period.

Some examples of the method, apparatuses, and non-transitory computer-readable medium described herein may further include operations, features, means, or instructions for determining an earlier TTI to transmit, to the base station, the feedback message including the indication that the UE skips the semi-persistent uplink transmission, and transmitting, to the base station, the feedback message in the earlier TTI, where the earlier TTI precedes the TTI.

In some examples of the method, apparatuses, and non-transitory computer-readable medium described herein, the TTI and the earlier TTI may be contiguous.

In some examples of the method, apparatuses, and non-transitory computer-readable medium described herein, the TTI and the earlier TTI may be noncontiguous.

In some examples of the method, apparatuses, and non-transitory computer-readable medium described herein, the UE may be barred from transmitting the semi-persistent uplink transmission after transmitting, to the base station, the feedback message.

Some examples of the method, apparatuses, and non-transitory computer-readable medium described herein may further include operations, features, means, or instructions for receiving a radio resource control message including a configured grant allocating the semi-persistent uplink transmission. In some examples of the method, apparatuses, and non-transitory computer-readable medium described herein, determining the uplink resource associated with the semi-persistent uplink transmission may be based on the received radio resource control message including the configured grant.

Some examples of the method, apparatuses, and non-transitory computer-readable medium described herein may further include operations, features, means, or instructions for receiving a downlink control information message activating or deactivating a configured grant allocating the uplink resource associated with the semi-persistent uplink transmission. In some examples of the method, apparatuses, and non-transitory computer-readable medium described herein, determining the uplink resource associated with the semi-persistent uplink transmission may be based on the received downlink control information message activating or deactivating the configured grant.

In some examples of the method, apparatuses, and non-transitory computer-readable medium described herein, the portion of the TTI includes a set of orthogonal frequency-division multiplexing (OFDM) symbols.

In some examples of the method, apparatuses, and non-transitory computer-readable medium described herein, the set of OFDM symbols includes at least one OFDM symbol before the portion of the TTI or at least one OFDM symbol after the portion of the TTI, or both.

In some examples of the method, apparatuses, and non-transitory computer-readable medium described herein, the TTI includes a mini-slot.

In some examples of the method, apparatuses, and non-transitory computer-readable medium described herein, the TTI includes a slot.

A method of wireless communication at a base station is described. The method may include receiving, from a UE, a feedback message including an indication that the UE skips a semi-persistent uplink transmission during a portion of a TTI, determining a set of downlink parameters based on the received feedback message, and transmitting a downlink transmission during the portion of the TTI based on the determined set of downlink parameters.

An apparatus for wireless communication is described. The apparatus may include a processor, memory coupled to the processor, the processor and memory configured to receive, from a UE, a feedback message including an indication that the UE skips a semi-persistent uplink transmission during a portion of a TTI, determine a set of downlink parameters based on the received feedback message, and transmit a downlink transmission during the portion of the TTI based on the determined set of downlink parameters.

Another apparatus for wireless communication is described. The apparatus may include means for receiving, from a UE, a feedback message including an indication that the UE skips a semi-persistent uplink transmission during a portion of a TTI, means for determining a set of downlink parameters based on the received feedback message, and means for transmitting a downlink transmission during the portion of the TTI based on the determined set of downlink parameters.

A non-transitory computer-readable medium storing code for wireless communication at a base station is described. The code may include instructions executable by a processor to receive, from a UE, a feedback message including an indication that the UE skips a semi-persistent uplink transmission during a portion of a TTI, determine a set of downlink parameters based on the received feedback message, and transmit a downlink transmission during the portion of the TTI based on the determined set of downlink parameters.

Some examples of the method, apparatuses, and non-transitory computer-readable medium described herein may further include operations, features, means, or instructions for determining an MCS based on the received feedback message. In some examples of the method, apparatuses, and non-transitory computer-readable medium described herein, transmitting the downlink transmission during the portion of the TTI may be based on the determined MCS.

Some examples of the method, apparatuses, and non-transitory computer-readable medium described herein may further include operations, features, means, or instructions for determining a PMI or a RI, or both, based on the received feedback message. In some examples of the method, apparatuses, and non-transitory computer-readable medium described herein, transmitting the downlink transmission during the portion of the TTI may be based on the determined PMI or the determined RI, or both.

Some examples of the method, apparatuses, and non-transitory computer-readable medium described herein may further include operations, features, means, or instructions for determining a TCI state based on the received feedback message. In some examples of the method, apparatuses, and non-transitory computer-readable medium described herein, transmitting the downlink transmission during the portion of the TTI may be based on the determined TCI state.

Some examples of the method, apparatuses, and non-transitory computer-readable medium described herein may further include operations, features, means, or instructions for transmitting, to the UE, a configured grant allocating an uplink resource associated with the semi-persistent uplink transmission during the portion of the TTI.

Some examples of the method, apparatuses, and non-transitory computer-readable medium described herein may further include operations, features, means, or instructions for transmitting a radio resource control message including the configured grant allocating an uplink resource associated with the semi-persistent uplink transmission during the portion of the TTI.

Some examples of the method, apparatuses, and non-transitory computer-readable medium described herein may further include operations, features, means, or instructions for transmitting a downlink control information message activating or deactivating the configured grant allocating an uplink resource associated with the semi-persistent uplink transmission during the portion of the TTI.

Some examples of the method, apparatuses, and non-transitory computer-readable medium described herein may further include operations, features, means, or instructions for transmitting a radio resource control message including a second indication of a threshold period for the UE to transmit, to the base station, the feedback message including the indication that the UE skips the semi-persistent uplink transmission. In some examples of the method, apparatuses, and non-transitory computer-readable medium described herein, receiving, from the UE, the feedback message may be based on the transmitted radio resource control message including the second indication of the threshold period.

Some examples of the method, apparatuses, and non-transitory computer-readable medium described herein may further include operations, features, means, or instructions for transmitting a medium access control-control element message including a second indication of a threshold period for the UE to transmit, to the base station, the feedback message including the indication that the UE skips the semi-persistent uplink transmission. In some examples of the method, apparatuses, and non-transitory computer-readable medium described herein, receiving, from the UE, the feedback message may be based on the transmitted medium access control-control element message including the second indication of the threshold period.

Some examples of the method, apparatuses, and non-transitory computer-readable medium described herein may further include operations, features, means, or instructions for transmitting a downlink control information message including a second indication of a threshold period for the UE to transmit, to the base station, the feedback message including the indication that the UE skips the semi-persistent uplink transmission. In some examples of the method, apparatuses, and non-transitory computer-readable medium described herein, receiving, from the UE, the feedback message may be based on the transmitted downlink control information message including the second indication of the threshold period.

In some examples of the method, apparatuses, and non-transitory computer-readable medium described herein, the UE may be barred from transmitting the semi-persistent uplink transmission after the base station received the feedback message.

In some examples of the method, apparatuses, and non-transitory computer-readable medium described herein, the TTI includes a mini-slot.

In some examples of the method, apparatuses, and non-transitory computer-readable medium described herein, the TTI includes a slot.

DETAILED DESCRIPTION

Figure 1:
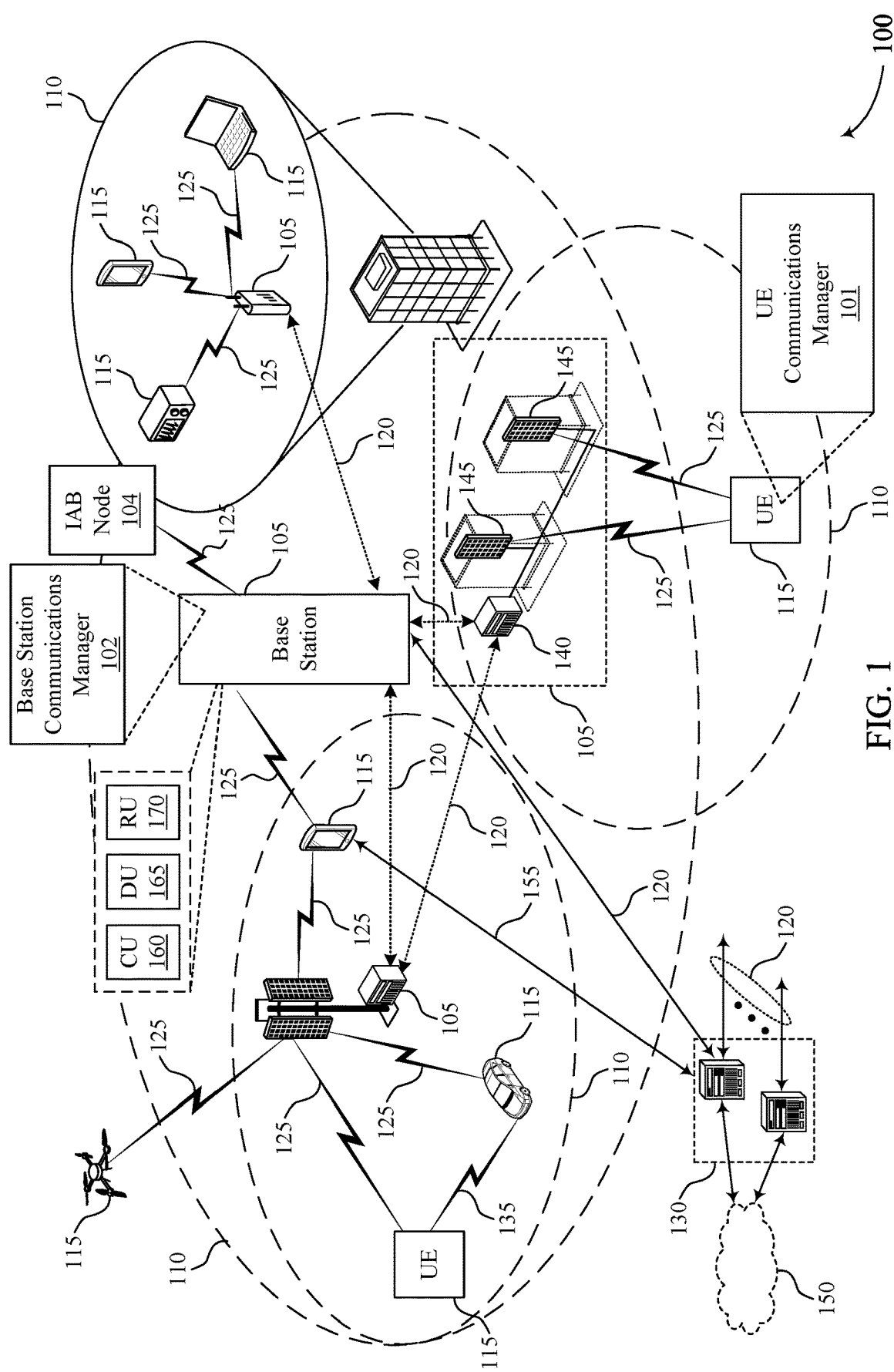
FIGS. 1 and 2 illustrate examples of wireless communication systems that support techniques for grant free transmissions in accordance with one or more aspects of the present disclosure.

A wireless communications system may include a communication device, such as a UE and a base station (e.g., an eNodeB (eNB), a next-generation NodeB or a giga-NodeB, either of which may be referred to as a gNB, or some other base station), that support wireless communications over one or multiple radio access technologies. Examples of radio access technologies include 4G systems, such as LTE systems, and 5G systems, which may be referred to as NR systems. The communication device may operate in a half duplex mode or a full duplex mode, or a combination thereof. For example, in a half duplex mode, a UE may either transmit uplink communications or receive downlink communications during a TTI. In the full duplex mode, the UE may simultaneously transmit uplink communications and receive downlink communications during the TTI. A TTI may span one or more time resources (e.g., symbols, mini-slots, slot, etc.). As described herein simultaneous wireless communication by a base station or a UE, or both, may include uplink transmission, uplink reception, downlink transmission, or downlink reception, or a combination thereof, that occurs at the same time (e.g., a symbol period, a mini-slot, a slot, etc.). In some examples, the simultaneous wireless communication may be referred to as overlapping communications (e.g., a semi-persistent transmission overlapping in time with a dynamic transmission may be communicated in a same or overlapping time duration).

A UE may be configured to operate in a half duplex mode during a portion (e.g., a half duplex portion) of a TTI and in a full duplex mode during another portion (e.g., a full duplex portion) of the TTI. In some examples, the UE may exclusively receive a downlink transmission, from a base station, during the half duplex portion of the TTI, in which the UE is operating in the half duplex mode. Alternatively, the UE may exclusively transmit an uplink transmission, to the base station, during the half duplex portion of the TTI, in which the UE is operating in the half duplex mode. In some other examples, the UE may be configured to simultaneously transmit, to the base station, an uplink transmission (e.g., a semi-persistent uplink transmission (also referred to as a grant free uplink transmission or a configured grant uplink transmission)) and receive a downlink transmission, from the base station, during the other portion (e.g., the full duplex portion) of TTI when the UE is operating in the full duplex mode.

A UE may, in some cases, determine to skip an uplink transmission (e.g., a semi-persistent uplink transmission) based on uplink traffic conditions. To increase a downlink throughput to the UE, the UE may be configured to signal to a base station that the UE is skipping the uplink transmission during a full duplex portion of a TTI (e.g., one or more symbols, mini-slots, slots). The UE may, for example, transmit a feedback message (e.g., in uplink control information (UCI)) to the base station ahead of the uplink transmission to let the base station know that no uplink transmission will occur during the full duplex portion of the TTI. Once the feedback message is transmitted, the UE might be barred from transmitting the uplink transmission (e.g., a semi-persistent uplink transmission). In other words, the UE may be configured to drop or skip the uplink transmission once the feedback message is transmitted. Upon receiving the feedback message, the base station may use a same or different configuration for downlink transmission across the TTI.

A base station may be configured to transmit a downlink transmission, to a UE, based on a set of parameter (e.g., an MCS, a PMI, a RI, a transmission configuration indicator (TCI) state, etc.) when the UE is operating in a half duplex mode. Alternatively, the base station may be configured to transmit a downlink transmission, to a UE, based on another set of parameters (e.g., an MCS (a lower MCS), a PMI, a RI, a TCI state (such as different downlink beams associated with different TCI states), etc.) when the UE is operating in a full duplex mode, to reduce self-interference issues at the UE. However, when the UE skips an uplink transmission during the full duplex portion of the TTI where the UE is configured to operate in a full duplex mode (i.e., support both receiving and transmitting), the base station may use a downlink configuration (e.g., a set of parameters) associated with the half duplex portion of the TTI, where the UE is configured to operate in a half duplex mode. For example, in response to receiving the feedback message, the base station may use the same downlink configuration used for the half duplex portion, for the downlink transmission across the full duplex portion of the TTI. Otherwise, if the UE does not skip the uplink transmission, the base station may use different downlink configurations for the full duplex and the half duplex portions of the TTI. Such techniques may enable the UE to indicate that the UE will skip the uplink transmission, and as such, the base station may be enabled to use the various downlink configurations described above to increase throughput and realize efficient communications based on whether the UE is skipping the uplink transmission.

The UE may be configured to determine a downlink configuration for an overlapping portion of the TTI (e.g., a portion of the TTI that includes both downlink communications and uplink communications at the UE). That is, the overlapping portion of the TTI may be a portion of a TTI in which the UE is configured to receive downlink transmission from the base station, as well as transmit uplink transmissions to the base station. In some cases, the UE may be configured to determine the downlink configuration based on whether the feedback message is transmitted or not. For example, if the feedback message is not transmitted, the UE may prepare to receive the downlink transmission according to a downlink configuration (e.g., a full duplex configuration) specific for the overlapping portion of the TTI. Otherwise, if the feedback message is transmitted, the UE may prepare to receive the downlink transmission according to a downlink configuration (e.g., a half duplex configuration) specific for the portion of the TTI since there will be no uplink transmissions in the portion of TTI.

The UE may be configured to determine the configuration based on a pre-configuration, a rule, or a signaling (e.g., an RRC message, a MAC-CE message, a downlink control information (DCI) message, etc.) from the base station, or a combination thereof. In some examples, the UE may determine the downlink configuration based on rules, for example, if full duplex communications will happen, then the downlink might always be communicated via a single layer. In some other examples, the UE may determine the downlink configuration based on a pre-configuration by the base station. For example, the base station may configure two sets of configurations, one for half duplex, the other for full duplex. The UE may select which one to use based on whether the feedback message is sent or not. Alternatively, based on the base station signaling, the UE may determine the configuration for downlink.

Aspects of the subject matter described in the disclosure may be implemented to increase efficiency of duplex communications at one or more communication devices. In some examples, configuring the communication devices to support techniques for providing feedback related to semi-persistent uplink transmissions may result in reduced power consumption, increased spectral efficiency, and, in some examples, may promote higher reliability and lower latency duplex communications, among other benefits.

Aspects of the disclosure are initially described in the context of wireless communication systems. Aspects of the disclosure are further illustrated by and described with reference to apparatus diagrams, system diagrams, and flowcharts that relate to techniques for grant free transmissions in full duplex wireless communication systems.

FIG. 1 illustrates an example of a wireless communications system 100 that supports techniques for grant free transmissions in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). A slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

A UE 115 may be configured to employ operating modes that reduce power consumption, such as half duplex communications (e.g., a mode that supports one-way communication via transmission or reception, but not transmission and reception simultaneously). In some examples, half duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

A communication device (e.g., a base station, a UE, etc.) may be configured with multiple antennas, which may be used to transmit and receive communications while operating in a full-duplex mode. In some cases, the communication device may be configured with multiple antennas panels for uplink communications and downlink communications. In some cases, the communication device may experience self-interference as a result of using the multiple antenna panels for the uplink communication and the downlink communications (e.g., in a full-duplex mode) at a same time. In some cases, the self-interference may occur due to signal leakage between a transmit antenna and a receive antenna.

In the wireless communication system 100, a UE 115 or a base station 105, or both, may support half duplex communications or full duplex communications, or a combination thereof. For example, a UE 115 may operate in a half duplex mode, in which the UE 115 may either receive downlink communications from a base station 105, or transmit uplink communication to the base station 105, during a TTI. Similarly, a base station 105 may operate in a half duplex mode, in which the base station 105 may either transmit downlink communications to a UE 115, or receive uplink communication from the UE 115, during a TTI. In some cases, a UE 115 or a base station 105, or both, may experience self-interference when operating in a full duplex mode. In some examples, the self-interference may occur due to signal leakage between a transmit antenna and a receive antenna. In some examples, the self-interference may occur from a transmit antenna to a receive chain due to a proxy of a UE 115 or a base station 105, or both. In some other examples, the self-interference may occur from a transmit antenna to a receive chain due to one or more signal reflections as a result of local antenna clutter. In some cases, a self-interference from a transmit signal may be as strong as receive signal with cancellation techniques (e.g., analog cancellation operations, digital cancellation operations, etc.).

A UE 115 or a base station 105, or both, when operating in a full duplex mode may use different BWPs to reduce a self-interference. That is, a UE 115 or a base station 105, or both, may use different BWPs for downlink communications and uplink communications. For example, a UE 115 may use one BWP for receiving downlink transmission from a base station 105, and another BWP for transmitting uplink transmissions to the base station 105. Similarly, a base station 105 may use one BWP for transmitting downlink transmission to a UE 115, and another BWP for receiving uplink transmissions from the UE 115. In some cases, reducing or mitigating self-interference may improve spectrum efficiency in the wireless communication system 100. In some other cases, reducing or mitigating self-interference may provide a higher reliability and a lower latency for wireless communications between a UE 115 and a base station 105, or between at least two UEs 115 (e.g., in D2D wireless communications), etc.

The wireless communication system 100 may, additionally or alternatively, support decreasing or eliminating self-interference based on beam pair selection. A base station 105 or a UE 115, or both, may reduce or mitigate self-interference based selection of uplink and downlink beam pair. For example, a base station 105 or a UE 115, or both, may select a transmit beam (e.g., a transmit uplink beam, a transmit downlink beam) and a receive beam (e.g. a receive uplink beam, a receive downlink beam) from different antenna panels or beams with different spatial directions and orientations, or the like. In some examples, a base station 105 or a UE 115, or both, may select uplink and downlink beam pairs based on a beam training procedure using simultaneous reference signal sweeping operations (e.g. channel state information reference signals (CSI-RS), sounding reference signals (SRS), etc.). In a full duplex mode, a base station 105 or a UE 115, or both, may use two beam pair links for uplink and downlink balancing a signal strength in an intended link and self-interference. For example, if an uplink beam changes then the UE 115 may also update a downlink beam.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105. The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network, and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for grant free transmissions in wireless communications as described herein. For example, some operations described as being performed by a UE 115 or a base station 105 may additionally or alternatively be performed by components of the disaggregated RAN architecture (e.g., IAB nodes, DUs, CUs, etc.).

In the wireless communications system 100 a UE 115 and a base station 105 (e.g., an eNodeB (eNB), a next-generation NodeB or a giga-NodeB, either of which may be referred to as a gNB, or some other base station), may support wireless communications over one or multiple radio access technologies. Examples of radio access technologies include 4G systems, such as LTE systems, and 5G systems, which may be referred to as NR systems. The base station 105 and the UE 115 may operate in a half duplex mode or a full duplex mode, or a combination thereof. The wireless communications system 100 may be configured to support techniques for semi-persistent uplink transmissions for full duplex mode operations. For example, a UE 115 may include a UE communications manager 101 that enables the UE 115 to determine an uplink resource associated with a semi-persistent uplink transmission during a portion of a TTI. The UE may determine, via the UE communications manager 101, to release the uplink resource associated with the semi-persistent uplink transmission during the portion of the TTI based on a condition. The UE may, as a result, transmit, to a base station, via the UE communications manager 101, a feedback message including an indication that the UE 115 skips the semi-persistent uplink transmission based on determining to release the uplink resource or releasing the uplink resource, or both. A base station 105 may include a base station communications manager 102 that enables the base station 105 to receive, from a UE 115, a feedback message including an indication that the UE 115 skips a semi-persistent uplink transmission during a portion of a TTI. The base station 105 may, via the base station communications manager 102, determine a set of downlink parameters based on the received feedback message, and transmit a downlink transmission during the portion of the TTI based on the determined set of downlink parameters.

Figure 2:
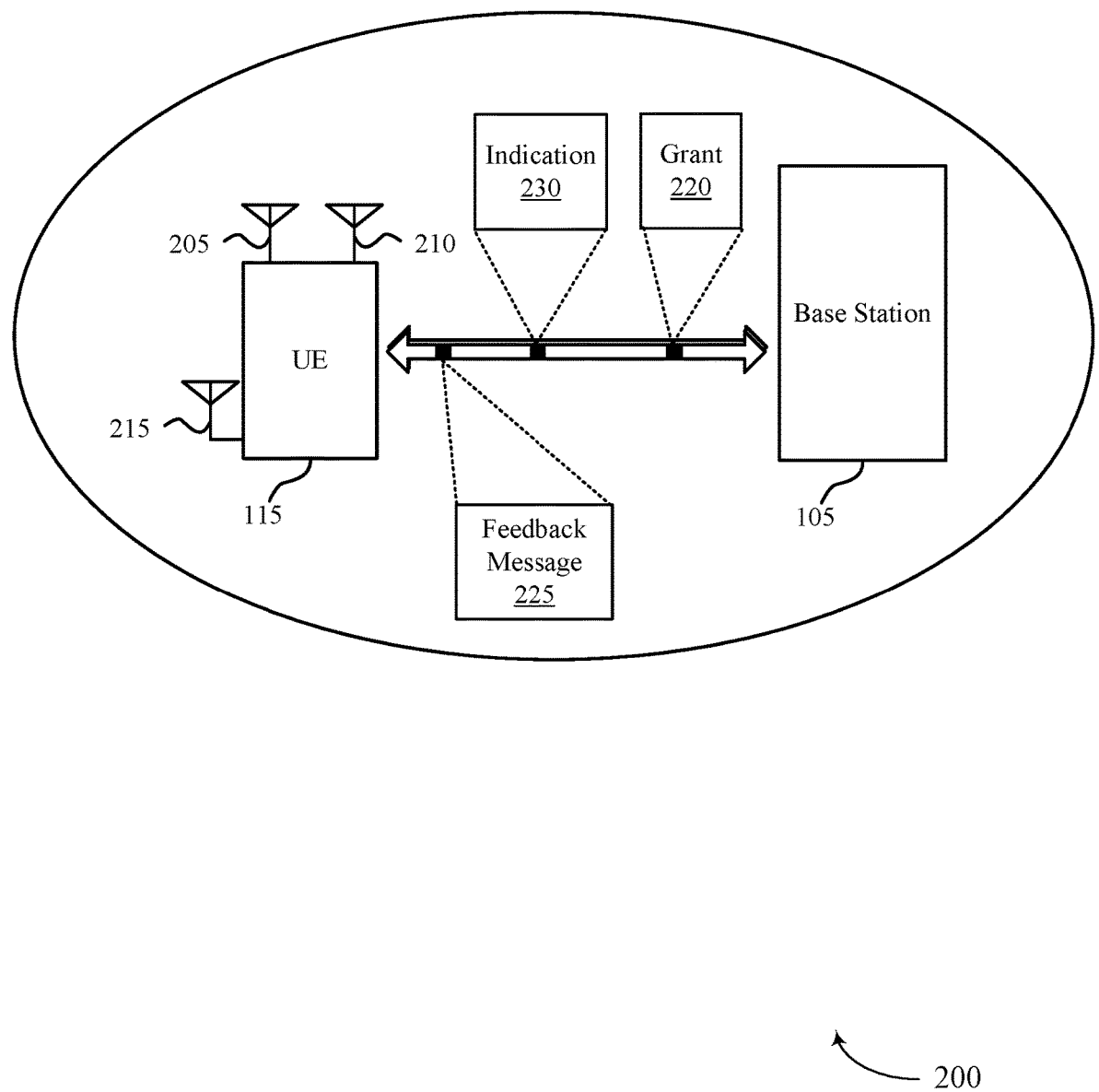

FIG. 2 illustrates an example of a wireless communication system 200 that supports techniques for grant free transmissions in full duplex wireless communication systems in accordance with one or more aspects of the present disclosure. The wireless communications system 200 may implement aspects of the wireless communications system 100. For example, the wireless communications system 200 may include a base station 105 and a UE 115, which may be examples of a base station 105 and a UE 115 as described herein. The wireless communications system 200 may support multiple radio access technologies including 4G systems such as LTE systems, LTE-A systems, or LTE-A Pro systems, and 5G systems, which may be referred to as NR systems.

The base station 105 and the UE 115 may be configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming. For example, the base station 105 antennas or antenna arrays may be co-located at an antenna assembly, such as an antenna tower. In some examples, antennas or antenna arrays associated with the base station 105 may be located in diverse geographic locations. The base station 105 may have an antenna array with a number of rows and columns of antenna ports that the base station 105 may use to support beamforming of communications with the UE 115. Likewise, the UE 115 may have one or more antenna arrays that may support various multiple-input multiple-output or beamforming operations. Additionally or alternatively, an antenna panel may support radio frequency beamforming for a signal transmitted via one or more antenna ports. The base station 105 and the UE 115 may thus be configured to support directional communications (e.g., beamformed communications) using the multiple antennas.

In the example of FIG. 2, when the base station 105 and the UE 115 are configured with multiple antenna panels, where one antenna panel may be dedicated for downlink communications and another antenna panel may be dedicated for uplink communications, the base station 105 and the UE 115 may experience self-interference. The self-interference may be a result of simultaneously using multiple antenna panels for uplink communications and downlink communications (e.g., in full duplex communications). In some examples, the self-interference may occur due to signal leakage between a transmit antenna 205 and a receive antenna 210. In some other examples, the self-interference may occur due to signal leakage between a transmit antenna 215 and the receive antenna 210, but this self-interference may be less compared to the self-interference between the transmit antenna 205 and the receive antenna 210. The base station 105 or the UE 115, or both, may manage (e.g., reduce or eliminate) self-interference at the base station 105 or the UE 115, or both, by managing transmissions when the base station 105 or the UE 115, or both, are operating in a full duplex mode.

The base station 105 or the UE 115, or both may operate in a half duplex mode or a full duplex mode, or a combination thereof. For example, in a half duplex mode, the UE 115 may either transmit uplink communications or receive downlink communications during one or more TTIs. In the full duplex mode, the UE 115 may simultaneously transmit uplink communications and receive downlink communications during the one or more TTIs. A TTI may span one or more time resources (e.g., symbols, mini-slots, slot, etc.) and one or more frequency resources (e.g., subcarriers, carriers, etc.). The UE 115 may be configured to operate in a half duplex mode during a portion (e.g., a half duplex portion) of a TTI and a full duplex mode during another portion (e.g., a full duplex portion) of the TTI, as described in FIGS. 3 and 4, respectively.

In some examples, the UE 115 may receive a downlink transmission, from the base station 105, during the half duplex portion of the TTI, in which the UE 115 is operating in the half duplex mode. Alternatively, the UE 115 may exclusively transmit an uplink transmission, to the base station 105, during the half duplex portion of the TTI, in which the UE 115 is operating in the half duplex mode. In some other examples, the UE 115 may be configured to simultaneously transmit, to the base station 105, an uplink transmission (e.g., a semi-persistent uplink transmission) and receive a downlink transmission, from the base station 105, during the other portion (e.g., the full duplex portion) of TTI when the UE 115 is operating in the full duplex mode, as described in FIGS. 3 and 4, respectively.

The base station 105 may transmit, to the UE 115, an RRC message including a configured grant 220 allocating an uplink transmission (e.g., a semi-persistent uplink transmission). In some examples, the base station 105 may transmit, to the UE 115, a DCI message activating or deactivating the configured grant 220 allocating one or more uplink resources (e.g., symbols, mini-slots, slots, subframe, frames, subcarriers, carriers, etc.) associated with the uplink transmission (e.g., a semi-persistent uplink transmission). The UE 115 may, in some cases, determine to skip an uplink transmission (e.g., a semi-persistent uplink transmission) based on uplink traffic conditions. For example, the UE 115 may determine one or more uplink resources associated with a semi-persistent uplink transmission during a portion of a TTI, which may be a mini-slot or a slot, or a combination thereof. The portion of the TTI may include a set of OFDM symbols. The set of OFDM symbols may include at least one OFDM symbol before the portion of the TTI or at least one OFDM symbol after the portion of the TTI, or both.

To increase a downlink throughput to the UE 115, the UE 115 may be configured to signal to the base station 105 that the UE 115 is skipping the semi-persistent uplink transmission during the portion of the TTI (e.g., one or more symbols, mini-slots, slots). The UE 115 may, for example, transmit a feedback message 225 to the base station 105 ahead of the semi-persistent uplink transmission to let the base station 105 know that no semi-persistent uplink transmission will occur during the portion of the TTI. The UE 115 may transmit the feedback message 225 based on one or more conditions. The UE 115 may, for example, determine a buffer associated with the UE 115 satisfying a threshold during a first temporal period. The UE 115 may determine that the first temporal period satisfies a threshold period before the semi-persistent uplink transmission. In other words, the feedback message 225 may be transmitted when the buffer at a time Y is lower than a threshold, and Y is X time ahead of the semi-persistent uplink transmission.

The UE 115 may determine a threshold period to transmit, to the base station 105, the feedback message 225. That is, the amount of time X may be preconfigured or based on a configuration. For example, the base station 105 may transmit, and the UE 115 may receive, an indication 230 of the threshold period (e.g., a threshold period 330 as described with reference to FIG. 3) in an RRC message, a MAC-CE message, or a DCI message, or a combination thereof. In other examples, the UE 115 may determine an earlier TTI to transmit, to the base station 105, the feedback message 225 based on the threshold period. The TTI and the earlier TTI may be contiguous or noncontiguous. For example, the UE 115 may determine to transmit the feedback message in (m–n)-th TTI (e.g., mini-slot, slot) to indicate no semi-persistent uplink transmission in a m-th TTI (e.g., mini-slot, slot).

Once the feedback message 225 is transmitted, the UE 115 might be barred from transmitting the uplink transmission (e.g., a semi-persistent uplink transmission). Based on whether the feedback message 225 is transmitted by the UE 115, the UE 115 prepares to receive downlink communications accordingly. Upon receiving the feedback message 225, the base station 105 may use a same or different configuration for downlink transmission across the TTI. The base station 105 may be configured to transmit a downlink transmission, to the UE 115, based on a set of parameter (e.g., an MCS, a PMI, a RI, a TCI state, etc.) when the UE 115 is operating in a half duplex mode. Alternatively, the base station 105 may be configured to transmit a downlink transmission, to the UE 115, based on another set of parameter (e.g., an MCS (a lower MCS), a PMI, a RI, a TCI state (different downlink beams), etc.) when the UE 115 is operating in a full duplex mode, to reduce self-interference issues at the UE.

In some examples, however, when the UE 115 skips an uplink transmission during the full duplex portion of the TTI where the UE 115 is configured to operate in a full duplex mode (i.e., support both receiving and transmitting), the base station 105 may use a configuration (e.g., a set of parameters) associated with the half duplex portion of the TTI, where the UE 115 is configured to operate in a half duplex mode. For example, in response to receiving the feedback message 225, the base station 105 may use the same configuration used for the half duplex portion, for the downlink transmission across the full duplex portion of the TTI. Otherwise, if the UE 115 does not skip the uplink transmission, the base station 105 may use different downlink configurations for the full duplex and the half duplex portions of the TTI to reduce or mitigate self-interference.

The UE 115 may be configured to determine a downlink configuration for an overlapping portion of the TTI. That is, a portion of a TTI in which the UE 115 is configured to receive downlink transmission from the base station 105, as well as transmit uplink transmissions to the base station. In some cases, the UE 115 may be configured to determine the downlink configuration based on whether the feedback message is transmitted or not. For example, if the feedback message is not transmitted, the UE 115 may prepare to receive the downlink transmission according to a downlink configuration (e.g., a full duplex configuration) specific for the portion of the TTI. Otherwise, if the feedback message is not transmitted, the UE 115 may prepare to receive the downlink transmission according to a downlink configuration (e.g., a half duplex configuration) specific for the portion of the TTI since there will be no uplink transmissions in the portion of TTI.

The UE 115 may be configured to determine the configuration based on a pre-configuration, a rule, or a signaling (e.g., an RRC message, a MAC-CE message, a DCI message, etc.) from the base station 150, or a combination thereof. In some examples, the UE 115 may determine the downlink configuration based on rules, for example, if full duplex communications will happen, then the downlink might always be a single layer. In some other examples, the UE 115 may determine the downlink configuration based on a pre-configuration by the base station 105. For example, the base station may configure two sets of configurations, one for half duplex, the other for full duplex. The UE 115 may select which one to use based on whether the feedback message is sent or not. Alternatively, based on the bas station 105 signaling, the UE 115 may determine the configuration for downlink transmission.

Figure 3:
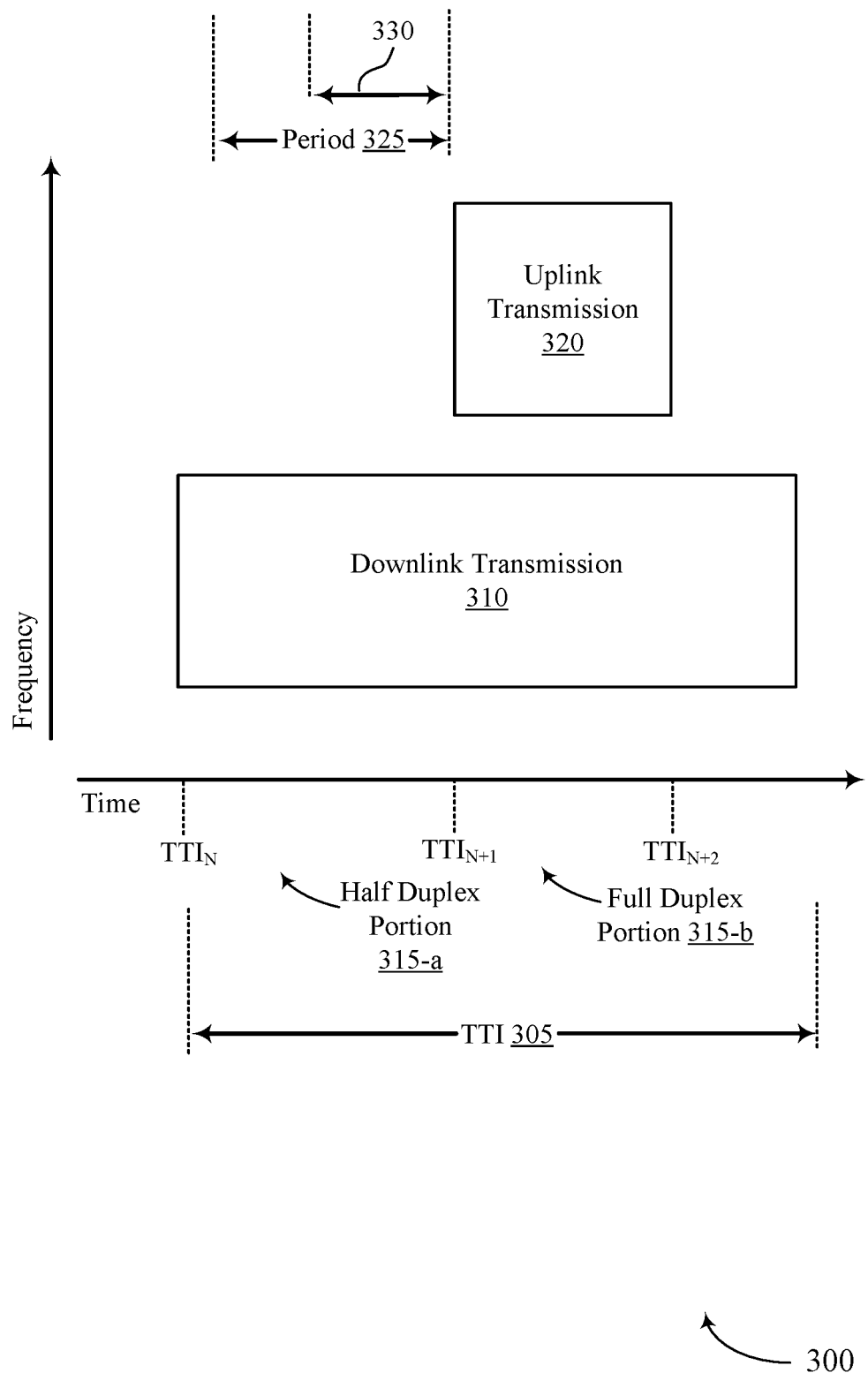
FIGS. 3 and 4 illustrate examples of downlink and uplink configurations that support techniques for grant free transmissions in full duplex wireless communication systems in accordance with one or more aspects of the present disclosure.

FIG. 3 illustrates an example of a downlink and uplink configuration 300 that supports techniques for grant free transmissions in full duplex wireless communication systems in accordance with one or more aspects of the present disclosure. The downlink and uplink configuration 300 may implement aspects of the wireless communications system 100 and the wireless communications system 200 described with reference to FIGS. 1 and 2, respectively. In the example of FIG. 3, a base station 105 or a UE 115, or both, may operate in a half duplex mode or a full duplex mode, or a combination thereof. For example, the downlink and uplink configuration 300 may be based on a configuration by a base station 105 and implemented by the base station 105 or a UE 115, or both, to promote power saving for the UE 115 when operating in a full duplex mode. The downlink and uplink configuration 300 may be based on a configuration by a base station 105 and implemented by a UE 115 to promote power saving for the UE 115 when operating in a full duplex mode. The downlink and uplink configuration 300 may also be based on a configuration by a base station 105 and implemented by the base station 105 or the UE 115, or both, to promote high reliability and low latency wireless communications, among other benefits.

In the example of FIG. 3, a base station 105 or a UE 115, or both, may operate in a half duplex mode during a half duplex portion 315-*a* of a TTI 305. For example, a base station 105 or a UE 115, or both, may operate in a half duplex mode between $TTI_N$ and $TTI_{N+1}$. In the half duplex portion 315-*a* of the TTI 305 (e.g., between $TTI_N$ and $TTI_{N+1}$), a base station 105 may transmit a downlink transmission 310 (e.g., downlink control information, downlink data) based on one or more downlink resources (e.g., symbols, mini-slots, slots, subframe, frames, subcarriers, carriers, etc.), and the UE 115 may receive the downlink transmission 310 based on the one or more downlink resources.

A base station 105 or a UE 115, or both, may also operate in a full duplex mode during a full duplex portion 315-*b* of the TTI 305. For example, a base station 105 or a UE 115, or both, may operate in a full duplex mode between $TTI_{N+1}$ and $TTI_{N+2}$ of the TTI 305. A base station 105 may transmit, to a UE 115, an RRC message including a configured grant allocating an uplink transmission 320 (e.g., a semi-persistent uplink transmission). In some examples, a base station 105 may transmit, to a UE 115, a DCI message activating or deactivating the configured grant allocating one or more uplink resources (e.g., symbols, mini-slots, slots, subframe, frames, subcarriers, carriers, etc.) associated with the uplink transmission 320 (e.g., a semi-persistent uplink transmission). An uplink transmission 320 may thereby be preconfigured during the TTI 305 (e.g., a downlink slot, an uplink slot). Thus, a UE 115 may be configured to transmit an uplink transmission 320 to a base station 105, while a downlink transmission 310 is on-going. This may reduce latency for uplink reporting by the UE 115.

A UE 115 may, in some cases, determine to skip an uplink transmission 320 (e.g., a semi-persistent uplink transmission) based on uplink traffic conditions. To increase a downlink throughput to the UE 115 (e.g., data rate or data traffic associated with the downlink transmission 310), the UE 115 may be configured to signal to a base station 105 that the UE 115 is skipping the uplink transmission 320 during the full duplex portion 315-*b* (e.g., between $TTI_{N+1}$ and $TTI_{N+2}$) of the TTI 305 (e.g., one or more symbols, mini-slots, slots). The full duplex portion 315-*b* may include time resources (e.g., one or more symbols, mini-slot, slots) where both downlink and uplink communications happen during the TTI 305. Stated alternatively, the full duplex portion 315-*b* may include or be referred to as an overlapping portion of the TTI (e.g., a portion corresponding to an overlap between a semi-persistent uplink transmission and a downlink transmission). In some examples, one or more additional time resources (e.g., one or more symbols, mini-slot, slots) before and after the full duplex portion 315-*b* may be used in determining when to transmit a feedback message, etc., as described herein. The UE 115 may, for example, transmit a feedback message (e.g., in uplink control information) to the base station 105 ahead of the uplink transmission 320 to let the base station 105 know that no uplink transmission 320 will occur during the full duplex portion 315-*b* (e.g., between $TTI_{N+1}$ and $TTI_{N+2}$) of the TTI 305. Once the feedback message is transmitted, the UE 115 might be barred from transmitting the uplink transmission 320 (e.g., a semi-persistent uplink transmission). Upon receiving the feedback message, the base station 105 may use a same or different configuration for downlink transmission across the TTI 305 as described herein.

Figure 5:
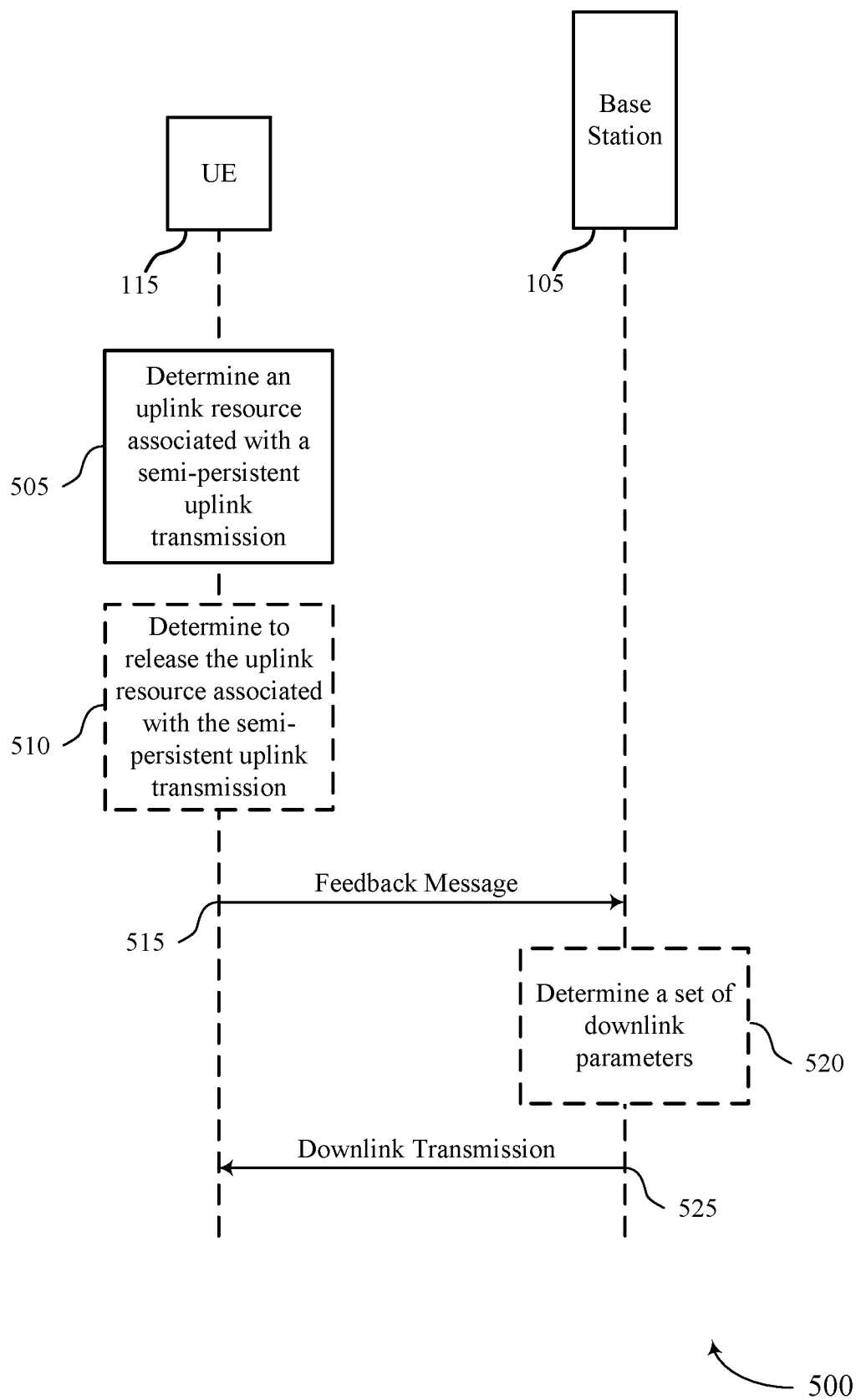
FIG. 5 illustrates an example of a process flow that supports techniques for grant free transmissions in full duplex wireless communication systems in accordance with one or more aspects of the present disclosure.

In some examples, a UE 115 may determine a buffer as described herein with reference to FIG. 5. For example, the downlink and uplink configuration 300 may include a period 325 (e.g., a first temporal period). The UE 115 may determine whether period 325 satisfies a threshold period 330 before the uplink transmission 320 and the UE 115 may transmit or refrain from transmitting the feedback message based on whether the period 325 satisfies the threshold period 330.

Figure 4:
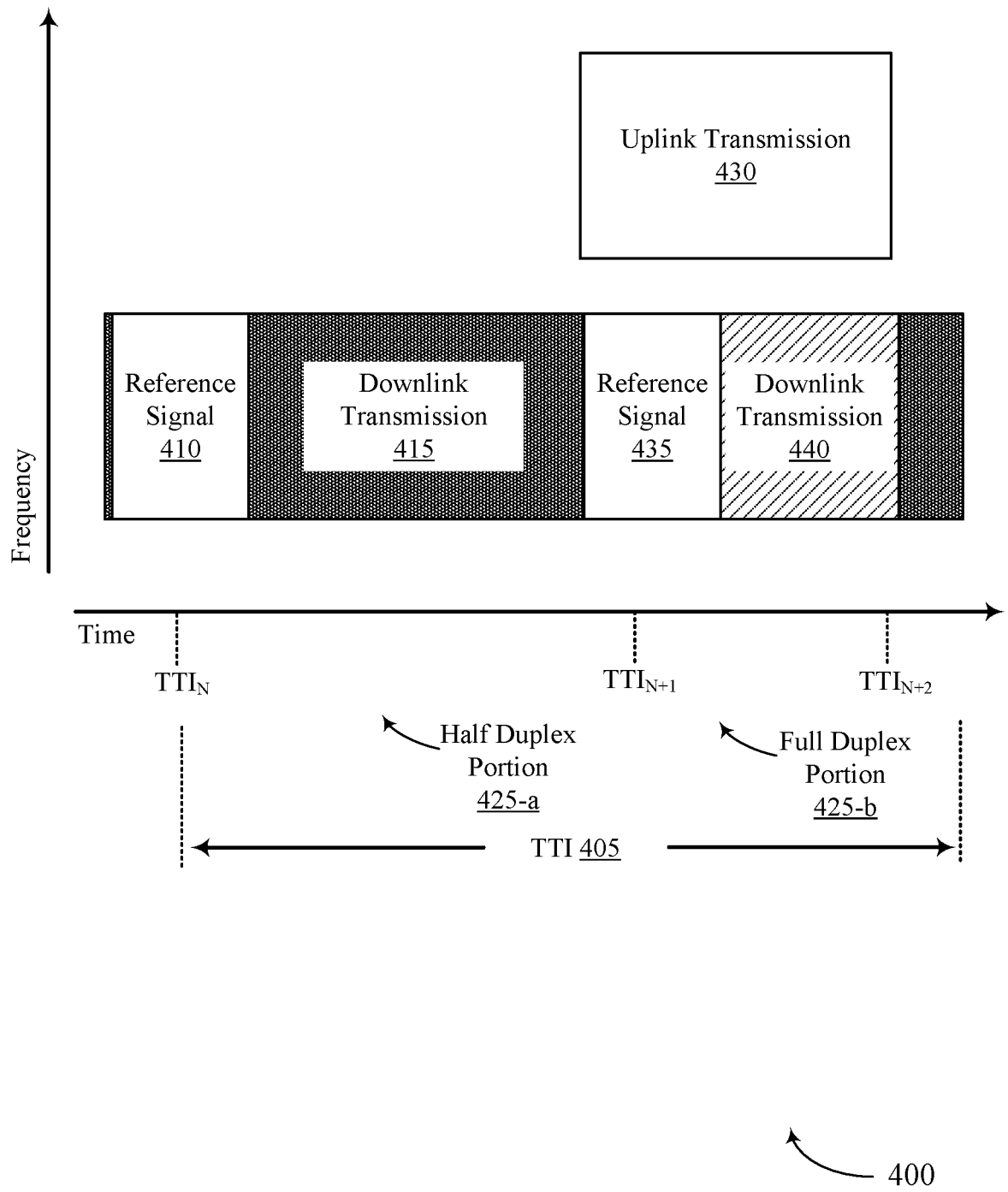

FIG. 4 illustrates an example of a downlink and uplink configuration 400 that supports techniques for grant free transmissions in full duplex wireless communication systems in accordance with one or more aspects of the present disclosure. The downlink and uplink configuration 400 may implement aspects of the wireless communications system 100 and the wireless communications system 200 described with reference to FIGS. 1 and 2, respectively. In the example of FIG. 4, a base station 105 or a UE 115, or both, may operate in a half duplex mode or a full duplex mode, or a combination thereof. For example, the downlink and uplink configuration 400 may be based on a configuration by a base station 105 and implemented by the base station 105 or a UE 115, or both, to promote power saving for the UE 115 when operating in a full duplex mode. The downlink and uplink configuration 400 may be based on a configuration by a base station 105 and implemented by a UE 115 to promote power saving for the UE 115 when operating in a full duplex mode. The downlink and uplink configuration 400 may also be based on a configuration by a base station 105 and implemented by the base station 105 or the UE 115, or both, to promote high reliability and low latency wireless communications, among other benefits.

In the example of FIG. 4, a base station 105 or a UE 115, or both, may operate in a half duplex mode during a half duplex portion 425-*a* of a TTI 405. For example, a base station 105 or a UE 115, or both, may operate in a half duplex mode between $TTI_N$ and $TTI_{N+1}$. In the half duplex portion 425-*a* of the TTI 405 (e.g., between $TTI_N$ and $TTI_{N+1}$), a base station 105 may transmit a reference signal 410 (e.g., a DMRS, an SRS, etc.) associated with a downlink transmission 415 (e.g., downlink control information or data) based on one or more downlink resources (e.g., symbols, mini-slots, slots, subframe, frames, subcarriers, carriers, etc.), and the UE 115 may receive the downlink transmission 415 based on the reference signal 410.

A base station 105 or a UE 115, or both, may also operate in a full duplex mode during a full duplex portion 425-*b* of the TTI 405. For example, a base station 105 or a UE 115, or both, may operate in a full duplex mode between $TTI_{N+1}$ and $TTI_{N+2}$ of the TTI 405. A base station 105 may transmit, to a UE 115, an RRC message including a configured grant allocating an uplink transmission 430 (e.g., a semi-persistent uplink transmission). In some examples, a base station 105 may transmit, to a UE 115, a DCI message activating or deactivating the configured grant allocating one or more uplink resources (e.g., symbols, mini-slots, slots, subframe, frames, subcarriers, carriers, etc.) associated with the uplink transmission 430 (e.g., a semi-persistent uplink transmission). An uplink transmission 430 may thereby be preconfigured during the TTI 405 (e.g., a downlink slot, an uplink slot). Thus, a UE 115 may be configured to transmit an uplink transmission 430 to a base station 105, while a downlink transmission is on-going.

In the example of FIG. 4, to reduce self-interference at a base station 105 or a UE 115, or both, different configurations may be used for the half duplex portion 425-*a* of the TTI 405 and the full duplex portion 425-*b* of the TTI 405.

As illustrated in FIG. 4, a base station 105 use an additional reference signal 435 during the full duplex portion 425-b of the TTI 405. For example, in the full duplex portion 425-b of the TTI 405 (e.g., between $TTI_N$ and $TTI_{N+1}$), a base station 105 may transmit another reference signal 435 (e.g., a DMRS, a SRS, etc.) associated with a downlink transmission 440 (e.g., downlink control information or data) based on one or more downlink resources (e.g., symbols, minislots, slots, subframe, frames, subcarriers, carriers, etc.), and the UE 115 may receive the downlink transmission 440 based on the reference signal 435. In some examples, a base station 105 or a UE 115, or both, may use a first set of parameters corresponding to a first parameter value (e.g., an MCS, a PMI, an RI, a TCI state, etc.) during a half duplex portion 425-a of the TTI 405 and a second set of parameters corresponding to a second parameter value (e.g., an MCS, a PMI, an RI, a TCI state, etc.) during the full duplex portion 425-b of the TTI 405.

For example, a base station 105 or a UE 115, or both, may use a first MCS during the half duplex portion 425-a of the TTI 405 and a second MCS (e.g., a lower MCS) during the full duplex portion 425-b of the TTI 405. In some examples, a base station 105 or a UE 115, or both, may perform wireless communications according to a first PMI or a first RI, or both, during the half duplex portion 425-a of the TTI 405 and a second PMI or a second RI, or both, during the full duplex portion 425-b of the TTI 405. In some other examples, a base station 105 or a UE 115, or both, may use a first TCI state (e.g., a first downlink and uplink beam pair) during the half duplex portion 425-a of the TTI 405 and a second TCI state (e.g., a second downlink and uplink beam pair) during the full duplex portion 425-b of the TTI 405.

FIG. 5 illustrates an example of a process flow 500 that supports techniques for grant free transmissions in full duplex wireless communication systems in accordance with one or more aspects of the present disclosure. The process flow 500 may implement aspects of the wireless communications system 100 and the wireless communications system 200 described with reference to FIGS. 1 and 2, respectively. In the example of FIG. 5, a UE 115 may operate in a half duplex mode or a full duplex mode, or a combination thereof. The process flow 500 may be based on a configuration by a base station 105 and implemented by a UE 115 to promote power saving for the UE 115 when operating in a full duplex mode. The process flow 500 may also be based on a configuration by the base station 105 and implemented by the UE 115 to promote high reliability and low latency wireless communications, among other benefits.

In the following description of the process flow 500, the operations between the base station 105 and the UE 115 may be transmitted in a different order than the example order shown, or the operations performed by the base station 105 and the UE 115 may be performed in different orders or at different times. Some operations may also be omitted from the process flow 500, and other operations may be added to the process flow 500. The base station 105 and the UE 115 may be examples of a base station 105 and a UE 115 as described with reference to FIGS. 1 and 2, respectively.

At 505, the UE 115 may determine an uplink resource associated with a semi-persistent uplink transmission. For example, the UE 115 may determine an uplink resource associated with a semi-persistent uplink transmission during a portion of a TTI (e.g., a full duplex portion of a TTI). In some examples, the UE 115 may receive an RRC message including a configured grant allocating the semi-persistent uplink transmission for the UE 115. In some other examples, the UE 115 may receive a DCI message activating or deactivating a configured grant allocating the uplink resource associated with the semi-persistent uplink transmission. The uplink resource may thereby be a configured grant resource. In the example of FIG. 5, during the portion of the TTI, the UE 115 may operate in a full duplex mode. That is, the portion of the TTI may include reception of downlink transmissions from the base station 105, as well as transmission of uplink transmissions to the base station 105. However, in some cases, the UE 115 may determine to refrain from the uplink transmissions during the portion of the TTI. A TTI may be a mini-slot or a slot, or a combination thereof. For example, at 510, the UE 115 may determine to release the uplink resource associated with the semi-persistent uplink transmission. In some examples, the UE 115 may determine to release the uplink resource associated with the semi-persistent uplink transmission based on a condition (e.g., uplink traffic load).

At 515, the UE 115 may transmit a feedback message, to the base station 105. The feedback message may include an indication that the UE 115 skips the semi-persistent uplink transmission based on releasing the uplink resource. The UE 115 may, in some examples, transmit the feedback message based on a status of a buffer (e.g., memory 930 as described in FIG. 9) associated with the UE 115. The buffer may temporarily store uplink data associated with the semi-persistent uplink transmission. For example, the UE 115 may determine that a buffer (e.g., memory 930 as described in FIG. 9) associated with the UE 115 satisfies a threshold during a first temporal period (e.g., the period 325 as described with reference to FIG. 3) and determine that the first temporal period satisfies a threshold period before the semi-persistent uplink transmission. In other words, when a buffer at a time instance Tn is lower than a buffer threshold, and Tn is N time resources (e.g., symbols, mini-slots, slots) ahead of the semi-persistent uplink transmission, the UE 115 may transmit the feedback message to the base station 105. Thus, the UE 115 may transmit the feedback message ahead of a grant free uplink transmission to let the base station 105 know that no uplink transmission will happen in a portion of a TTI. In some examples, the UE 115 may determine the buffer based on a buffer condition, a preset timeline, or a combination thereof. Additionally or alternatively, the UE 115 may select the buffer randomly (e.g., the uplink transmission may or may not be random). At 520, the base station 105 may determine a set of downlink parameters, for example, based on the feedback message. The set of downlink parameters may include an MCS, a PMI, a RI, or a TCI state, or a combination thereof. At 525, the base station 105 may transmit a downlink transmission to the UE 115 based on the determined set of downlink parameters.

Figure 6:
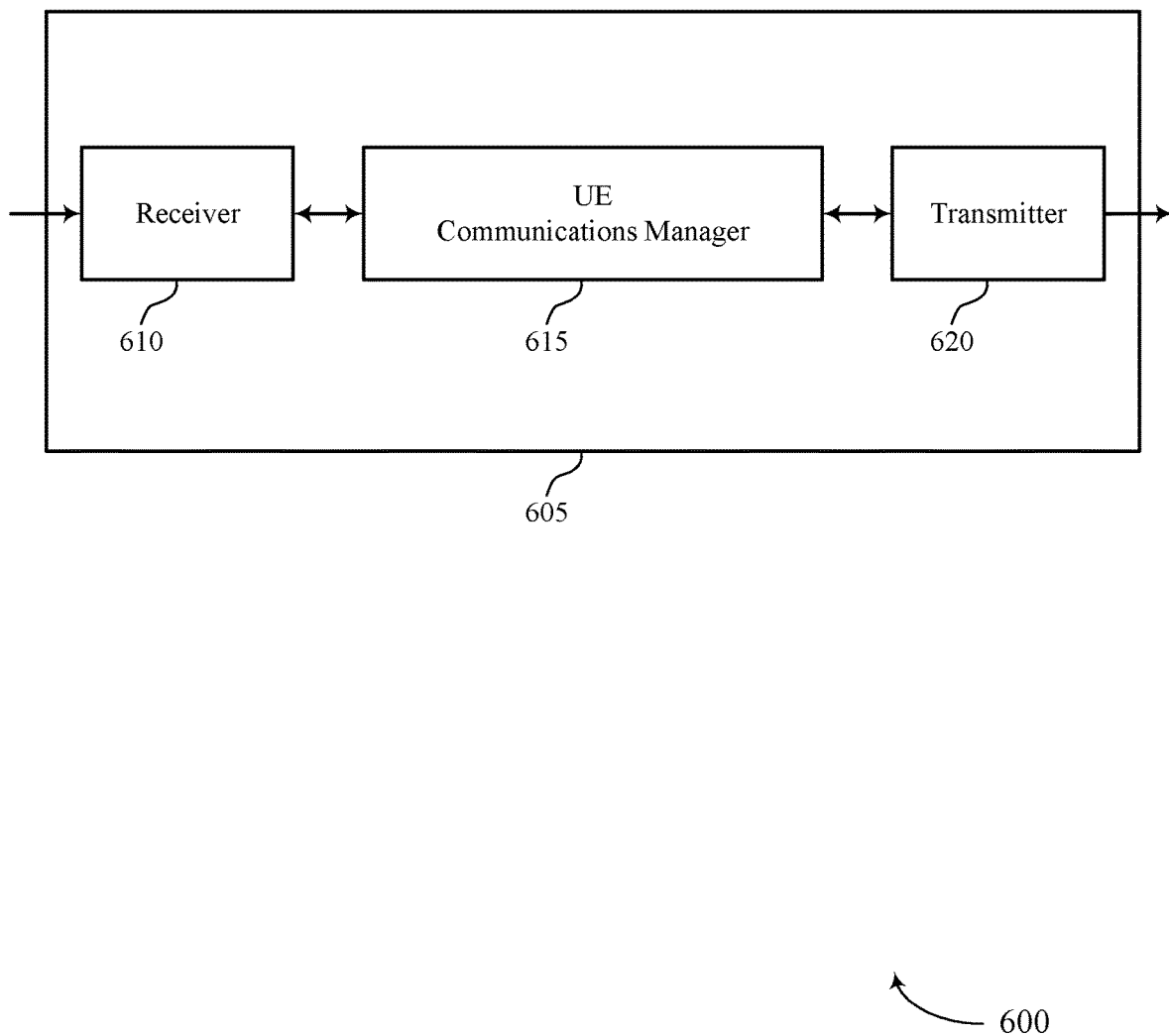
FIGS. 6 and 7 show block diagrams of devices that support techniques for grant free transmissions in full duplex wireless communication systems in accordance with one or more aspects of the present disclosure.

FIG. 6 shows a block diagram 600 of a device 605 that supports techniques for grant free transmissions in full duplex wireless communication systems in accordance with one or more aspects of the present disclosure. The device 605 may be an example of aspects of a UE 115 as described herein. In some examples, the device 605 may be referred to as a first device (e.g., a UE, a DU, a child node, etc.). The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for grant free transmissions in full duplex wireless communication systems, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may be implemented as an integrated circuit or chipset for the device 605, and the receiver 610 and the transmitter 620 may be implemented as analog components (for example, amplifiers, filters, antennas) coupled with the device 605 modem to enable wireless transmission and reception. The actions performed by the UE communications manager 615 as described herein may be implemented to realize one or more potential advantages. At least one implementation may enable the UE communications manager 615 to support grant free transmissions (also referred to as semi-persistent uplink transmissions) while the device 605 is operating in a full duplex mode. For example, the UE communications manager 615 may determine an uplink resource associated with a semi-persistent uplink transmission during a portion of a TTI, determine to release the uplink resource associated with the semi-persistent uplink transmission during the portion of the TTI based on a condition, and transmit, to a base station, a feedback message including an indication that the UE skips the semi-persistent uplink transmission based on determining to release the uplink resource. Based on implementing the grant free transmissions while the device 605 is operating in a full duplex mode, one or more processors of the device 605 (for example, processor(s) controlling or incorporated with the UE communications manager 615) may experience power savings (e.g., increased battery life).

In some examples, the UE communications manager 615 may release an uplink resource associated with a semi-persistent uplink transmission during a portion of a transmission time interval based on a condition, transmit, to a second device, a feedback message including an indication that the first device skips the semi-persistent uplink transmission based on releasing the uplink resource, and configure one or more parameters associated with the portion of the transmission time interval based on the transmitted feedback message, the portion corresponding to an overlap between the semi-persistent uplink transmission and a downlink transmission, the configuration of the one or more parameters associated with the downlink transmission during the portion of the transmission time interval.

The UE communications manager 615 may be an example of means for performing various aspects of managing grant semi-persistent uplink transmissions in full duplex wireless communication systems as described herein. The UE communications manager 615, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a DSP, an ASIC, a FPGA or other programmable logic device, discrete gate or transistor logic, discrete hardware components, or any combination thereof designed to perform the functions described in the present disclosure. In some examples, the UE communications manager 615 may be configured to perform various operations (e.g., receiving, determining, transmitting) using or otherwise in cooperation with the receiver 610, the transmitter 620, or both.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
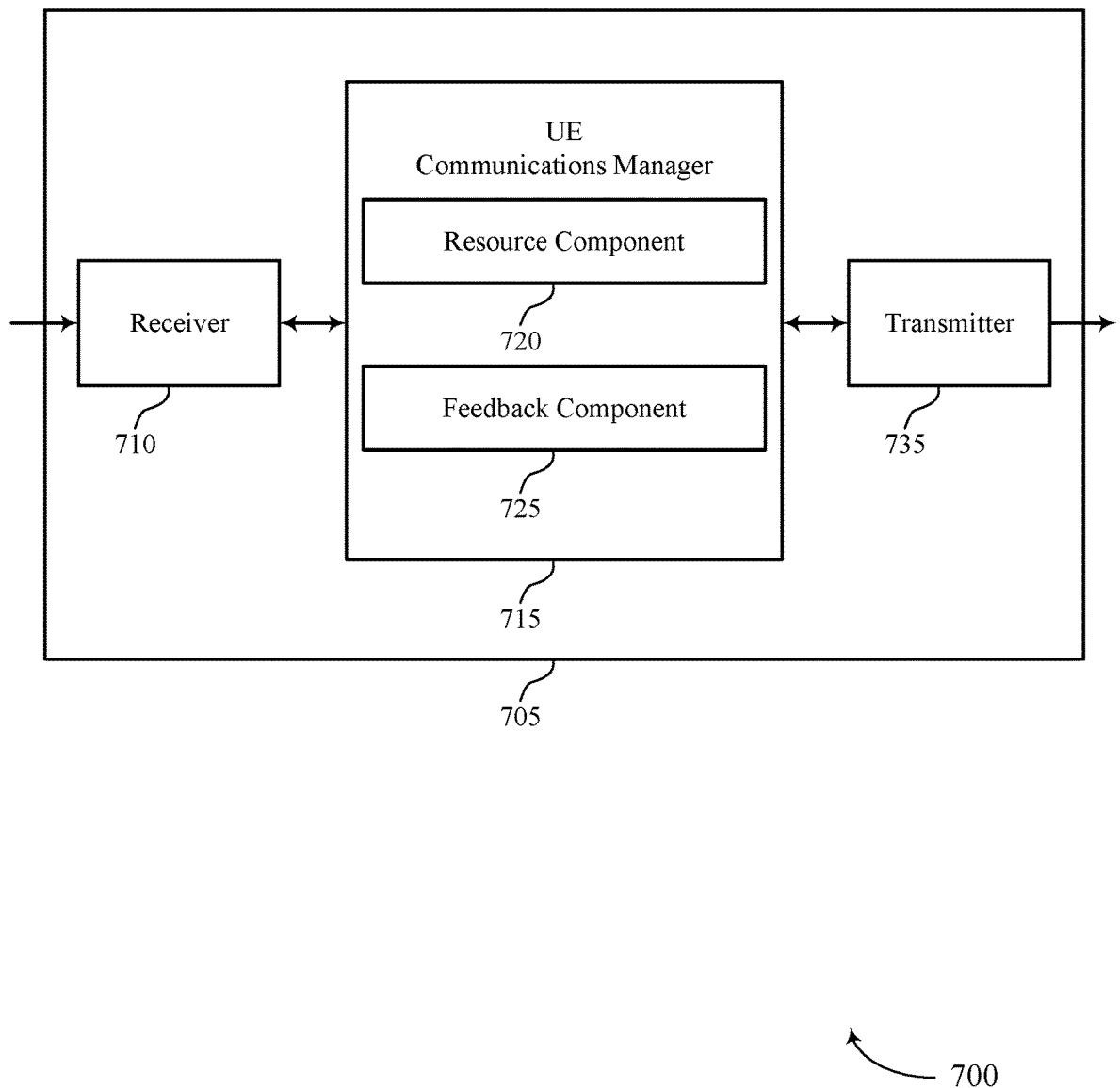

FIG. 7 shows a block diagram 700 of a device 705 that supports techniques for grant free transmissions in full duplex wireless communication systems in accordance with one or more aspects of the present disclosure. The device 705 may be an example of aspects of a device 605, or a UE 115 as described herein. In some examples, the device 705 may be referred to as a first device (e.g., a UE, a DU, a child node, etc.). The device 705 may include a receiver 710, a UE communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to techniques for grant free transmissions in full duplex wireless communication systems, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a resource component 720 and a feedback component 725. The UE communications manager 715 may be an example of aspects of the UE communications manager 910 described herein. The resource component 720 may determine an uplink resource associated with a semi-persistent uplink transmission during a portion of a TTI, and determine to release the uplink resource associated with the semi-persistent uplink transmission during the portion of the TTI based on a condition. The feedback component 725 may transmit, to a base station, a feedback message including an indication that the UE skips the semi-persistent uplink transmission based on determining to release the uplink resource.

In some examples, the resource component 720 may release an uplink resource associated with a semi-persistent uplink transmission during a portion of a transmission time interval based on a condition. The feedback component 725 may transmit, to a second device, a feedback message including an indication that the first device skips the semi-persistent uplink transmission based on releasing the uplink resource. The resource component 720 may configure one or more parameters associated with the portion of the transmission time interval based on the transmitted feedback message, the portion corresponding to an overlap between the semi-persistent uplink transmission and a downlink transmission, the configuration of the one or more parameters associated with the downlink transmission during the portion of the transmission time interval.

The transmitter 735 may transmit signals generated by other components of the device 705. In some examples, the transmitter 735 may be collocated with a receiver 710 in a transceiver component. For example, the transmitter 735 may be an example of aspects of the transceiver 920 described with reference to FIG. 9. The transmitter 735 may utilize a single antenna or a set of antennas.

Figure 8:
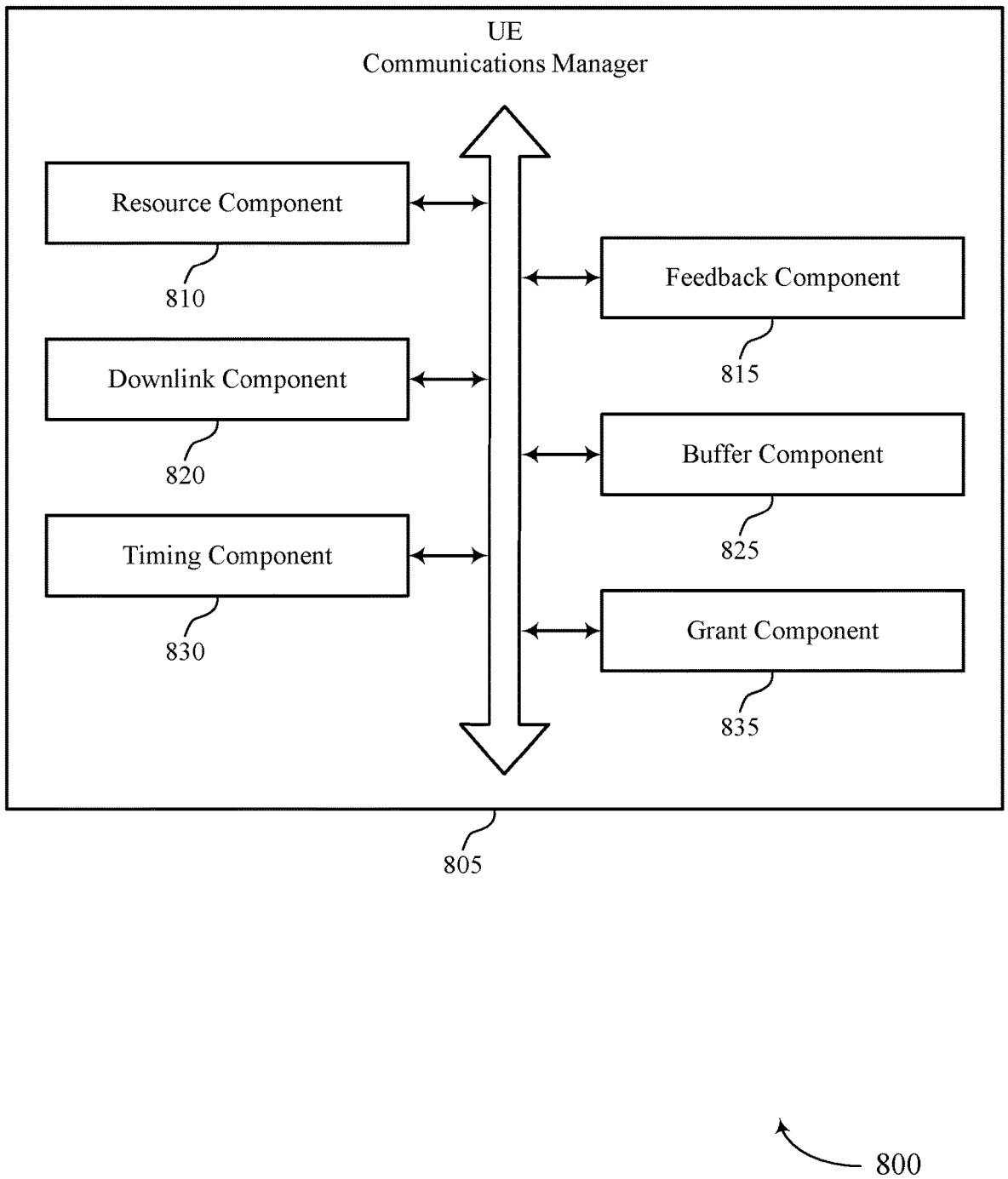
FIG. 8 shows a block diagram of a UE communications manager that supports techniques for grant free transmissions in full duplex wireless communication systems in accordance with one or more aspects of the present disclosure.

FIG. 8 shows a block diagram 800 of a UE communications manager 805 that supports techniques for grant free transmissions in full duplex wireless communication systems in accordance with one or more aspects of the present disclosure. The UE communications manager 805 may be an example of aspects of a UE communications manager 615, a UE communications manager 715, or a UE communications manager 910 described herein. The UE communications manager 805 may include a resource component 810, a feedback component 815, a downlink component 820, a buffer component 825, a timing component 830, and a grant component 835. Each of these components may communicate, directly or indirectly, with one another (e.g., via one or more buses).

The resource component 810 may determine an uplink resource associated with a semi-persistent uplink transmission during a portion of a TTI. The resource component 810 may determine to release the uplink resource associated with the semi-persistent uplink transmission during the portion of the TTI based on a condition. The feedback component 815 may transmit, to a base station, a feedback message including an indication that the UE skips the semi-persistent uplink transmission based on determining to release the uplink resource. In some cases, the UE is barred from transmitting the semi-persistent uplink transmission after transmitting, to a base station, a feedback message. In some cases, the portion of the TTI includes a set of OFDM symbols. The set of OFDM symbols includes at least one OFDM symbol before the portion of the TTI or at least one OFDM symbol after the portion of the TTI, or both. In some cases, the TTI includes a mini-slot. In some other cases, the TTI includes a slot.

The downlink component 820 may receive, from the base station, a downlink configuration based on the transmitted feedback message, the downlink configuration including one or more parameters associated with a downlink transmission during the portion of the TTI. In some examples, the downlink component 820 may receive the downlink transmission during the portion of the TTI based on the one or more parameters. In some cases, the one or more downlink parameters includes an MCS, a PMI, a RI, or a TCI state, or a combination thereof. The downlink component 820 may determine a configuration associated with the portion of the TTI, the portion corresponding to an overlap between the semi-persistent uplink transmission and a downlink transmission, based at least in part on the transmitted feedback message, the configuration comprising one or more parameters associated with the downlink transmission during the portion of the TTI.

The downlink component 820 may receive, based at least in part on the transmitted feedback message, the downlink transmission during the portion of the TTI using a half duplex configuration, wherein the configuration corresponds to the half duplex configuration. The downlink component 820 may receive, based at least in part on refraining to transmit the feedback message, the downlink transmission during the portion of the TTI using a full duplex configuration, wherein the configuration corresponds to the full duplex configuration. The downlink component 820 may determine the configuration associated with the portion of the TTI is based at least in part on a pre-configuration, a rule, or a signaling from the base station, or a combination thereof. The signaling may include an RRC message, a MAC-CE message, or a DCI message, or a combination thereof.

The buffer component 825 may determine a buffer associated with the UE satisfying a threshold during a first temporal period, the buffer temporarily storing uplink data associated with the semi-persistent uplink transmission. In some examples, the buffer component 825 may determine the first temporal period satisfying a threshold period before the semi-persistent uplink transmission, where transmitting, to the base station, the feedback message is based on the buffer associated with the UE satisfying the threshold, or the first temporal period satisfying the threshold period before the semi-persistent uplink transmission, or both.

The timing component 830 may determine, based on a second indication, a threshold period to transmit, to the base station, the feedback message including the indication that the UE releases the uplink resource associated with the semi-persistent uplink transmission, where transmitting, to the base station, the feedback message is based on the threshold period. The timing component 830 may determine an earlier TTI to transmit, to the base station, the feedback message including the indication that the UE skips the semi-persistent uplink transmission. In some examples, the timing component 830 may transmit, to the base station, the feedback message in the earlier TTI, where the earlier TTI precedes the TTI. In some cases, the TTI and the earlier TTI are contiguous. In some cases, the TTI and the earlier TTI are noncontiguous.

The timing component 830 may receive a RRC message including the second indication of the threshold period to transmit, to the base station, the feedback message including the indication that the UE skips the semi-persistent uplink transmission, where transmitting, to the base station, the feedback message is based on the received RRC message including the second indication of the threshold period. In some examples, the timing component 830 may receive a MAC-CE message including the second indication of the threshold period to transmit, to the base station, the feedback message including the indication that the UE skips the semi-persistent uplink transmission, where transmitting, to the base station, the feedback message is based on the received MAC-CE message including the second indication of the threshold period. In some examples, the timing component 830 may receive a DCI message including the second indication of the threshold period to transmit, to the base station, the feedback message including the indication that the UE skips the semi-persistent uplink transmission, where transmitting, to the base station, the feedback message is based on the received DCI message including the second indication of the threshold period.

The grant component 835 may receive a RRC message including a configured grant allocating the semi-persistent uplink transmission, where determining the uplink resource associated with the semi-persistent uplink transmission is based on the received RRC message including the configured grant. In some examples, the grant component 835 may receive a DCI message activating or deactivating a configured grant allocating the uplink resource associated with the semi-persistent uplink transmission, where determining the uplink resource associated with the semi-persistent uplink transmission is based on the received DCI message activating or deactivating the configured grant.

The resource component 810 may release an uplink resource associated with a semi-persistent uplink transmission during a portion of a transmission time interval based on a condition. The feedback component 815 may transmit, to a second device, a feedback message including an indication that the first device skips the semi-persistent uplink transmission based on releasing the uplink resource. In some examples, the resource component 810 may configure one or more parameters associated with the portion of the transmission time interval based on the transmitted feedback message, the portion corresponding to an overlap between the semi-persistent uplink transmission and a downlink transmission, the configuration of the one or more parameters associated with the downlink transmission during the portion of the transmission time interval.

In some examples, the downlink component 820 may receive, based on the transmitted feedback message, the downlink transmission during the portion of the transmission time interval using a half duplex configuration, where the configuration corresponds to the half duplex configuration.

In some examples, the downlink component 820 may receive, based on refraining to transmit the feedback message, the downlink transmission during the portion of the transmission time interval using a full duplex configuration, where the configuration corresponds to the full duplex configuration.

In some examples, the buffer component 825 may determine a buffer associated with the first device satisfying a threshold during a first temporal period, the buffer temporarily storing uplink data associated with the semi-persistent uplink transmission. In some examples, the buffer component 825 may determine the first temporal period satisfying a threshold period before the semi-persistent uplink transmission. In some examples, transmitting, to the second device, the feedback message is based on the buffer associated with the first device satisfying the threshold, or the first temporal period satisfying the threshold period before the semi-persistent uplink transmission, or both.

In some examples, configuring the one or more parameters associated with the portion of the transmission time interval is based on a pre-configuration, a rule, or signaling from the second device, or a combination thereof.

In some examples, the signaling includes a radio resource control message, a medium access control-control element message, or a downlink control information message, or a combination thereof.

In some examples, the one or more parameters include a modulation and coding scheme, a precoding matrix indicator, a rank indicator, or a transmission configuration indicator state, or a combination thereof.

In some examples, the timing component 830 may determine, based on a second indication, a threshold period to transmit, to the second device, the feedback message including the indication that the first device releases the uplink resource associated with the semi-persistent uplink transmission. In some examples, transmitting, to the second device, the feedback message is based on the threshold period.

In some examples, the timing component 830 may receiving a radio resource control message including the second indication of the threshold period to transmit, to the second device, the feedback message including the indication that the first device skips the semi-persistent uplink transmission. In some examples, transmitting, to the second device, the feedback message is based on the received radio resource control message including the second indication of the threshold period.

In some examples, the timing component 830 may receiving a medium access control-control element message including the second indication of the threshold period to transmit, to the second device, the feedback message including the indication that the first device skips the semi-persistent uplink transmission. In some examples, transmitting, to the second device, the feedback message is based on the received medium access control-control element message including the second indication of the threshold period.

In some examples, the timing component 830 may receive a downlink control information message including the second indication of the threshold period to transmit, to the second device, the feedback message including the indication that the first device skips the semi-persistent uplink transmission. In some examples, transmitting, to the second device, the feedback message is based on the received downlink control information message including the second indication of the threshold period.

In some examples, the timing component 830 may determine an earlier transmission time interval than the transmission time interval to transmit, to the second device, the feedback message including the indication that the first device skips the semi-persistent uplink transmission. In some examples, the timing component 830 may transmit, to the second device, the feedback message in the earlier transmission time interval, where the earlier transmission time interval precedes the transmission time interval, where the transmission time interval and the earlier transmission time interval are contiguous or noncontiguous.

In some examples, the first device is barred from transmitting the semi-persistent uplink transmission after transmitting, to the second device, the feedback message.

In some examples, the timing component 830 may receive a radio resource control message including a configured grant allocating the semi-persistent uplink transmission. In some examples, determining the uplink resource associated with the semi-persistent uplink transmission is based on the received radio resource control message including the configured grant.

In some examples, the timing component 830 may receive a downlink control information message activating or deactivating a configured grant allocating the uplink resource associated with the semi-persistent uplink transmission. In some examples, determining the uplink resource associated with the semi-persistent uplink transmission is based on the received downlink control information message activating or deactivating the configured grant.

In some examples, the portion of the transmission time interval includes a set of orthogonal frequency-division multiplexing symbols.

In some examples, the set of orthogonal frequency-division multiplexing symbols includes at least one orthogonal frequency-division multiplexing symbol before the portion of the transmission time interval or at least one orthogonal frequency-division multiplexing symbol after the portion of the transmission time interval, or both.

In some examples, the transmission time interval includes a mini-slot or a slot. In some examples, the first device comprises a user equipment or a distributed unit, and wherein the second device comprises a base station or a centralized unit.

Figure 9:
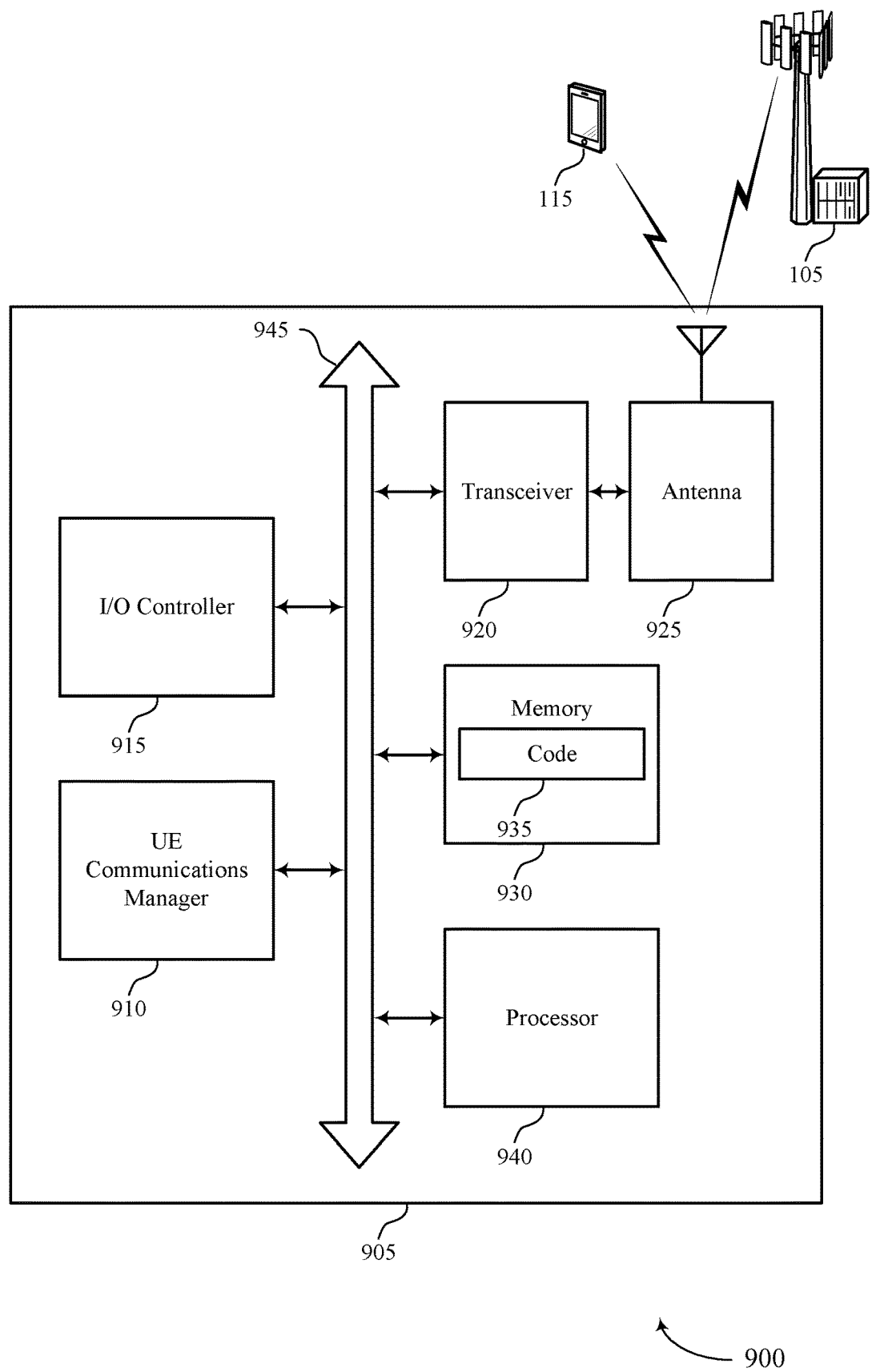
FIG. 9 shows a diagram of a system including a device that supports techniques for grant free transmissions in full duplex wireless communication systems in accordance with one or more aspects of the present disclosure.

FIG. 9 shows a diagram of a system 900 including a device 905 that supports techniques for grant free transmissions in full duplex wireless communication systems in accordance with one or more aspects of the present disclosure. The device 905 may be an example of or include the components of device 605, device 705, or a UE 115 as described herein. In some examples, the device 905 may be referred to as a first device (e.g., a UE, a DU, a child node, etc.). The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945). Although described in some aspects as a UE communications manager, any UE communications manager herein may be referred to as a first device communications manager (e.g., a communications manager of a UE, DU, a child node, etc.). Likewise, although described in some aspects as a base station communications manager, any base station communications manager herein may be referred to as a second device communications manager (e.g., a communications manager of a base station, CUE, parent node, etc.).

At least one implementation may enable the UE communications manager 910 to support grant free transmissions (also referred to as semi-persistent uplink transmissions) while the device 905 is operating in a full duplex mode. For example, the UE communications manager 910 may determine an uplink resource associated with a semi-persistent uplink transmission during a portion of a TTI, determine to release the uplink resource associated with the semi-persistent uplink transmission during the portion of the TTI based on a condition, and transmit, to a base station, a feedback message including an indication that the UE skips the semi-persistent uplink transmission based on determining to release the uplink resource. In some examples, the UE communications manager 910 may release an uplink resource associated with a semi-persistent uplink transmission during a portion of a transmission time interval based on a condition, transmit, to a second device, a feedback message including an indication that the first device skips the semi-persistent uplink transmission based on releasing the uplink resource, and configure one or more parameters associated with the portion of the transmission time interval based on the transmitted feedback message, the portion corresponding to an overlap between the semi-persistent uplink transmission and a downlink transmission, the configuration of the one or more parameters associated with the downlink transmission during the portion of the transmission time interval. Based on implementing the grant free transmissions while the device 905 is operating in a full duplex mode, one or more processors of the device 905 (for example, processor(s) controlling or incorporated with the UE communications manager 910) may promote improvements to power consumption. In addition, one or more processors of the device 905 (for example, processor(s) controlling or incorporated with the UE communications manager 910) may promote enhanced efficiency for high reliability and low latency wireless communications (e.g., downlink reception, uplink transmission), among other benefits. For example, by transmitting a feedback message to the base station identifying that the device 905 is releasing an uplink resource, the device 905 and the base station may communicate more effectively.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some other cases, the device 905 may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor 940 to perform various functions described herein. In some cases, the memory 930 may contain, among other things, a basic input-output system (BIOS) which may control basic hardware or software operation such as the interaction with peripheral components or devices. In some examples, the memory 930 may temporarily store information (e.g., uplink control information, uplink data, etc.). The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for grant free transmissions in full duplex wireless communication systems).

Figure 10:
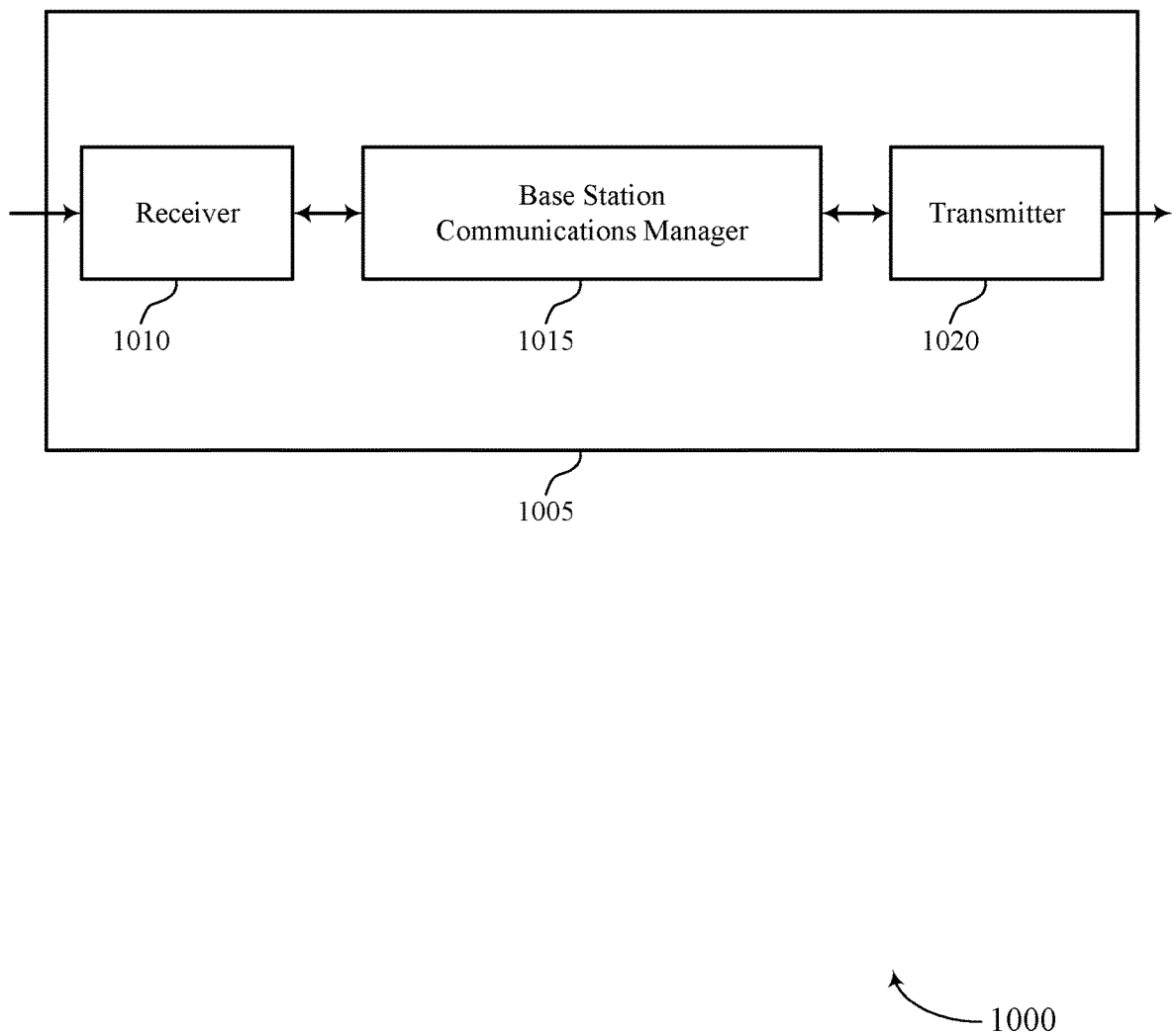
FIGS. 10 and 11 show block diagrams of devices that support techniques for grant free transmissions in full duplex wireless communication systems in accordance with one or more aspects of the present disclosure.

FIG. 10 shows a block diagram 1000 of a device 1005 that supports techniques for grant free transmissions in full duplex wireless communication systems in accordance with one or more aspects of the present disclosure. The device 1005 may be an example of aspects of a base station 105 as described herein. In some examples, the device 1005 may be referred to as a second device (e.g., a base station, a CU, a parent node, etc.). The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for grant free transmissions in full duplex wireless communication systems, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may receive, from a UE, a feedback message including an indication that the UE skips a semi-persistent uplink transmission during a portion of a TTI, determine a set of downlink parameters based on the received feedback message, and transmit a downlink transmission during the portion of the TTI based on the determined set of downlink parameters. In some examples, the base station communications manager 1015 may receive from a first device, a feedback message including an indication that the first device skips a semi-persistent uplink transmission during a portion of a transmission time interval, and transmit a downlink transmission during the portion of the transmission time interval based on a set of downlink parameters associated with the received feedback message. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure. In some examples, the base station communications manager 1015 may be configured to perform various operations (e.g., receiving, determining, transmitting) using or otherwise in cooperation with the receiver 1010, the transmitter 1020, or both.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
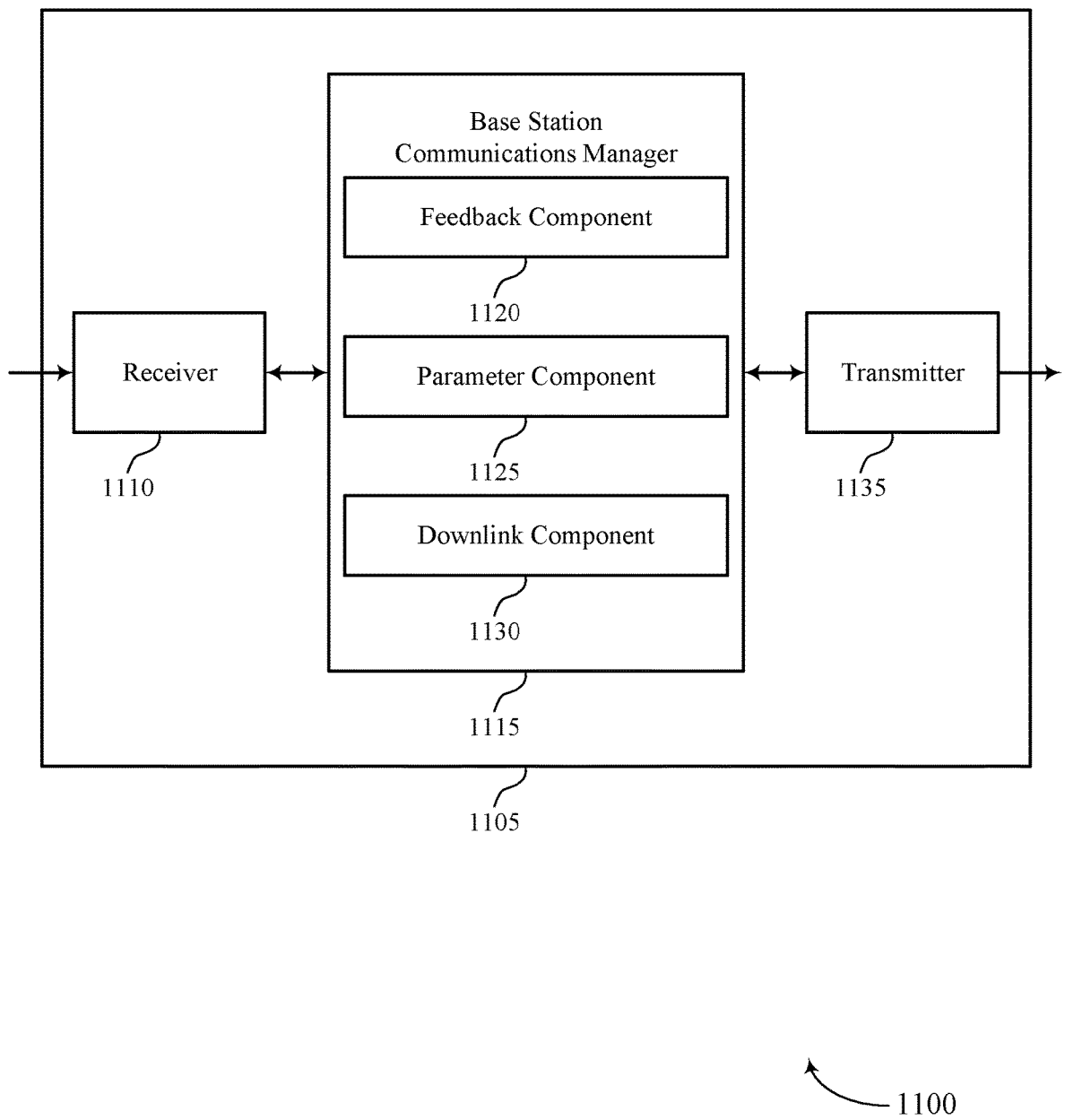

FIG. 11 shows a block diagram 1100 of a device 1105 that supports techniques for grant free transmissions in full duplex wireless communication systems in accordance with one or more aspects of the present disclosure. The device 1105 may be an example of aspects of a device 1005, or a base station 105 as described herein. In some examples, the device 1105 may be referred to as a second device (e.g., a base station, a CU, a parent node, etc.). The device 1105 may include a receiver 1110, a base station communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for grant free transmissions in full duplex wireless communication systems, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a feedback component 1120, a parameter component 1125, and a downlink component 1130. The base station communications manager 1115 may be an example of aspects of the base station communications manager 1310 described herein.

The feedback component 1120 may receive, from a UE, a feedback message including an indication that the UE skips a semi-persistent uplink transmission during a portion of a TTI. The parameter component 1125 may determine a set of downlink parameters based on the received feedback message. The downlink component 1130 may transmit a downlink transmission during the portion of the TTI based on the determined set of downlink parameters.

In some examples, the feedback component 1120 may receive, from a first device, a feedback message including an indication that the first device skips a semi-persistent uplink transmission during a portion of a transmission time interval. The downlink component 1130 may transmit a downlink transmission during the portion of the transmission time interval based on a set of downlink parameters associated with the received feedback message.

The transmitter 1135 may transmit signals generated by other components of the device 1105. In some examples, the transmitter 1135 may be collocated with a receiver 1110 in a transceiver component. For example, the transmitter 1135 may be an example of aspects of the transceiver 1320 described with reference to FIG. 13. The transmitter 1135 may utilize a single antenna or a set of antennas.

Figure 12:
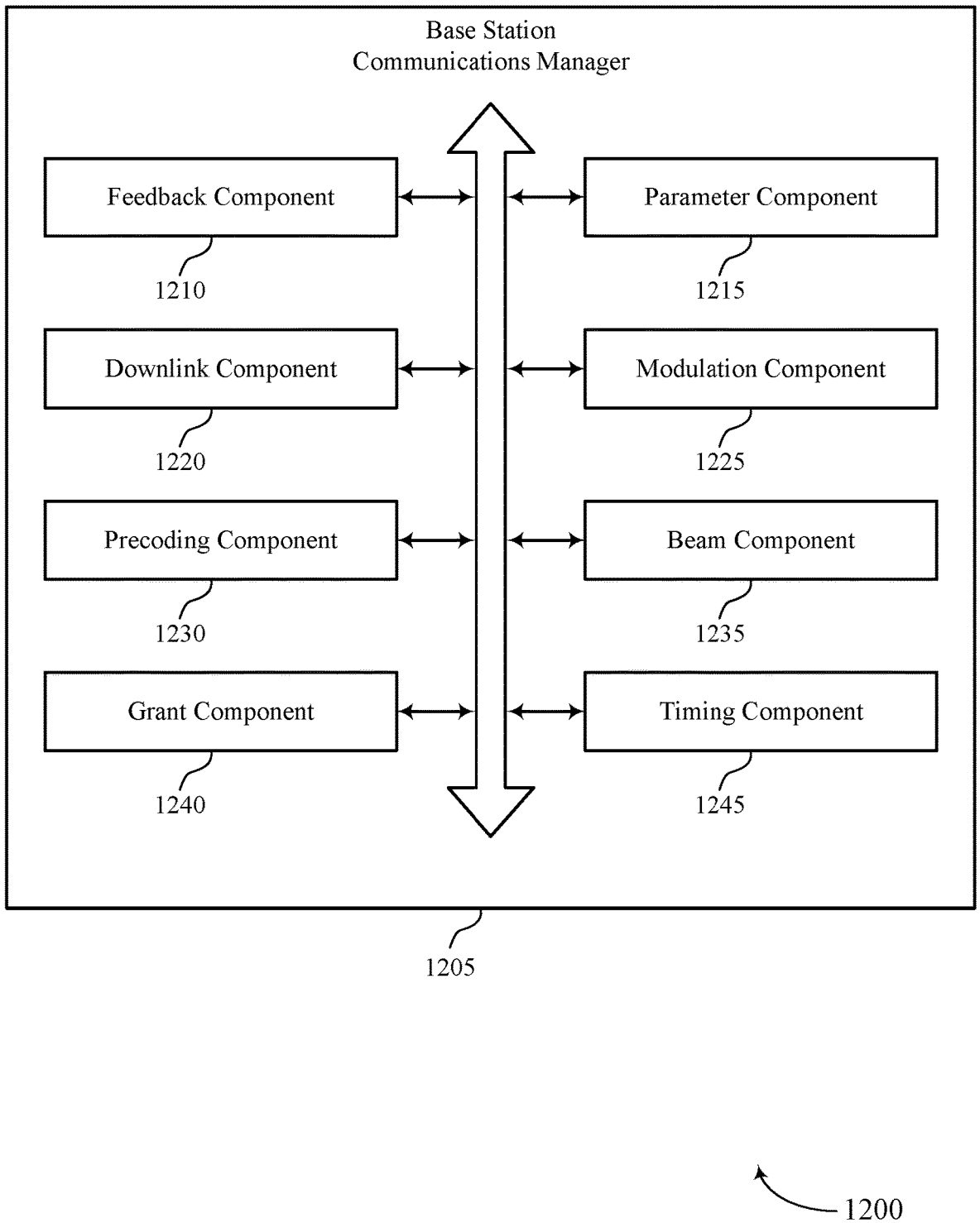
FIG. 12 shows a block diagram of a base station communications manager that supports techniques for grant free transmissions in full duplex wireless communication systems in accordance with one or more aspects of the present disclosure.

FIG. 12 shows a block diagram 1200 of a base station communications manager 1205 that supports techniques for grant free transmissions in full duplex wireless communication systems in accordance with one or more aspects of the present disclosure. The base station communications manager 1205 may be an example of aspects of a base station communications manager 1015, a base station communications manager 1115, or a base station communications manager 1310 described herein. The base station communications manager 1205 may include a feedback component 1210, a parameter component 1215, a downlink component 1220, a modulation component 1225, a precoding component 1230, a beam component 1235, a grant component 1240, and a timing component 1245. Each of these components may communicate, directly or indirectly, with one another (e.g., via one or more buses).

The feedback component 1210 may receive, from a UE, a feedback message including an indication that the UE skips a semi-persistent uplink transmission during a portion of a TTI. In some cases, the UE is barred from transmitting the semi-persistent uplink transmission after the base station received the feedback message. In some cases, the TTI includes a mini-slot. In some other cases, the TTI includes a slot. The parameter component 1215 may determine a set of downlink parameters based on the received feedback message. The downlink component 1220 may transmit a downlink transmission during the portion of the TTI based on the determined set of downlink parameters. The modulation component 1225 may determine an MCS based on the received feedback message, where transmitting the downlink transmission during the portion of the TTI is based on the determined MCS. The precoding component 1230 may determine a PMI or a RI, or both, based on the received feedback message, where transmitting the downlink transmission during the portion of the TTI is based on the determined PMI or the RI, or both. The beam component 1235 may determine a TCI state based on the received feedback message, where transmitting the downlink transmission during the portion of the TTI is based on the determined TCI state.

The grant component 1240 may transmit, to the UE, a configured grant allocating an uplink resource associated with the semi-persistent uplink transmission during the portion of the TTI. In some examples, the grant component 1240 may transmit an RRC message including the configured grant allocating an uplink resource associated with the semi-persistent uplink transmission during the portion of the TTI. In some examples, the grant component 1240 may transmit a DCI message activating or deactivating the configured grant allocating an uplink resource associated with the semi-persistent uplink transmission during the portion of the TTI. The timing component 1245 may transmit an RRC message including a second indication of a threshold period for the UE to transmit, to the base station, the feedback message including the indication that the UE skips the semi-persistent uplink transmission, where receiving, from the UE, the feedback message is based on the transmitted RRC message including the second indication of the threshold period. In some examples, the timing component 1245 may transmit a MAC-CE message including a second indication of a threshold period for the UE to transmit, to the base station, the feedback message including the indication that the UE skips the semi-persistent uplink transmission, where receiving, from the UE, the feedback message is based on the transmitted MAC-CE message including the second indication of the threshold period. In some examples, the timing component 1245 may transmit a DCI message including a second indication of a threshold period for the UE to transmit, to the base station, the feedback message including the indication that the UE skips the semi-persistent uplink transmission, where receiving, from the UE, the feedback message is based on the transmitted DCI message including the second indication of the threshold period.

The feedback component 1210 may receive, from a first device, a feedback message including an indication that the first device skips a semi-persistent uplink transmission during a portion of a transmission time interval. The downlink component 1220 may transmit a downlink transmission during the portion of the transmission time interval based on a set of downlink parameters associated with the received feedback message.

In some examples, the modulation component 1225 may determine a modulation and coding scheme based on the received feedback message. In some examples, transmitting the downlink transmission during the portion of the transmission time interval is based on the determined modulation and coding scheme.

In some examples, the precoding component 1230 may determine a precoding matrix indicator or a rank indicator, or both, based on the received feedback message. In some examples, transmitting the downlink transmission during the portion of the transmission time interval is based on the determined precoding matrix indicator or the rank indicator, or both.

In some examples, the beam component 1235 may determine a transmission configuration indicator state based on the received feedback message. In some examples, transmitting the downlink transmission during the portion of the transmission time interval is based on the determined transmission configuration indicator state.

In some examples, the grant component 1240 may transmit, to the first device, a configured grant allocating an uplink resource associated with the semi-persistent uplink transmission during the portion of the transmission time interval.

In some examples, the grant component 1240 may transmit a radio resource control message including the configured grant allocating an uplink resource associated with the semi-persistent uplink transmission during the portion of the transmission time interval.

In some examples, the grant component 1240 may transmit a downlink control information message activating or deactivating the configured grant allocating an uplink resource associated with the semi-persistent uplink transmission during the portion of the transmission time interval.

In some examples, the timing component 1245 may transmit a radio resource control message including a second indication of a threshold period for the first device to transmit, to the second device, the feedback message including the indication that the first device skips the semi-persistent uplink transmission. In some examples, receiving, from the first device, the feedback message is based on the transmitted radio resource control message including the second indication of the threshold period.

In some examples, the timing component 1245 may transmit a medium access control-control element message including a second indication of a threshold period for the first device to transmit, to the second device, the feedback message including the indication that the first device skips the semi-persistent uplink transmission. In some examples, receiving, from the first device, the feedback message is based on the transmitted medium access control-control element message including the second indication of the threshold period.

In some examples, the timing component 1245 may transmit a downlink control information message including a second indication of a threshold period for the first device to transmit, to the second device, the feedback message including the indication that the first device skips the semi-persistent uplink transmission. In some examples, receiving, from the first device, the feedback message is based on the transmitted downlink control information message including the second indication of the threshold period.

In some examples, the first device is barred from transmitting the semi-persistent uplink transmission after the second device received the feedback message. In some examples, the transmission time interval includes a mini-slot or a slot. In some examples, the first device comprises a user equipment or a distributed unit, and wherein the second device comprises a base station or a centralized unit.

Figure 13:
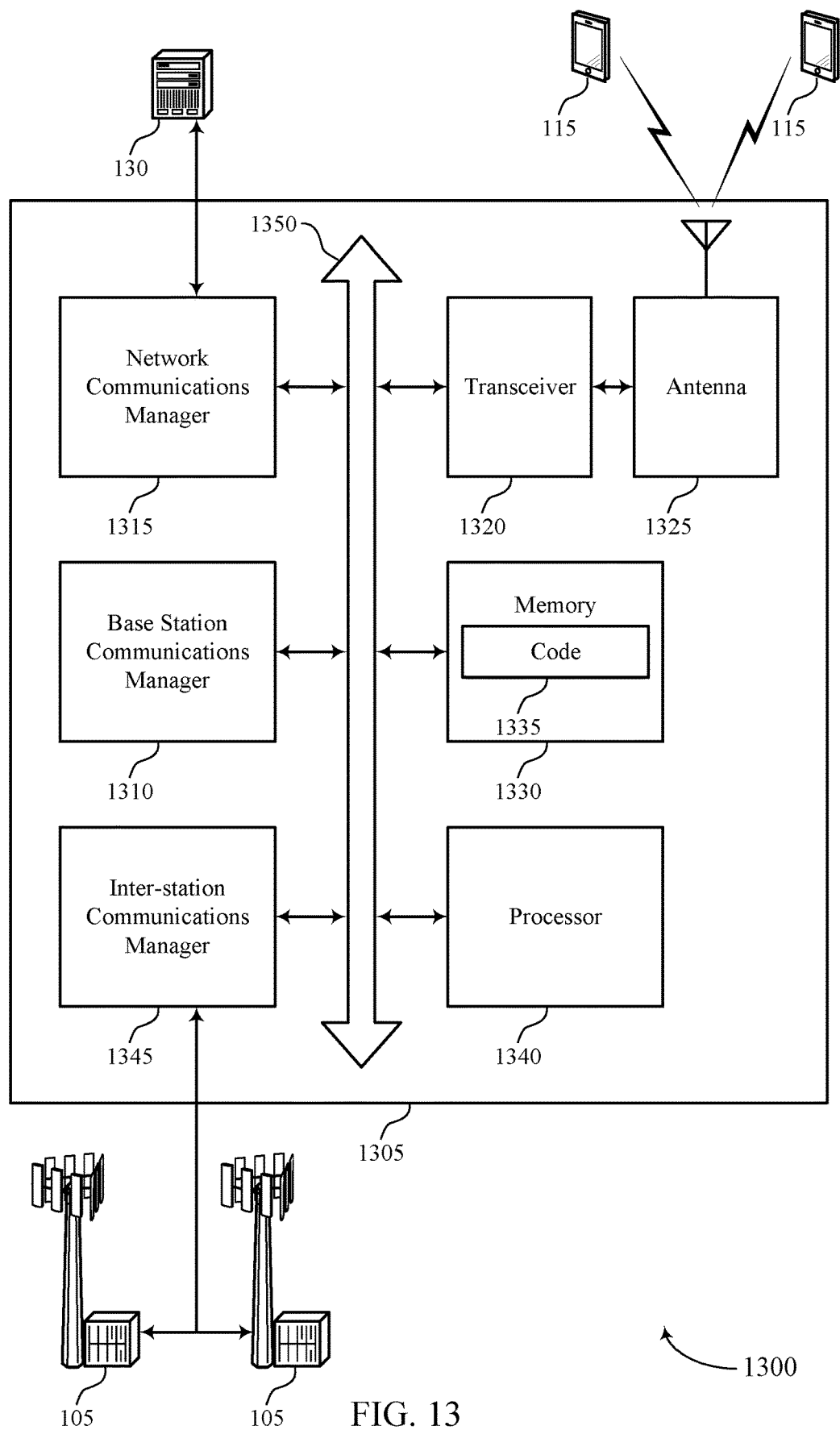
FIG. 13 shows a diagram of a system including a device that supports techniques for grant free transmissions in full duplex wireless communication systems in accordance with one or more aspects of the present disclosure.

FIG. 13 shows a diagram of a system 1300 including a device 1305 that supports techniques for grant free transmissions in full duplex wireless communication systems in accordance with one or more aspects of the present disclosure. The device 1305 may be an example of or include the components of device 1005, device 1105, or a base station 105 as described herein. In some examples, the device 1305 may be referred to as a second device (e.g., a base station, a CU, a parent node, etc.). The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may receive, from a UE, a feedback message including an indication that a UE skips a semi-persistent uplink transmission during a portion of a TTI. The base station communications manager 1310 may determine a set of downlink parameters based on the received feedback message, and transmit a downlink transmission during the portion of the TTI based on the determined set of downlink parameters. In some examples, the base station communications manager 1310 may receive, from a first device, a feedback message including an indication that the first device skips a semi-persistent uplink transmission during a portion of a transmission time interval. The base station communications manager 1310 may transmit a downlink transmission during the portion of the transmission time interval based on a set of downlink parameters associated with the received feedback message.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases, the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices. The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting techniques for grant free transmissions in full duplex wireless communication systems).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
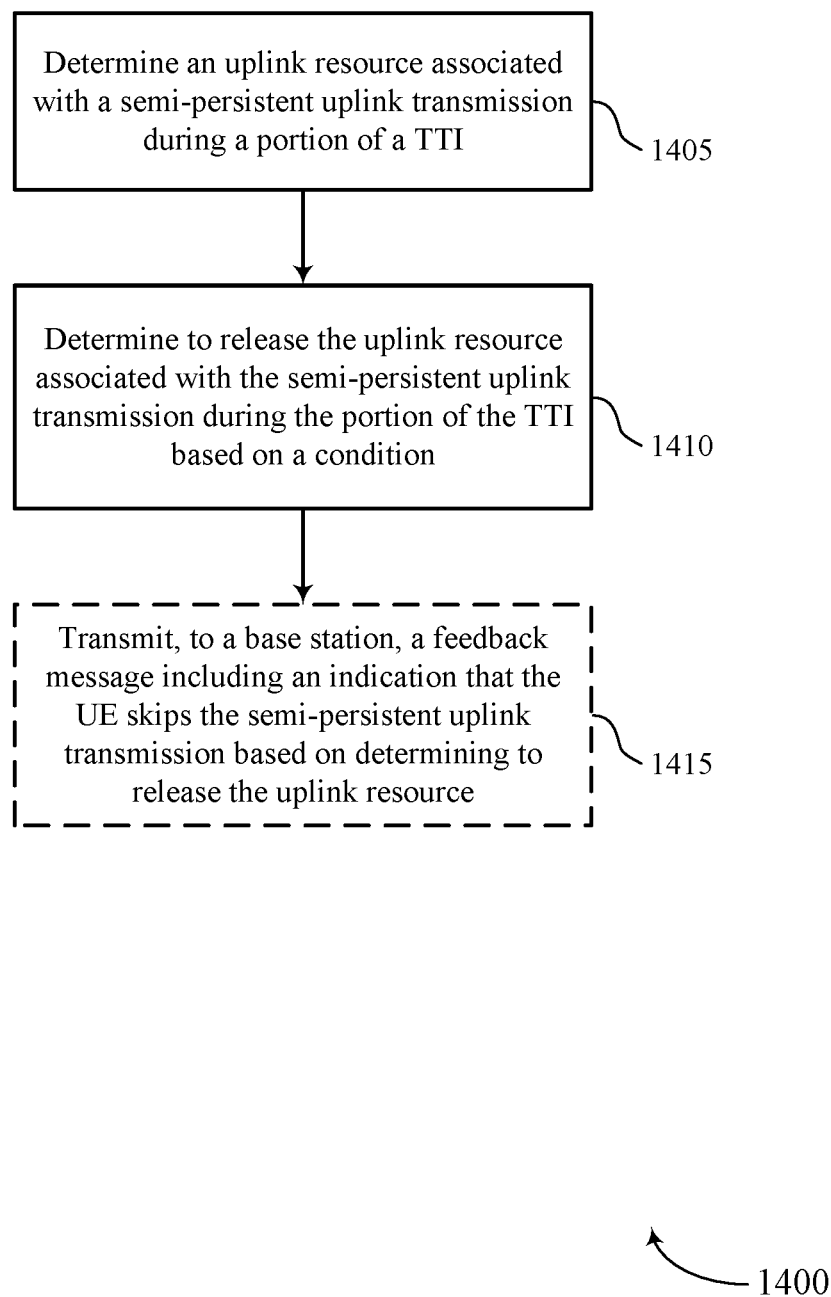
FIGS. 14 through 22 show flowcharts illustrating methods that support techniques for grant free transmissions in full duplex wireless communication systems in accordance with one or more aspects of the present disclosure.

FIG. 14 shows a flowchart illustrating a method 1400 that supports techniques for grant free transmissions in full duplex wireless communication systems in accordance with one or more aspects of the present disclosure. The operations of method 1400 may be implemented by a first device (e.g., a UE, a DU, a child node, etc.) or its components as described herein. That is, although aspects of the methods herein are described as being performed by a UE, the various operations may additionally or alternatively be performed by the first device as described herein. For example, the operations of method 1400 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may determine an uplink resource associated with a semi-persistent uplink transmission during a portion of a TTI. The operations of 1405 may be performed according to the methods described herein. In some examples, aspects of the operations of 1405 may be performed by a resource component as described with reference to FIGS. 6 through 9.

At 1410, the UE may determine to release the uplink resource associated with the semi-persistent uplink transmission during the portion of the TTI based on a condition. The operations of 1410 may be performed according to the methods described herein. In some examples, aspects of the operations of 1410 may be performed by a resource component as described with reference to FIGS. 6 through 9.

At 1415, the UE may transmit, to a base station, a feedback message including an indication that the UE skips the semi-persistent uplink transmission based on determining to release the uplink resource. The operations of 1415 may be performed according to the methods described herein. In some examples, aspects of the operations of 1415 may be performed by a feedback component as described with reference to FIGS. 6 through 9.

Figure 15:
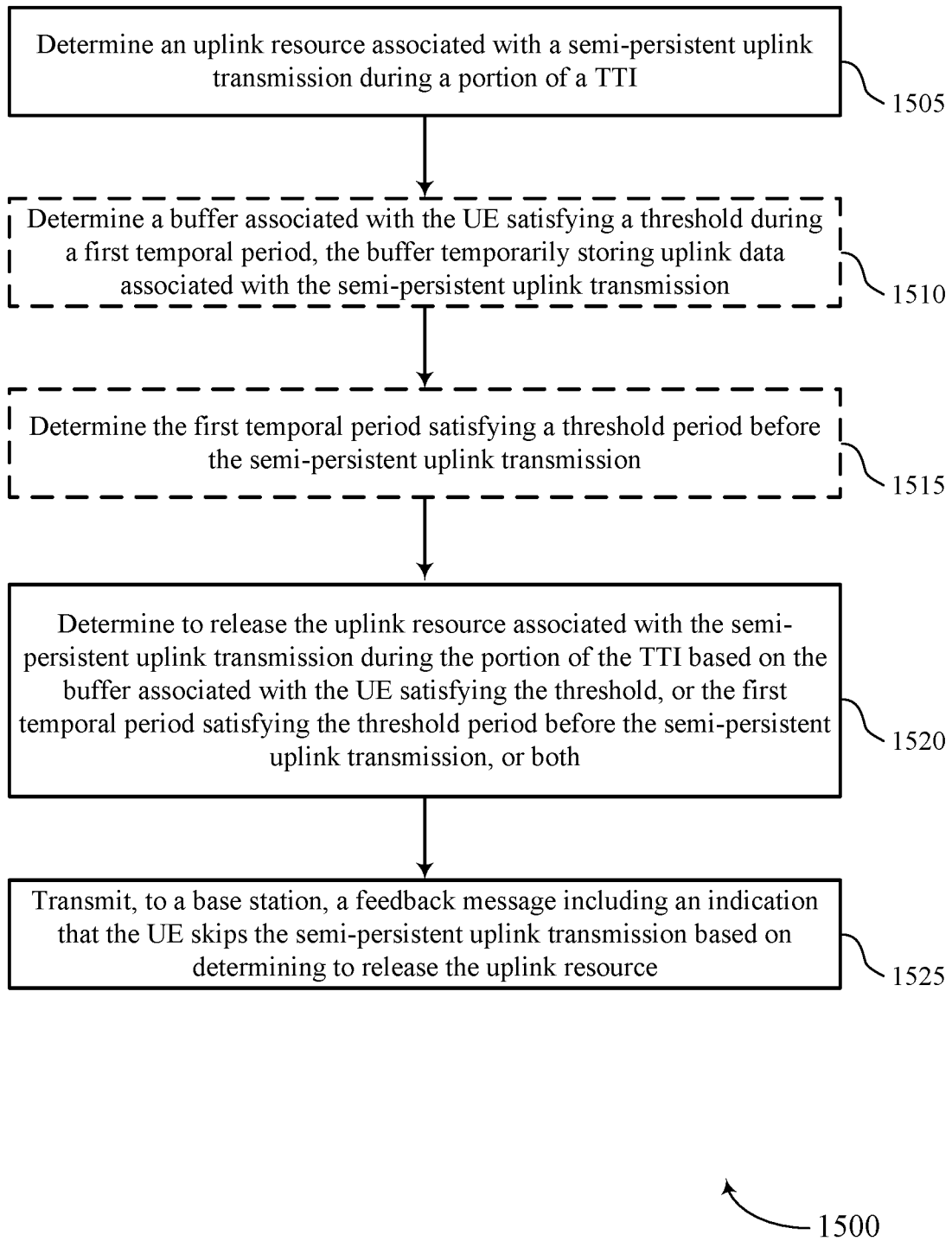

FIG. 15 shows a flowchart illustrating a method 1500 that supports techniques for grant free transmissions in full duplex wireless communication systems in accordance with one or more aspects of the present disclosure. The operations of method 1500 may be implemented by a UE or its components as described herein. For example, the operations of method 1500 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may determine an uplink resource associated with a semi-persistent uplink transmission during a portion of a TTI. The operations of 1505 may be performed according to the methods described herein. In some examples, aspects of the operations of 1505 may be performed by a resource component as described with reference to FIGS. 6 through 9.

At 1510, the UE may determine a buffer associated with the UE satisfying a threshold during a first temporal period, the buffer temporarily storing uplink data associated with the semi-persistent uplink transmission. The operations of 1510 may be performed according to the methods described herein. In some examples, aspects of the operations of 1510 may be performed by a buffer component as described with reference to FIGS. 6 through 9.

At 1515, the UE may determine the first temporal period satisfying a threshold period before the semi-persistent uplink transmission. The operations of 1515 may be performed according to the methods described herein. In some examples, aspects of the operations of 1515 may be performed by a buffer component as described with reference to FIGS. 6 through 9.

At 1520, the UE may determine to release the uplink resource associated with the semi-persistent uplink transmission during the portion of the TTI based on the buffer associated with the UE satisfying the threshold, or the first temporal period satisfying the threshold period before the semi-persistent uplink transmission, or both. The operations of 1520 may be performed according to the methods described herein. In some examples, aspects of the operations of 1520 may be performed by a resource component as described with reference to FIGS. 6 through 9.

At 1525, the UE may transmit, to a base station, a feedback message including an indication that the UE skips the semi-persistent uplink transmission based on determining to release the uplink resource. The operations of 1525 may be performed according to the methods described herein. In some examples, aspects of the operations of 1525 may be performed by a feedback component as described with reference to FIGS. 6 through 9.

Figure 16:
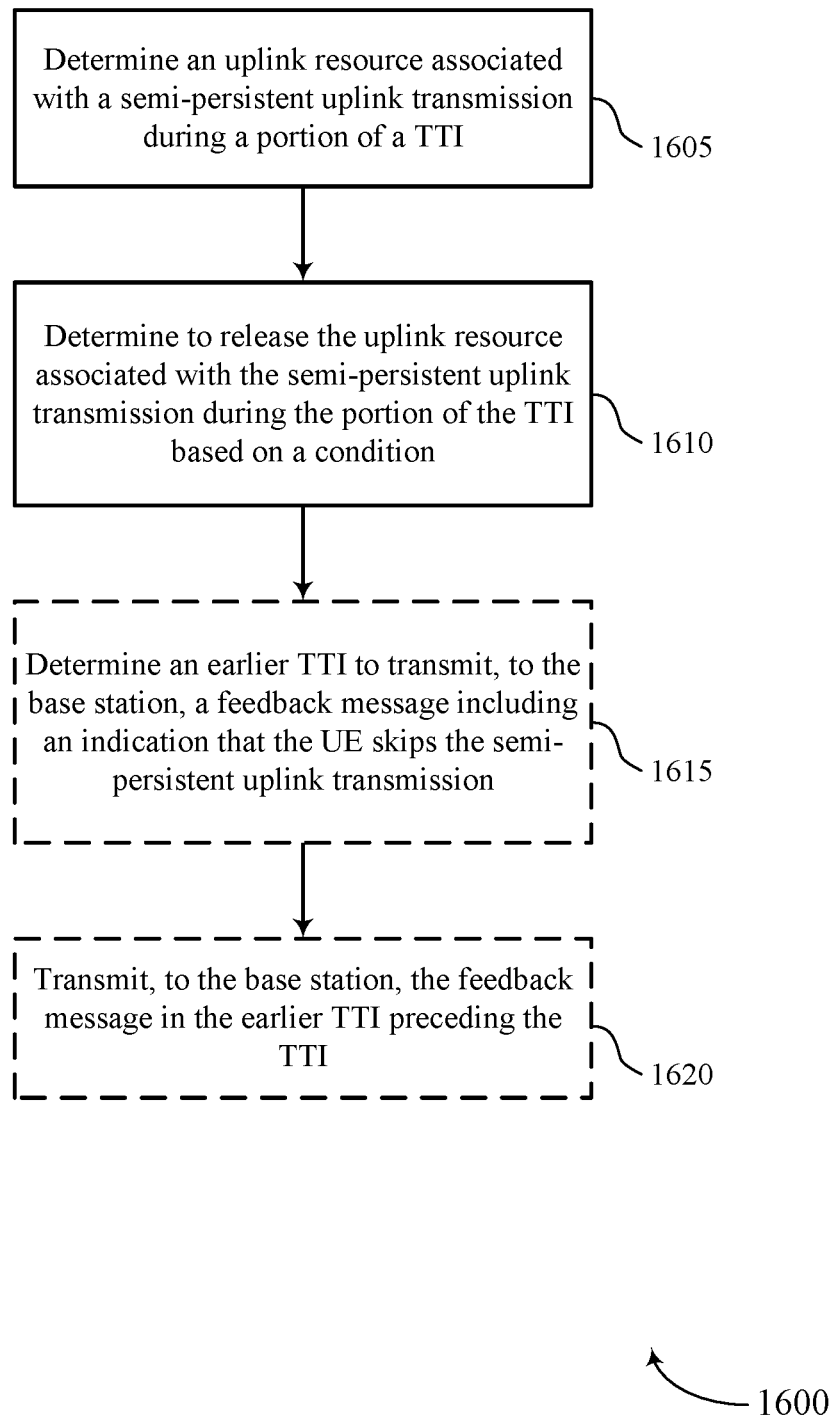

FIG. 16 shows a flowchart illustrating a method 1600 that supports techniques for grant free transmissions in full duplex wireless communication systems in accordance with one or more aspects of the present disclosure. The operations of method 1600 may be implemented by a UE or its components as described herein. For example, the operations of method 1600 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may determine an uplink resource associated with a semi-persistent uplink transmission during a portion of a TTI. The operations of 1605 may be performed according to the methods described herein. In some examples, aspects of the operations of 1605 may be performed by a resource component as described with reference to FIGS. 6 through 9.

At 1610, the UE may determine to release the uplink resource associated with the semi-persistent uplink transmission during the portion of the TTI based on a condition. The operations of 1610 may be performed according to the methods described herein. In some examples, aspects of the operations of 1610 may be performed by a resource component as described with reference to FIGS. 6 through 9.

At 1615, the UE may determine an earlier TTI to transmit, to the base station, a feedback message including an indication that the UE skips the semi-persistent uplink transmission. The operations of 1615 may be performed according to the methods described herein. In some examples, aspects of the operations of 1615 may be performed by a timing component as described with reference to FIGS. 6 through 9.

At 1620, the UE may transmit, to the base station, the feedback message in the earlier TTI preceding the TTI. The operations of 1620 may be performed according to the methods described herein. In some examples, aspects of the operations of 1620 may be performed by a timing component as described with reference to FIGS. 6 through 9.

Figure 17:
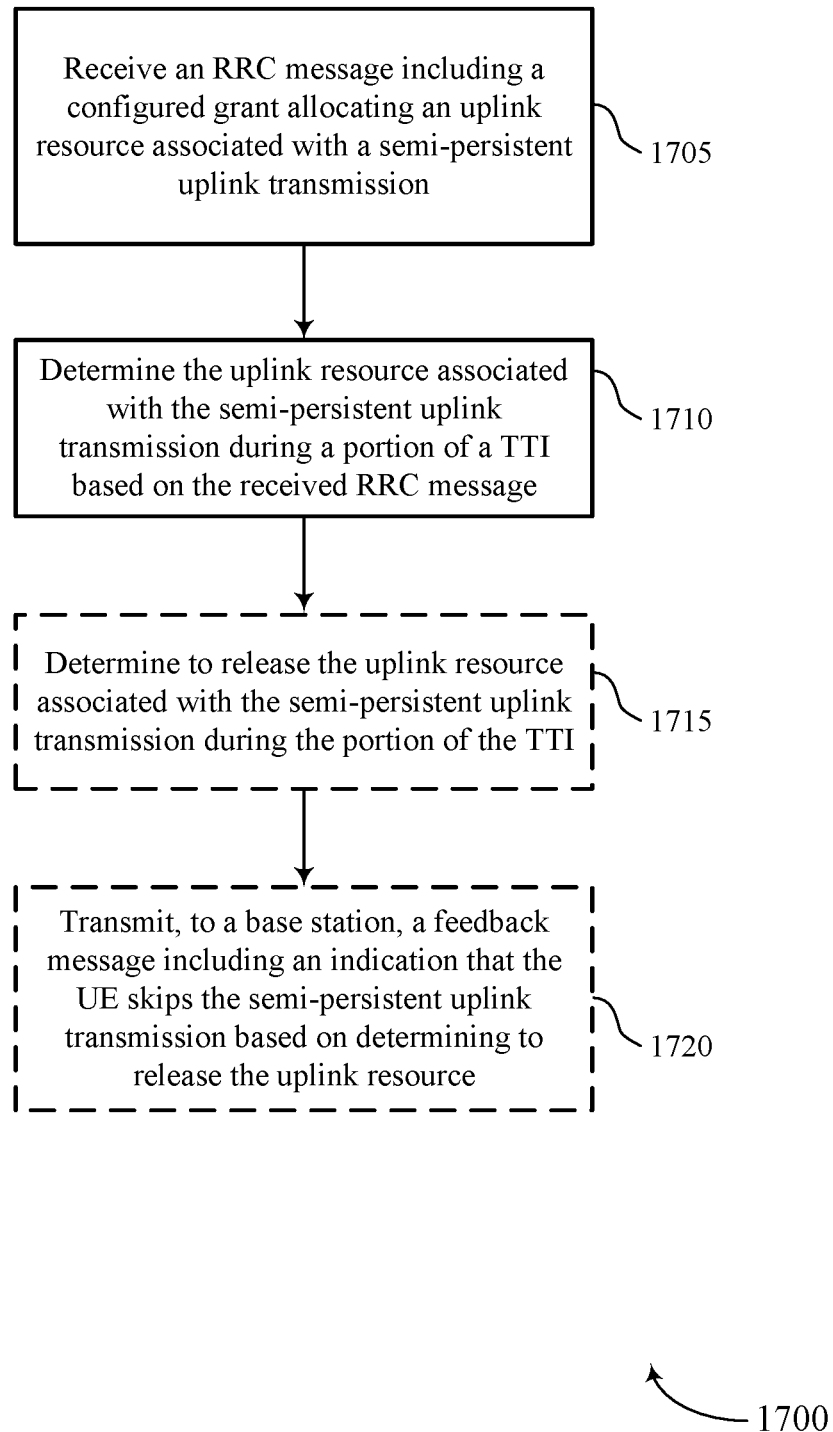

FIG. 17 shows a flowchart illustrating a method 1700 that supports techniques for grant free transmissions in full duplex wireless communication systems in accordance with one or more aspects of the present disclosure. The operations of method 1700 may be implemented by a UE or its components as described herein. For example, the operations of method 1700 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive an RRC message including a configured grant allocating an uplink resource associated with a semi-persistent uplink transmission. The operations of 1705 may be performed according to the methods described herein. In some examples, aspects of the operations of 1705 may be performed by a grant component as described with reference to FIGS. 6 through 9.

At 1710, the UE may determine the uplink resource associated with the semi-persistent uplink transmission during a portion of a TTI based on the received RRC message. The operations of 1710 may be performed according to the methods described herein. In some examples, aspects of the operations of 1710 may be performed by a resource component as described with reference to FIGS. 6 through 9.

At 1715, the UE may determine to release the uplink resource associated with the semi-persistent uplink transmission during the portion of the TTI. The operations of 1715 may be performed according to the methods described herein. In some examples, aspects of the operations of 1715 may be performed by a resource component as described with reference to FIGS. 6 through 9.

At 1720, the UE may transmit, to a base station, a feedback message including an indication that the UE skips the semi-persistent uplink transmission based on determining to release the uplink resource. The operations of 1720 may be performed according to the methods described herein. In some examples, aspects of the operations of 1720 may be performed by a feedback component as described with reference to FIGS. 6 through 9.

Figure 18:
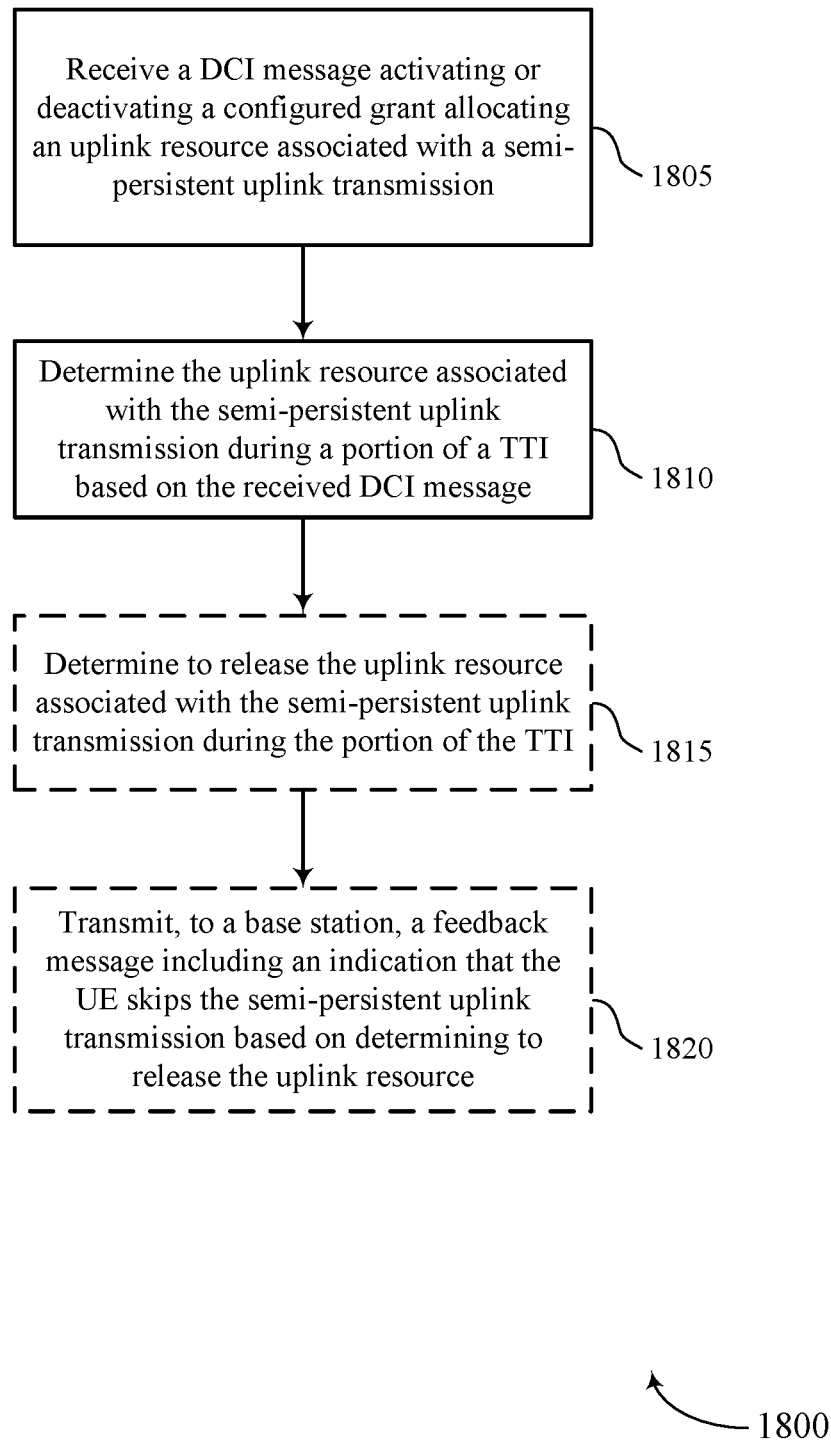

FIG. 18 shows a flowchart illustrating a method 1800 that supports techniques for grant free transmissions in full duplex wireless communication systems in accordance with one or more aspects of the present disclosure. The operations of method 1800 may be implemented by a UE or its components as described herein. For example, the operations of method 1800 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may receive a DCI message activating or deactivating a configured grant allocating an uplink resource associated with a semi-persistent uplink transmission. The operations of 1805 may be performed according to the methods described herein. In some examples, aspects of the operations of 1805 may be performed by a grant component as described with reference to FIGS. 6 through 9.

At 1810, the UE may determine the uplink resource associated with the semi-persistent uplink transmission during a portion of a TTI based on the received DCI message. The operations of 1810 may be performed according to the methods described herein. In some examples, aspects of the operations of 1810 may be performed by a resource component as described with reference to FIGS. 6 through 9.

At 1815, the UE may determine to release the uplink resource associated with the semi-persistent uplink transmission during the portion of the TTI. The operations of 1815 may be performed according to the methods described herein. In some examples, aspects of the operations of 1815 may be performed by a resource component as described with reference to FIGS. 6 through 9.

At 1820, the UE may transmit, to a base station, a feedback message including an indication that the UE skips the semi-persistent uplink transmission based on determining to release the uplink resource. The operations of 1820 may be performed according to the methods described herein. In some examples, aspects of the operations of 1820 may be performed by a feedback component as described with reference to FIGS. 6 through 9.

Figure 19:
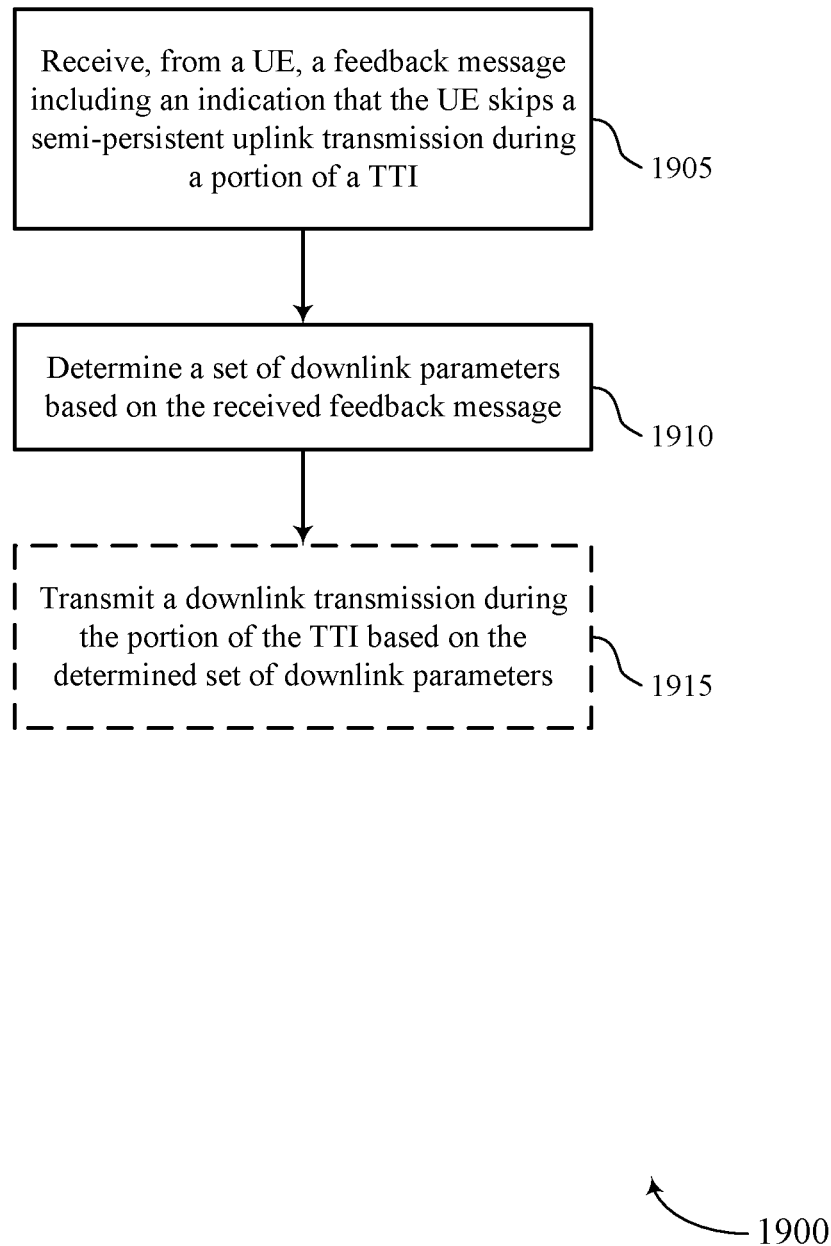

FIG. 19 shows a flowchart illustrating a method 1900 that supports techniques for grant free transmissions in full duplex wireless communication systems in accordance with one or more aspects of the present disclosure. The operations of method 1900 may be implemented by a second device (e.g., a base station, a CU, a parent node, etc.) or its components as described herein. That is, although aspects of the methods herein are described as being performed by a base station, the various operations may additionally or alternatively be performed by the second device as described herein. For example, the operations of method 1900 may be performed by a base station communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may receive, from a UE, a feedback message including an indication that the UE skips a semi-persistent uplink transmission during a portion of a TTI. The operations of 1905 may be performed according to the methods described herein. In some examples, aspects of the operations of 1905 may be performed by a feedback component as described with reference to FIGS. 10 through 13.

At 1910, the base station may determine a set of downlink parameters based on the received feedback message. The operations of 1910 may be performed according to the methods described herein. In some examples, aspects of the operations of 1910 may be performed by a parameter component as described with reference to FIGS. 10 through 13.

At 1915, the base station may transmit a downlink transmission during the portion of the TTI based on the determined set of downlink parameters. The operations of 1915 may be performed according to the methods described herein. In some examples, aspects of the operations of 1915 may be performed by a downlink component as described with reference to FIGS. 10 through 13.

Figure 20:
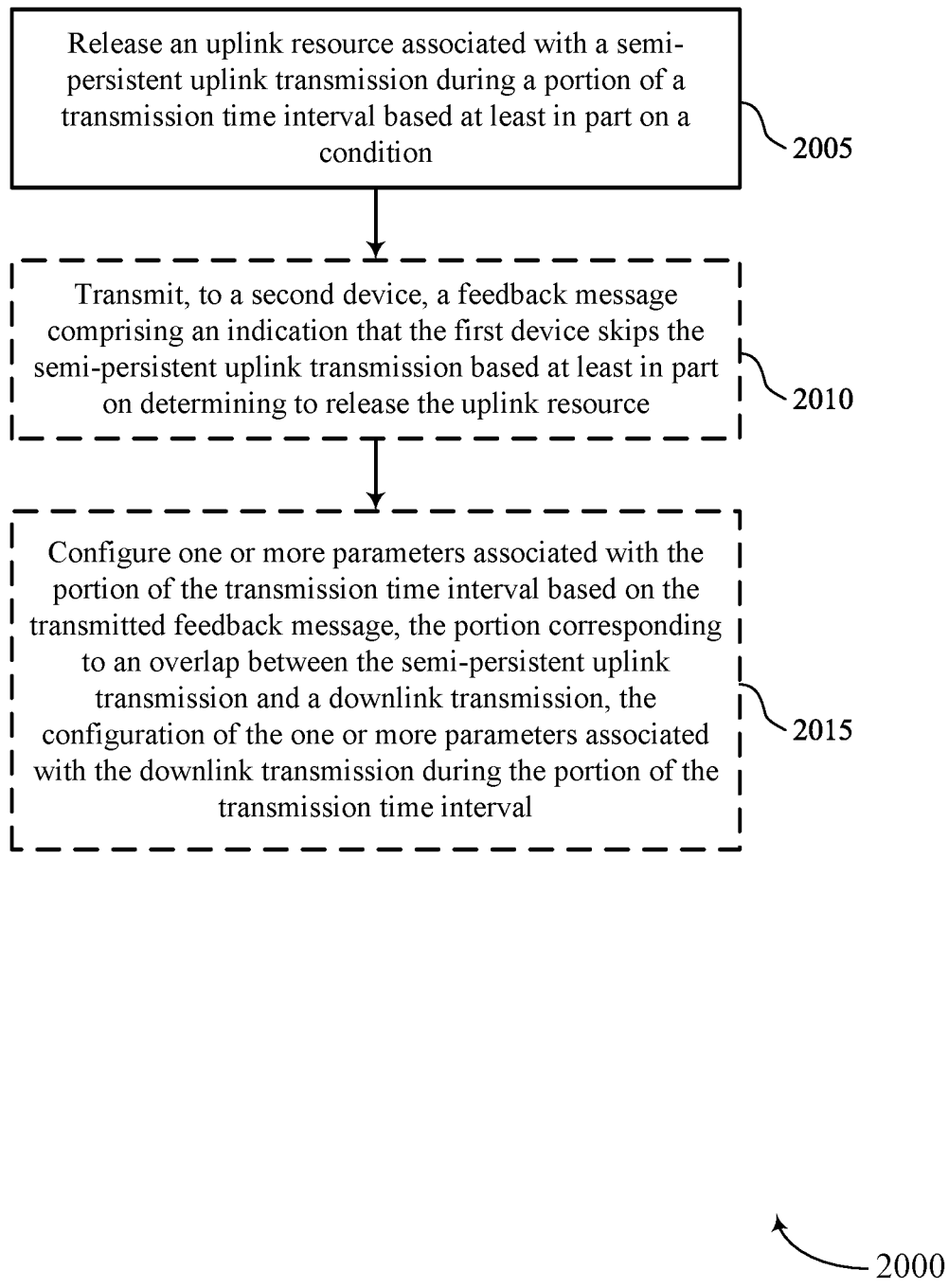

FIG. 20 shows a flowchart illustrating a method 2000 that supports techniques for grant free transmissions in full duplex wireless communication systems in accordance with aspects of the present disclosure. The operations of the method 2000 may be implemented by a UE or its components as described herein. For example, the operations of the method 2000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 2005, the method may include releasing an uplink resource associated with a semi-persistent uplink transmission during a portion of a transmission time interval based on a condition. The operations of 2005 may be performed in accordance with examples as disclosed herein. In some examples, aspects of the operations of 2005 may be performed by a resource component 810 as described with reference to FIG. 8.

At 2010, the method may include transmitting, to a second device, a feedback message including an indication that the first device skips the semi-persistent uplink transmission based on releasing the uplink resource. The operations of 2010 may be performed in accordance with examples as disclosed herein. In some examples, aspects of the operations of 2010 may be performed by a feedback component 815 as described with reference to FIG. 8.

At 2015, the method may include configuring one or more parameters associated with the portion of the transmission time interval based on the transmitted feedback message, the portion corresponding to an overlap between the semi-persistent uplink transmission and a downlink transmission, the configuration of the one or more parameters associated with the downlink transmission during the portion of the transmission time interval. The operations of 2015 may be performed in accordance with examples as disclosed herein. In some examples, aspects of the operations of 1415 may be performed by a resource component 810 as described with reference to FIG. 8.

Figure 21:
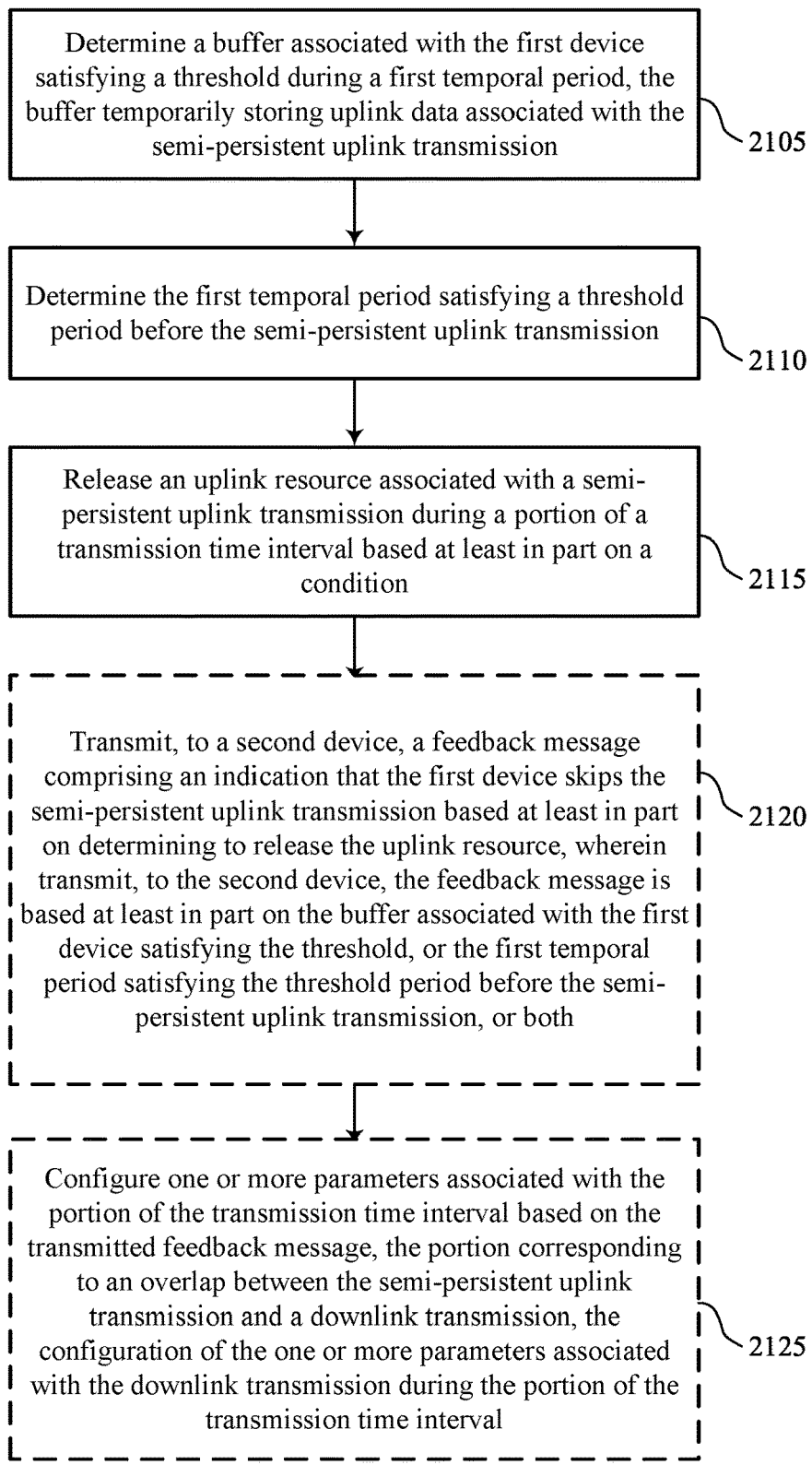

FIG. 21 shows a flowchart illustrating a method 2100 that supports techniques for grant free transmissions in full duplex wireless communication systems in accordance with aspects of the present disclosure. The operations of the method 2100 may be implemented by a UE or its components as described herein. For example, the operations of the method 2100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 2105, the method may include determining a buffer associated with the first device satisfying a threshold during a first temporal period, the buffer temporarily storing uplink data associated with the semi-persistent uplink transmission. The operations of 2105 may be performed in accordance with examples as disclosed herein. In some examples, aspects of the operations of 2105 may be performed by a buffer component 825 as described with reference to FIG. 8.

At 2110, the method may include determining the first temporal period satisfying a threshold period before the semi-persistent uplink transmission. The operations of 2110 may be performed in accordance with examples as disclosed herein.

In some examples, aspects of the operations of 2110 may be performed by a buffer component 825 as described with reference to FIG. 8.

At 2115, the method may include releasing an uplink resource associated with a semi-persistent uplink transmission during a portion of a transmission time interval based on a condition. The operations of 2115 may be performed in accordance with examples as disclosed herein. In some examples, aspects of the operations of 2115 may be performed by a resource component 810 as described with reference to FIG. 8.

At 2120, the method may include transmitting, to a second device, a feedback message including an indication that the first device skips the semi-persistent uplink transmission based on releasing the uplink resource, where transmitting, to the second device, the feedback message is based on the buffer associated with the first device satisfying the threshold, or the first temporal period satisfying the threshold period before the semi-persistent uplink transmission, or both. The operations of 2120 may be performed in accordance with examples as disclosed herein. In some examples, aspects of the operations of 2120 may be performed by a feedback component 815 as described with reference to FIG. 8.

At 2125, the method may include configuring one or more parameters associated with the portion of the transmission time interval based on the transmitted feedback message, the portion corresponding to an overlap between the semi-persistent uplink transmission and a downlink transmission, the configuration of the one or more parameters associated with the downlink transmission during the portion of the transmission time interval. The operations of 2125 may be performed in accordance with examples as disclosed herein. In some examples, aspects of the operations of 2125 may be performed by a resource component 810 as described with reference to FIG. 8.

Figure 22:
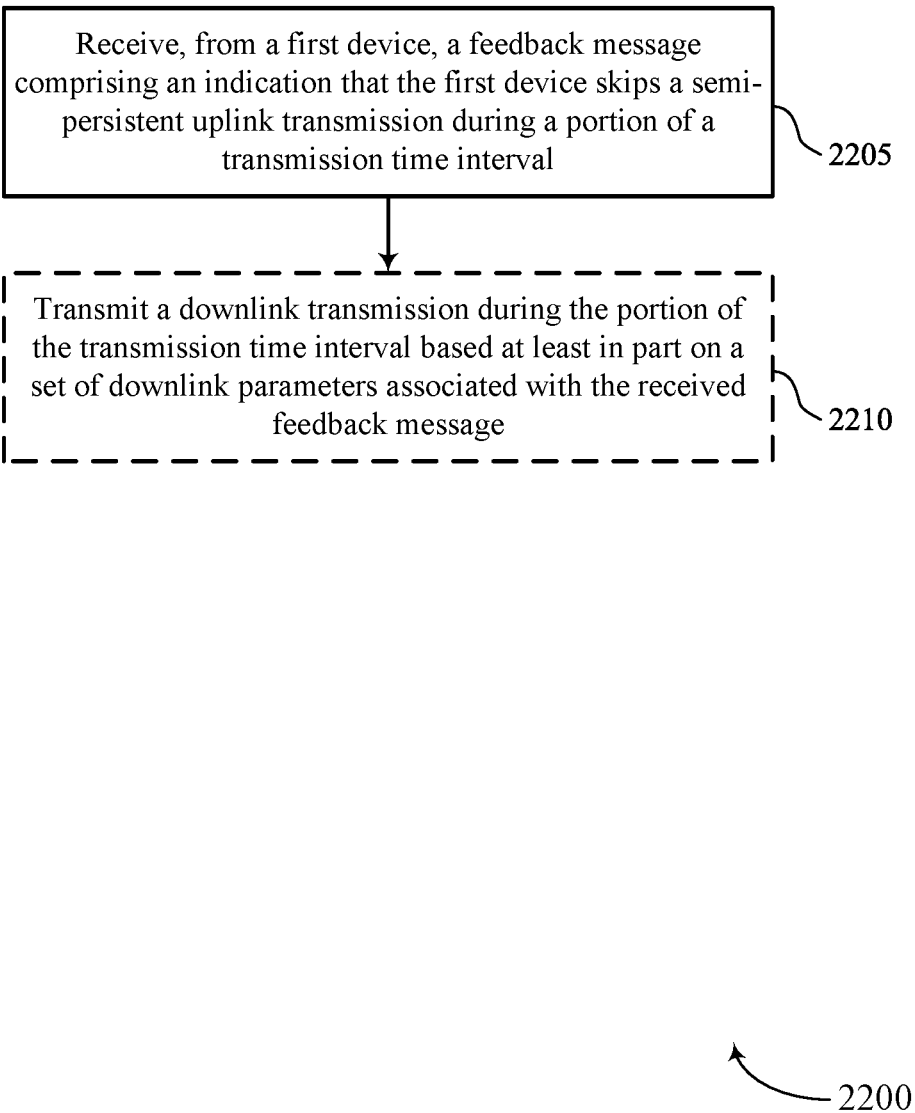

FIG. 22 shows a flowchart illustrating a method 2200 that supports techniques for grant free transmissions in full duplex wireless communication systems in accordance with aspects of the present disclosure. The operations of the method 2200 may be implemented by a base station or its components as described herein. For example, the operations of the method 2200 may be performed by a base station 105 as described with reference to FIGS. 1 through 13. In some examples, a base station may execute a set of instructions to control the functional elements of the base station to perform the described functions. Additionally or alternatively, the base station may perform aspects of the described functions using special-purpose hardware.

At 2205, the method may include receiving, from a first device, a feedback message including an indication that the first device skips a semi-persistent uplink transmission during a portion of a transmission time interval. The operations of 2205 may be performed in accordance with examples as disclosed herein. In some examples, aspects of the operations of 2205 may be performed by a feedback component 1210 as described with reference to FIG. 12.

At 2210, the method may include transmitting a downlink transmission during the portion of the transmission time interval based on a set of downlink parameters associated with the received feedback message. The operations of 2210 may be performed in accordance with examples as disclosed herein. In some examples, aspects of the operations of 2210 may be performed by a downlink component 1220 as described with reference to FIG. 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a first device, comprising: releasing an uplink resource associated with a semi-persistent uplink transmission during a portion of a transmission time interval based at least in part on a condition; transmitting, to a second device, a feedback message comprising an indication that the first device skips the semi-persistent uplink transmission based at least in part on releasing the uplink resource; and configuring one or more parameters associated with the portion of the transmission time interval based at least in part on the transmitted feedback message, the portion corresponding to an overlap between the semi-persistent uplink transmission and a downlink transmission, the configuration of the one or more parameters associated with the downlink transmission during the portion of the transmission time interval.

Aspect 2: The method of aspect 1, further comprising: receiving, based at least in part on the transmitted feedback message, the downlink transmission during the portion of the transmission time interval using a half duplex configuration, wherein the configuration corresponds to the half duplex configuration.

Aspect 3: The method of any of aspects 1 through 2, further comprising: receiving, based at least in part on refraining to transmit the feedback message, the downlink transmission during the portion of the transmission time interval using a full duplex configuration, wherein the configuration corresponds to the full duplex configuration.

Aspect 4: The method of any of aspects 1 through 3, further comprising: determining a buffer associated with the first device satisfying a threshold during a first temporal period, the buffer temporarily storing uplink data associated with the semi-persistent uplink transmission; and determining the first temporal period satisfying a threshold period before the semi-persistent uplink transmission, wherein transmitting, to the second device, the feedback message is based at least in part on the buffer associated with the first device satisfying the threshold, or the first temporal period satisfying the threshold period before the semi-persistent uplink transmission, or both.

Aspect 5: The method of any of aspects 1 through 4, wherein configuring the one or more parameters associated with the portion of the transmission time interval is based at least in part on a pre-configuration, a rule, or signaling from the second device, or a combination thereof.

Aspect 6: The method of aspect 5, wherein the signaling comprises a radio resource control message, a medium access control-control element message, or a downlink control information message, or a combination thereof.

Aspect 7: The method of any of aspects 1 through 6, wherein the one or more parameters comprise a modulation and coding scheme, a precoding matrix indicator, a rank indicator, or a transmission configuration indicator state, or a combination thereof.

Aspect 8: The method of any of aspects 1 through 7, further comprising: determining, based at least in part on a second indication, a threshold period to transmit, to the second device, the feedback message comprising the indication that the first device releases the uplink resource associated with the semi-persistent uplink transmission, wherein transmitting, to the second device, the feedback message is based at least in part on the threshold period.

Aspect 9: The method of aspect 8, further comprising: receiving a radio resource control message comprising the second indication of the threshold period to transmit, to the second device, the feedback message comprising the indication that the first device skips the semi-persistent uplink transmission, wherein transmitting, to the second device, the feedback message is based at least in part on the received radio resource control message comprising the second indication of the threshold period.

Aspect 10: The method of any of aspects 8 through 9, further comprising: receiving a medium access control-control element message comprising the second indication of the threshold period to transmit, to the second device, the feedback message comprising the indication that the first device skips the semi-persistent uplink transmission, wherein transmitting, to the second device, the feedback message is based at least in part on the received medium access control-control element message comprising the second indication of the threshold period.

Aspect 11: The method of any of aspects 8 through 10, further comprising: receiving a downlink control information message comprising the second indication of the threshold period to transmit, to the second device, the feedback message comprising the indication that the first device skips the semi-persistent uplink transmission, wherein transmitting, to the second device, the feedback message is based at least in part on the received downlink control information message comprising the second indication of the threshold period.

Aspect 12: The method of any of aspects 1 through 11, further comprising: determining an earlier transmission time interval than the transmission time interval to transmit, to the second device, the feedback message comprising the indication that the first device skips the semi-persistent uplink transmission; and transmitting, to the second device, the feedback message in the earlier transmission time interval, wherein the earlier transmission time interval precedes the transmission time interval, wherein the transmission time interval and the earlier transmission time interval are contiguous or noncontiguous.

Aspect 13: The method of any of aspects 1 through 12, wherein the first device is barred from transmitting the semi-persistent uplink transmission after transmitting, to the second device, the feedback message.

Aspect 14: The method of any of aspects 1 through 13, further comprising: receiving a radio resource control message comprising a configured grant allocating the semi-persistent uplink transmission wherein determining the uplink resource associated with the semi-persistent uplink transmission is based at least in part on the received radio resource control message comprising the configured grant.

Aspect 15: The method of any of aspects 1 through 14, further comprising: receiving a downlink control information message activating or deactivating a configured grant allocating the uplink resource associated with the semi-persistent uplink transmission, wherein determining the uplink resource associated with the semi-persistent uplink transmission is based at least in part on the received downlink control information message activating or deactivating the configured grant.

Aspect 16: The method of any of aspects 1 through 15, wherein the transmission time interval comprises a mini-slot or a slot.

Aspect 17: The method of any of aspects 1 through 15, wherein the first device comprises a user equipment or a distributed unit, and wherein the second device comprises a base station or a centralized unit.

Aspect 18: A method for wireless communication at a second device, comprising: receiving, from a first device, a feedback message comprising an indication that the first device skips a semi-persistent uplink transmission during a portion of a transmission time interval; and transmitting a downlink transmission during the portion of the transmission time interval based at least in part on a set of downlink parameters associated with the received feedback message.

Aspect 19: The method of aspect 18, further comprising: determining a modulation and coding scheme based at least in part on the received feedback message, wherein transmitting the downlink transmission during the portion of the transmission time interval is based at least in part on the determined modulation and coding scheme.

Aspect 20: The method of any of aspects 18 through 19, further comprising: determining a precoding matrix indicator or a rank indicator, or both, based at least in part on the received feedback message, wherein transmitting the downlink transmission during the portion of the transmission time interval is based at least in part on the determined precoding matrix indicator or the rank indicator, or both.

Aspect 21: The method of any of aspects 18 through 20, further comprising: determining a transmission configuration indicator state based at least in part on the received feedback message, wherein transmitting the downlink transmission during the portion of the transmission time interval is based at least in part on the determined transmission configuration indicator state.

Aspect 22: The method of any of aspects 18 through 21, further comprising: transmitting, to the first device, a configured grant allocating an uplink resource associated with the semi-persistent uplink transmission during the portion of the transmission time interval.

Aspect 23: The method of aspect 22, further comprising: transmitting a radio resource control message comprising the configured grant allocating an uplink resource associated with the semi-persistent uplink transmission during the portion of the transmission time interval.

Aspect 24: The method of any of aspects 22 through 23, further comprising: transmitting a downlink control information message activating or deactivating the configured grant allocating an uplink resource associated with the semi-persistent uplink transmission during the portion of the transmission time interval.

Aspect 25: The method of any of aspects 18 through 24, further comprising: transmitting a radio resource control message comprising a second indication of a threshold period for the first device to transmit, to the second device, the feedback message comprising the indication that the first device skips the semi-persistent uplink transmission, wherein receiving, from the first device, the feedback message is based at least in part on the transmitted radio resource control message comprising the second indication of the threshold period.

Aspect 26: The method of any of aspects 18 through 25, further comprising: transmitting a medium access control-control element message comprising a second indication of a threshold period for the first device to transmit, to the second device, the feedback message comprising the indication that the first device skips the semi-persistent uplink transmission, wherein receiving, from the first device, the feedback message is based at least in part on the transmitted medium access control-control element message comprising the second indication of the threshold period.

Aspect 27: The method of any of aspects 18 through 26, further comprising: transmitting a downlink control information message comprising a second indication of a threshold period for the first device to transmit, to the second device, the feedback message comprising the indication that the first device skips the semi-persistent uplink transmission, wherein receiving, from the first device, the feedback message is based at least in part on the transmitted downlink control information message comprising the second indication of the threshold period.

Aspect 28: The method of any of aspects 18 through 27, wherein the first device is barred from transmitting the semi-persistent uplink transmission after the second device received the feedback message.

Aspect 29: The method of any of aspects 18 through 28, wherein the transmission time interval comprises a mini-slot or a slot.

Aspect 30: A method for wireless communication at a UE, comprising: determining an uplink resource associated with a semi-persistent uplink transmission during a portion of a transmission time interval; determining to release the uplink resource associated with the semi-persistent uplink transmission during the portion of the transmission time interval based at least in part on a condition; and transmitting, to a base station, a feedback message comprising an indication that the UE skips the semi-persistent uplink transmission based at least in part on determining to release the uplink resource.

Aspect 31: The method of aspect 30, further comprising: determining a configuration associated with the portion of the transmission time interval, the portion corresponding to an overlap between the semi-persistent uplink transmission and a downlink transmission, based at least in part on the transmitted feedback message, the configuration comprising one or more parameters associated with the downlink transmission during the portion of the transmission time interval.

Aspect 32: The method of aspect 31, further comprising: receiving, based at least in part on the transmitted feedback message, the downlink transmission during the portion of the transmission time interval using a half duplex configuration, wherein the configuration corresponds to the half duplex configuration.

Aspect 33: The method of any of aspects 31 through 32, further comprising: receiving, based at least in part on refraining to transmit the feedback message, the downlink transmission during the portion of the transmission time interval using a full duplex configuration, wherein the configuration corresponds to the full duplex configuration.

Aspect 34: The method of any of aspects 31 through 33, wherein determining the configuration associated with the portion of the transmission time interval is based at least in part on a pre-configuration, a rule, or a signaling from the base station, or a combination thereof.

Aspect 35: The method of aspect 34, wherein the signaling comprises a radio resource control message, a medium access control-control element message, or a downlink control information message, or a combination thereof.

Aspect 36: The method of any of aspects 31 through 35, wherein the one or more downlink parameters comprises a modulation and coding scheme, a precoding matrix indicator, a rank indicator, or a transmission configuration indicator state, or a combination thereof.

Aspect 37: The method of any of aspects 30 through 36, further comprising: determining a buffer associated with the UE satisfying a threshold during a first temporal period, the buffer temporarily storing uplink data associated with the semi-persistent uplink transmission; and determining the first temporal period satisfying a threshold period before the semi-persistent uplink transmission, wherein transmitting, to the base station, the feedback message is based at least in part on the buffer associated with the UE satisfying the threshold, or the first temporal period satisfying the threshold period before the semi-persistent uplink transmission, or both.

Aspect 38: The method of any of aspects 30 through 37, further comprising: determining, based at least in part on a second indication, a threshold period to transmit, to the base station, the feedback message comprising the indication that the UE releases the uplink resource associated with the semi-persistent uplink transmission, wherein transmitting, to the base station, the feedback message is based at least in part on the threshold period.

Aspect 39: The method of aspect 38, further comprising: receiving a radio resource control message comprising the second indication of the threshold period to transmit, to the base station, the feedback message comprising the indication that the UE skips the semi-persistent uplink transmission, wherein transmitting, to the base station, the feedback message is based at least in part on the received radio resource control message comprising the second indication of the threshold period.

Aspect 40: The method of any of aspects 38 through 39, further comprising: receiving a medium access control-control element message comprising the second indication of the threshold period to transmit, to the base station, the feedback message comprising the indication that the UE skips the semi-persistent uplink transmission, wherein transmitting, to the base station, the feedback message is based at least in part on the received medium access control-control element message comprising the second indication of the threshold period.

Aspect 41: The method of any of aspects 38 through 40, further comprising: receiving a downlink control information message comprising the second indication of the threshold period to transmit, to the base station, the feedback message comprising the indication that the UE skips the semi-persistent uplink transmission, wherein transmitting, to the base station, the feedback message is based at least in part on the received downlink control information message comprising the second indication of the threshold period.

Aspect 42: The method of any of aspects 30 through 41, further comprising: determining an earlier transmission time interval than the transmission time interval to transmit, to the base station, the feedback message comprising the indication that the UE skips the semi-persistent uplink transmission; and transmitting, to the base station, the feedback message in the earlier transmission time interval, wherein the earlier transmission time interval precedes the transmission time interval.

Aspect 43: The method of aspect 42, wherein the transmission time interval and the earlier transmission time interval are contiguous.

Aspect 44: The method of any of aspects 42 through 43, wherein the transmission time interval and the earlier transmission time interval are noncontiguous.

Aspect 45: The method of any of aspects 30 through 44, wherein the UE is barred from transmitting the semi-persistent uplink transmission after transmitting, to the base station, the feedback message.

Aspect 46: The method of any of aspects 30 through 45, further comprising: receiving a radio resource control message comprising a configured grant allocating the semi-persistent uplink transmission wherein determining the uplink resource associated with the semi-persistent uplink transmission is based at least in part on the received radio resource control message comprising the configured grant.

Aspect 47: The method of any of aspects 30 through 46, further comprising: receiving a downlink control information message activating or deactivating a configured grant allocating the uplink resource associated with the semi-persistent uplink transmission, wherein determining the uplink resource associated with the semi-persistent uplink transmission is based at least in part on the received downlink control information message activating or deactivating the configured grant.

Aspect 48: The method of any of aspects 30 through 47, wherein the portion of the transmission time interval comprises a set of orthogonal frequency-division multiplexing symbols.

Aspect 49: The method of aspect 48, wherein the set of orthogonal frequency-division multiplexing symbols comprises at least one orthogonal frequency-division multiplexing symbol before the portion of the transmission time interval or at least one orthogonal frequency-division multiplexing symbol after the portion of the transmission time interval, or both.

Aspect 50: The method of any of aspects 30 through 49, wherein the transmission time interval comprises a mini-slot.

Aspect 51: The method of any of aspects 30 through 50, wherein the transmission time interval comprises a slot.

Aspect 52: A method for wireless communication at a base station, comprising: receiving, from a UE, a feedback message comprising an indication that the UE skips a semi-persistent uplink transmission during a portion of a transmission time interval; determining a set of downlink parameters based at least in part on the received feedback message; and transmitting a downlink transmission during the portion of the transmission time interval based at least in part on the determined set of downlink parameters.

Aspect 53: The method of aspect 52, further comprising: determining a modulation and coding scheme based at least in part on the received feedback message, wherein transmitting the downlink transmission during the portion of the transmission time interval is based at least in part on the determined modulation and coding scheme.

Aspect 54: The method of any of aspects 52 through 53, further comprising: determining a precoding matrix indicator or a rank indicator, or both, based at least in part on the received feedback message, wherein transmitting the downlink transmission during the portion of the transmission time interval is based at least in part on the determined precoding matrix indicator or the rank indicator, or both.

Aspect 55: The method of any of aspects 52 through 54, further comprising: determining a transmission configuration indicator state based at least in part on the received feedback message, wherein transmitting the downlink transmission during the portion of the transmission time interval is based at least in part on the determined transmission configuration indicator state.

Aspect 56: The method of any of aspects 52 through 55, further comprising: transmitting, to the UE, a configured grant allocating an uplink resource associated with the semi-persistent uplink transmission during the portion of the transmission time interval.

Aspect 57: The method of aspect 56, further comprising: transmitting a radio resource control message comprising the configured grant allocating an uplink resource associated with the semi-persistent uplink transmission during the portion of the transmission time interval.

Aspect 58: The method of any of aspects 56 through 57, further comprising: transmitting a downlink control information message activating or deactivating the configured grant allocating an uplink resource associated with the semi-persistent uplink transmission during the portion of the transmission time interval.

Aspect 59: The method of any of aspects 52 through 58, further comprising: transmitting a radio resource control message comprising a second indication of a threshold period for the UE to transmit, to the base station, the feedback message comprising the indication that the UE skips the semi-persistent uplink transmission, wherein receiving, from the UE, the feedback message is based at least in part on the transmitted radio resource control message comprising the second indication of the threshold period.

Aspect 60: The method of any of aspects 52 through 59, further comprising: transmitting a medium access control-control element message comprising a second indication of a threshold period for the UE to transmit, to the base station, the feedback message comprising the indication that the UE skips the semi-persistent uplink transmission, wherein receiving, from the UE, the feedback message is based at least in part on the transmitted medium access control-control element message comprising the second indication of the threshold period.

Aspect 61: The method of any of aspects 52 through 60, further comprising: transmitting a downlink control information message comprising a second indication of a threshold period for the UE to transmit, to the base station, the feedback message comprising the indication that the UE skips the semi-persistent uplink transmission, wherein receiving, from the UE, the feedback message is based at least in part on the transmitted downlink control information message comprising the second indication of the threshold period.

Aspect 62: The method of any of aspects 52 through 61, wherein the UE is barred from transmitting the semi-persistent uplink transmission after the base station received the feedback message.

Aspect 63: The method of any of aspects 52 through 62, wherein the transmission time interval comprises a mini-slot.

Aspect 64: The method of any of aspects 52 through 63, wherein the transmission time interval comprises a slot.

Aspect 65: The method of any of aspects 52 through 63, wherein the first device comprises a user equipment or a distributed unit, and wherein the second device comprises a base station or a centralized unit.

Aspect 66: An apparatus for wireless communication at a first device, comprising a processor; memory coupled to the processor, the processor and memory configured to perform a method of any of aspects 1 through 16.

Aspect 67: An apparatus for wireless communication at a first device, comprising at least one means for performing a method of any of aspects 1 through 16.

Aspect 68: A non-transitory computer-readable medium storing code for wireless communication at a first device, the code comprising instructions executable by a processor to perform a method of any of aspects 1 through 16.

Aspect 69: An apparatus for wireless communication at a second device, comprising a processor; memory coupled to the processor, the processor and memory configured to perform a method of any of aspects 18 through 29.

Aspect 70: An apparatus for wireless communication at a second device, comprising at least one means for performing a method of any of aspects 18 through 29.

Aspect 71: A non-transitory computer-readable medium storing code for wireless communication at a second device, the code comprising instructions executable by a processor to perform a method of any of aspects 18 through 29.

Aspect 72: An apparatus for wireless communication at a UE, comprising a processor; memory coupled to the processor, the processor and memory configured to perform a method of any of aspects 30 through 51.

Aspect 73: An apparatus for wireless communication at a UE, comprising at least one means for performing a method of any of aspects 30 through 51.

Aspect 74: A non-transitory computer-readable medium storing code for wireless communication at a UE, the code comprising instructions executable by a processor to perform a method of any of aspects 30 through 51.

Aspect 75: An apparatus for wireless communication at a base station, comprising a processor; memory coupled to the processor, the processor and memory configured to perform a method of any of aspects 52 through 64.

Aspect 76: An apparatus for wireless communication at a base station, comprising at least one means for performing a method of any of aspects 52 through 64.

Aspect 77: A non-transitory computer-readable medium storing code for wireless communication at a base station, the code comprising instructions executable by a processor to perform a method of any of aspects 52 through 64.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first device, comprising:
   one or more memories; and
   one or more processors coupled with the one or more memories and configured to cause the first device to:
   transmit, to a second device and prior to a semi-persistent uplink transmission, a feedback message comprising an indication that the first device is to skip the semi-persistent uplink transmission during a portion of a transmission time interval based at least in part on a release, by the first device, of an uplink resource associated with the semi-persistent uplink transmission; and
   configure one or more downlink parameters associated with the portion of the transmission time interval based at least in part on the transmitted feedback message and on the release of the uplink resource associated with the semi-persistent uplink transmission, the portion of the transmission time interval corresponding to at least a partial overlap in time between the semi-persistent uplink transmission and a downlink transmission, the one or more downlink parameters associated with the downlink transmission during the portion of the transmission time interval.

2. The apparatus of claim 1, further comprising one or more antenna arrays, wherein the one or more processors are configured to cause the first device to:
   receive, via the one or more antenna arrays and based at least in part on the transmitted feedback message, the downlink transmission during the portion of the transmission time interval in accordance with a half duplex configuration, wherein the one or more downlink parameters correspond to the half duplex configuration.

3. The apparatus of claim 1, wherein the one or more processors are further configured to cause the first device to:
   determine a buffer associated with satisfaction of a threshold by the first device during a first temporal period, wherein uplink data associated with the semi-persistent uplink transmission is temporarily stored by the buffer; and
   determine the first temporal period associated with satisfaction of a threshold period before the semi-persistent uplink transmission, wherein transmission, to the second device, of the feedback message is based at least in part on the buffer associated with the satisfaction of the threshold by the first device, or the first temporal period associated with the satisfaction of the threshold period before the semi-persistent uplink transmission, or both.

4. The apparatus of claim 1, wherein, to configure the one or more downlink parameters, the one or more processors are further configured to cause the first device to:
   configure the one or more downlink parameters associated with the portion of the transmission time interval based at least in part on a pre-configuration, a rule, signaling from the second device, or a combination thereof.

5. The apparatus of claim 4, wherein the signaling comprises a radio resource control message, a medium access control-control element message, a downlink control information message, or a combination thereof.

6. The apparatus of claim 1, wherein the one or more downlink parameters comprise a modulation and coding scheme, a precoding matrix indicator, a rank indicator, a transmission configuration indicator state, or a combination thereof.

7. The apparatus of claim 1, wherein the one or more processors are further configured to cause the first device to:
   determine, based at least in part on a second indication, a threshold period to transmit, to the second device, the feedback message comprising the indication that the first device is to skip the semi-persistent uplink transmission, wherein the feedback message is transmitted based at least in part on the threshold period.

8. The apparatus of claim 7, wherein the one or more processors are further configured to cause the first device to:
receive a radio resource control message that indicates the threshold period to transmit, to the second device, the feedback message comprising the indication that the first device is to skip the semi-persistent uplink transmission, wherein the feedback message is transmitted based at least in part on the received radio resource control message that indicates the threshold period to transmit.

9. The apparatus of claim 7, wherein the one or more processors are further configured to cause the first device to:
receive a medium access control (MAC) control element (CE) message that indicates the threshold period to transmit, to the second device, the feedback message comprising the indication that the first device is to skip the semi-persistent uplink transmission, wherein the feedback message is transmitted based at least in part on the received MAC-CE message that indicates the threshold period to transmit.

10. The apparatus of claim 7, wherein the one or more processors are further configured to cause the first device to:
receive a downlink control information message that indicates the threshold period to transmit, to the second device, the feedback message comprising the indication that the first device is to skip the semi-persistent uplink transmission, wherein the feedback message is transmitted based at least in part on the received downlink control information message that indicates the threshold period to transmit.

11. The apparatus of claim 1, wherein the one or more processors are further configured to cause the first device to:
determine an earlier transmission time interval than the transmission time interval to transmit, to the second device, the feedback message comprising the indication that the first device is to skip the semi-persistent uplink transmission; and
transmit, to the second device, the feedback message in the earlier transmission time interval, wherein the earlier transmission time interval precedes the transmission time interval, and wherein the transmission time interval and the earlier transmission time interval are one of contiguous or noncontiguous.

12. The apparatus of claim 1, wherein the first device is barred from transmitting the semi-persistent uplink transmission after the feedback message is transmitted to the second device.

13. The apparatus of claim 1, wherein the one or more processors are further configured to cause the first device to:
receive a radio resource control message comprising a configured grant that allocates the semi-persistent uplink transmission, wherein the uplink resource associated with the semi-persistent uplink transmission is based at least in part on the received radio resource control message comprising the configured grant.

14. The apparatus of claim 1, wherein the one or more processors are further configured to cause the first device to:
receive a downlink control information message comprising an activation or a deactivation of a configured grant that allocates the uplink resource associated with the semi-persistent uplink transmission, wherein the uplink resource associated with the semi-persistent uplink transmission is based at least in part on the received downlink control information message comprising the activation or the deactivation of the configured grant.

15. The apparatus of claim 1, wherein:
the first device comprises a user equipment or a distributed unit, and
the second device comprises a base station or a centralized unit.

16. An apparatus for wireless communication at a second device, comprising:
one or more memories; and
one or more processors coupled with the one or more memories and configured to cause the second device to:
receive, from a first device and prior to a semi-persistent uplink transmission, a feedback message comprising an indication that the first device is to skip the semi-persistent uplink transmission during a portion of a transmission time interval; and
transmit a downlink transmission during the portion of the transmission time interval in accordance with a set of downlink parameters wherein the set of downlink parameters is based at least in part on the indication that the first device is to skip the semi-persistent uplink transmission during the portion of the transmission time interval, and wherein the portion of the transmission time interval corresponds to at least a partial overlap in time between the semi-persistent uplink transmission and the downlink transmission.

17. The apparatus of claim 16, wherein the one or more processors are further configured to cause the second device to:
determine a modulation and coding scheme based at least in part on the received feedback message, wherein the transmission of the downlink transmission during the portion of the transmission time interval is based at least in part on the determined modulation and coding scheme.

18. The apparatus of claim 16, wherein the one or more processors are further configured to cause the second device to:
determine a precoding matrix indicator or a rank indicator, or both, based at least in part on the received feedback message, wherein the transmission of the downlink transmission during the portion of the transmission time interval is based at least in part on the determined precoding matrix indicator or the rank indicator, or both.

19. The apparatus of claim 16, wherein the one or more processors are further configured to cause the second device to:
determine a transmission configuration indicator state based at least in part on the received feedback message, wherein the transmission of the downlink transmission during the portion of the transmission time interval is based at least in part on the determined transmission configuration indicator state.

20. The apparatus of claim 16, further comprising one or more antenna arrays, wherein the one or more processors are configured to cause the second device to:
transmit, to the first device and via the one or more antenna arrays, a configured grant that allocates an uplink resource associated with the semi-persistent uplink transmission during the portion of the transmission time interval.

21. The apparatus of claim 20, wherein the one or more processors are further configured to cause the second device to:

transmit a radio resource control message comprising the configured grant that allocates the uplink resource associated with the semi-persistent uplink transmission during the portion of the transmission time interval.

22. The apparatus of claim 20, wherein the one or more processors are further configured to cause the second device to:
transmit a downlink control information message comprising an activation or a deactivation of the configured grant that allocates the uplink resource associated with the semi-persistent uplink transmission during the portion of the transmission time interval.

23. The apparatus of claim 16, wherein the one or more processors are further configured to cause the second device to:
transmit a radio resource control message comprising a second indication of a threshold period for the first device to receive, from the second device, the feedback message comprising the indication that the first device is to skip the semi-persistent uplink transmission, wherein the feedback message is received based at least in part on the transmitted radio resource control message comprising the second indication of the threshold period.

24. The apparatus of claim 16, wherein the one or more processors are further configured to cause the second device to:
transmit a medium access control (MAC) control element (CE) message comprising a second indication of a threshold period for the first device to receive, from the second device, the feedback message comprising the indication that the first device is to skip the semi-persistent uplink transmission, wherein the feedback message is received based at least in part on the transmitted MAC-CE message comprising the second indication of the threshold period.

25. The apparatus of claim 16, wherein the one or more processors are further configured to cause the second device to:
transmit a downlink control information message comprising a second indication of a threshold period for the first device to receive, from the second device, the feedback message comprising the indication that the first device is to skip the semi-persistent uplink transmission, wherein the feedback message is received based at least in part on the transmitted downlink control information message comprising the second indication of the threshold period.

26. The apparatus of claim 16, wherein the first device is barred from transmitting the semi-persistent uplink transmission after the feedback message is received by the second device.

27. The apparatus of claim 16, wherein:
the first device comprises a user equipment or a distributed unit, and
the second device comprises a base station or a centralized unit.

28. A method for wireless communication at a first device, comprising:
transmitting, to a second device and prior to a semi-persistent uplink transmission, a feedback message comprising an indication that the first device is to skip the semi-persistent uplink transmission during a portion of a transmission time interval based at least in part on a release, by the first device, of an uplink resource associated with the semi-persistent uplink transmission; and
configuring one or more downlink parameters associated with the portion of the transmission time interval based at least in part on the transmitted feedback message and on the release of the uplink resource associated with the semi-persistent uplink transmission, the portion of the transmission time interval corresponding to at least a partial overlap in time between the semi-persistent uplink transmission and a downlink transmission, the one or more downlink parameters associated with the downlink transmission during the portion of the transmission time interval.

29. The method of claim 28, further comprising:
receiving the downlink transmission from the second device during the transmission time interval according to the one or more downlink parameters associated with the portion of the transmission time interval and based at least in part on the feedback message, wherein the one or more downlink parameters are based at least in part on at least the partial overlap in time between the semi-persistent uplink transmission and the downlink transmission and on the release of the uplink resource associated with the semi-persistent uplink transmission.

30. The method of claim 28, further comprising:
receiving a message comprising a second indication of a threshold period to transmit, to the second device, the feedback message comprising the indication that the first device is to skip the semi-persistent uplink transmission.

31. The method of claim 30, wherein the message comprises one of a radio resource control message, a medium access control (MAC) control element (CE) message, or a downlink control information message.

32. A method for wireless communication at a second device, comprising:
receiving, from a first device and prior to a semi-persistent uplink transmission, a feedback message comprising an indication that the first device is to skip the semi-persistent uplink transmission during a portion of a transmission time interval; and
transmitting a downlink transmission during the portion of the transmission time interval according to a set of downlink parameters, wherein the set of downlink parameters are based at least in part on the indication that the first device is to skip the semi-persistent uplink transmission during the portion of the transmission time interval and wherein the portion of the transmission time interval corresponds to at least a partial overlap in time between the semi-persistent uplink transmission and the downlink transmission.

33. The method of claim 32, further comprising:
transmitting a message comprising a second indication of a threshold period to transmit, to the second device, the feedback message comprising the indication that the first device is to skip the semi-persistent uplink transmission.

34. The method of claim 32, wherein the first device is barred from transmitting the semi-persistent uplink transmission after the feedback message is received by the second device.

35. A non-transitory computer-readable medium storing code for wireless communication at a first device, the code comprising instructions executable by one or more processors to cause the first device to:
transmit, to a second device and prior to a semi-persistent uplink transmission, a feedback message comprising an indication that the first device is to skip the semi-persistent uplink transmission during a portion of a transmission time interval based at least in part on a release, by the first device, of an uplink resource associated with the semi-persistent uplink transmission; and configure one or more downlink parameters associated with the portion of the transmission time interval based at least in part on the transmitted feedback message and on the release of the uplink resource associated with the semi-persistent uplink transmission, the portion of the transmission time interval corresponding to at least a partial overlap in time between the semi-persistent uplink transmission and a downlink transmission, the one or more downlink parameters associated with the downlink transmission during the portion of the transmission time interval.

36. The non-transitory computer-readable medium of claim 35, wherein the instructions are further executable by the one or more processors to:

receive a message comprising a second indication of a threshold period to transmit, to the second device, the feedback message comprising the indication that the first device is to skip the semi-persistent uplink transmission.

37. The non-transitory computer-readable medium of claim 36, wherein the message comprises one of a radio resource control message, a medium access control (MAC) control element (CE) message, or a downlink control information message.

38. A non-transitory computer-readable medium storing code for wireless communication at a second device, the code comprising instructions executable by one or more processors to cause the second device to:

receive, from a first device and prior to a semi-persistent uplink transmission, a feedback message comprising an indication that the first device is to skip the semi-persistent uplink transmission during a portion of a transmission time interval; and transmit a downlink transmission during the portion of the transmission time interval according to a set of downlink parameters, wherein the set of downlink parameters are based at least in part on the indication that the first device is to skip the semi-persistent uplink transmission during the portion of the transmission time interval and wherein the portion of the transmission time interval corresponds to at least a partial overlap in time between the semi-persistent uplink transmission and the downlink transmission.

39. The non-transitory computer-readable medium of claim 38, wherein the instructions are further executable by the one or more processors to:

transmit a message comprising a second indication of a threshold period to transmit, to the second device, the feedback message comprising the indication that the first device is to skip the semi-persistent uplink transmission.

40. The non-transitory computer-readable medium of claim 39, wherein the first device is barred from transmitting the semi-persistent uplink transmission after the feedback message is received by the second device.

* * * * *